US006188778B1

(12) United States Patent
Higashikubo et al.

(10) Patent No.: US 6,188,778 B1
(45) Date of Patent: Feb. 13, 2001

(54) TRAFFIC CONGESTION MEASURING METHOD AND APPARATUS AND IMAGE PROCESSING METHOD AND APPARATUS

(75) Inventors: Masakatsu Higashikubo; Yoshiyuki Ito, both of Osaka (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/466,215

(22) Filed: Dec. 17, 1999

Related U.S. Application Data

(62) Division of application No. 09/265,980, filed on Mar. 11, 1999, now Pat. No. 6,075,874, which is a division of application No. 09/112,989, filed on Jul. 10, 1998, now Pat. No. 5,999,635, which is a continuation of application No. PCT/JP97/00020, filed on Jan. 9, 1997.

(51) Int. Cl.[7] .......... G06K 9/00

(52) U.S. Cl. .......... 382/104; 382/274; 340/934; 348/149

(58) Field of Search .......... 382/103, 104, 382/173, 270, 274; 348/148, 149; 340/933, 934, 937; 701/117, 118, 119

(56) References Cited

U.S. PATENT DOCUMENTS

| | | | |
|---|---|---|---|
| 4,214,265 | 7/1980 | Olessen | 358/93 |
| 4,847,772 | 7/1989 | Michalopoulos et al. | 364/436 |
| 5,161,107 | * 11/1992 | Mayeaux et al. | 364/436 |
| 5,243,663 | * 9/1993 | Kudoh | 382/1 |
| 5,296,852 | * 3/1994 | Rathi | 340/933 |
| 5,301,239 | 4/1994 | Toyama et al. | 382/1 |
| 5,402,118 | 3/1995 | Aoki | 340/937 |
| 5,509,082 | 4/1996 | Toyama et al. | 382/104 |
| 5,554,983 | 9/1996 | Kitamura et al. | 340/937 |

(List continued on next page.)

FOREIGN PATENT DOCUMENTS

| | | | |
|---|---|---|---|
| 0 403 193 | 12/1990 | (EP) | G08G/1/04 |
| 56-36799 | 4/1981 | (JP) | G08G/1/01 |
| 2-284297 | 11/1990 | (JP) | G08G/1/01 |

(List continued on next page.)

OTHER PUBLICATIONS

English translation of International Preliminary Examination Report from WIPO.

Rourke et al., "Road Traffic Monitoring Using Image Processing", 3rd Int. Conf. on Road Traffic Control, 1990, pp. 163–167.

Gloyer et al., "Vehicle Detection and Tracking for Freeway Traffic Monitoring", IEEE Conf. Record of the 28th Asilomar Conf. on Signals, Systems & Computers, Oct. 31–Nov. 21, 1994, pp. 970–974.

(List continued on next page.)

*Primary Examiner*—Andrew W. Johns
(74) *Attorney, Agent, or Firm*—Pillsbury Madison & Sutro LLP

(57) ABSTRACT

The present invention measures traffic congestion by utilizing a video camera to capture images of vehicles travelling on a road and analyzing sample points that are assigned to different aspects of the images. For example, presence and movement sample points correspond to the expected location and motion of the vehicles respectively. The sample points adjacent to one another from either movement or congestion blocks. The blocks that have a ratio of movement sample points to all other sample points within the block greater than a predetermined level are moveable blocks. The remaining presence sample points in the image signify congestion sample points and form congestion blocks. Congestion blocks have a ratio of congestion sample points to all other sample points within the block greater than a predetermined level. Therefore, the state of traffic congestion is measured based upon the resultant movement and congestion blocks.

1 Claim, 44 Drawing Sheets

U.S. PATENT DOCUMENTS

| | | | | |
|---|---|---|---|---|
| 5,590,217 | | 12/1996 | Toyama | 382/104 |
| 5,684,898 | * | 11/1997 | Brady et al. | 382/282 |

FOREIGN PATENT DOCUMENTS

| | | | |
|---|---|---|---|
| 4-123199 | 4/1992 | (JP) | G08G/1/14 |
| 5-40896 | 2/1993 | (JP) | G08G/1/04 |
| 5-54294 | 3/1993 | (JP) | G08G/1/09 |
| 6-4795 | 1/1994 | (JP) | G08G/1/01 |

OTHER PUBLICATIONS

Siyal et al., "Real–Time Image Measurement of Traffic Queue Parameters by Using Image Processing Techniques", Image Processing and its Applications, Jul. 4–6, 1995, pp. 450–454.

Fathy et al., "Real–Time Image Processing Approach to Measure Traffic Queue Parameters", IEE Proc.–Vis. Image Signal Process., vol. 142, No. 5, Oct. 1995, pp. 297–303.

* cited by examiner

Sample Point Image

• : Sample Point

• : Presence Sample Point

L1
L2
L3
Addendum of Presence Sample Line

L4
L5
L6
Elimination of Presence Sample Line

• : Sample Point
//// : Presence Sample Line

Sample Point Image at Time $t_n$

Sample Point Image at Time $t_n + \gamma$

TRAFFIC CONGESTION MEASURING METHOD AND APPARATUS AND IMAGE PROCESSING METHOD AND APPARATUS

This is a division of application Ser. No. 09/265,980, filed Mar. 11, 1999, now U.S. Pat. No. 6,075,874, which is a Div. of appln. Ser. No. 09/112,989, filed Jul. 10, 1998, now U.S. Pat. No. 5,999,635, which is a Con't of Appln. No. PCT/JP97/0020.

FIELD OF THE INVENTION

The present invention relates to method and apparatus for measuring a state of traffic congestion on a road on the basis of brightness levels of sample points which are set in a motion picture representing the road and vehicles coming and going on the road. The present invention also relates to image processing method and apparatus for setting sample points in an image and processing the image.

BACKGROUND OF THE INVENTION

There are a wide variety of systems for measuring a state of traffic congestion for the purpose of smoothing traffic on roads. Such traffic congestion measuring systems include two well known measuring systems, one of the two measuring systems being of a supersonic type and the other of the two measuring systems being of a loop-coil type. The supersonic type of traffic congestion measuring system adopts a supersonic sensor as means for sensing the presence and movement of vehicles, while the loop-coil type of traffic congestion measuring system adopts a loop-coil as means for sensing the presence and the movement of the vehicles.

The supersonic type of traffic congestion measuring system uses the supersonic sensor, which is positioned above the road at a predetermined height, to detect the presence and velocity of a passing vehicle. Based on results of the detection by the supersonic sensor, the state of traffic congestion is measured. On the other hand, the loop-coil type of traffic congestion measuring system uses the loop-coil, which is buried under the road, to detect the presence and the velocity of the vehicle passing above the loop-coil on the basis of the variation in magnetism above the loop-coil caused by the passing vehicle. Based on results of the detection by the loop-coil, the state of traffic congestion is measured.

In the supersonic sensor type and loop-coil type of traffic congestion measuring systems thus designed, the supersonic sensor and the loop-coil are merely operated to obtain information of only the vehicles lying directly under the supersonic sensor and directly above the loop-coil, respectively. In point of fact, the supersonic sensor type and the loop-coil type of traffic congestion measuring systems are merely operated to indirectly measure the state of traffic congestion on the basis of the number of the passing vehicles during a certain period or the velocities of sampled vehicles corresponding to extremely small part of the vehicles passing over the supersonic sensor and the loop-coil, respectively. For this reason, the supersonic sensor and the loop-coil of traffic congestion measuring systems have difficulty in automatically measuring, in real time, traffic congestion ranges with high accuracy. For instance, if the supersonic sensor type and loop-coil type of traffic congestion measuring systems are adopted for the purpose of controlling traffic signals in accordance with the length of a traffic queue extending from an intersection, a drawback is encountered in that the supersonic sensor type and loop-coil type of traffic congestion measuring systems have difficulty in controlling the traffic signals so as to quickly relieve the traffic congestion.

There are also two traffic congestion measuring systems adopting video cameras, which are superior to the supersonic sensor type and loop-coil type of traffic congestion measuring systems in that the state of traffic congestion is measured in real time with high accuracy. One of the traffic congestion measuring systems is disclosed in "INPACTS: A New TV Image Processing System for Monitoring Traffic Conditions," by Wootton Jeffreys CONSULTANTS or European Patent publication No. 0403193. In the disclosed measuring system, an image of a road taken by a video camera is divided into a plurality of blocks for each traffic lane. The size of each block is roughly equal in length to each of the vehicles represented in the image. By processing the image, the blocks are classified into three different block groups. The first block group includes blocks in which no vehicle is detected. The second block group includes blocks in which a moving vehicle is detected. The third block group includes blocks in which a stationary vehicle is detected. According to the arrangement of the three different type blocks, the state of traffic congestion is measured indicating, for instance, conditions substantially stationary, slowly moving, and smoothly moving.

Other traffic congestion measuring systems are disclosed in Kitamura et al., "Traffic Congestion Measuring System Using Image Processing", Annual Conference sponsored by The Institute of Electrical Engineers of Japan, Industry Application Society, 1991. The traffic congestion measuring system operates in a manner which comprising the steps of abstracting three different feature values representative of the density of vehicles, the movement quantities of vehicles and the brightness of a road surface, respectively, from images taken by video camera, inputting the feature values into an input layer partially forming a neural network, calculating an output value stepwise varied between "0" and "1" by 0.2, and detecting, on the basis of the output value, the state of traffic congestion. The state of traffic congestion is any of five different conditions; a first condition that there is no traffic, a second condition that the vehicles are smoothly moving, a third condition that the vehicles are moving but crowded, a fourth condition that there is produced a slight traffic congestion, and fifth condition that there is produced a serious traffic congestion.

The conventional traffic congestion measuring systems using the video camera, however, also encounter drawbacks. In the former traffic congestion measuring system adopting the video camera, a correlation of the arrangement pattern of the blocks classified into three types and the state of traffic congestion in each of measurement points is required to be previously learned. In addition, the former traffic congestion measuring system must perform a process of dividing each of the traffic lanes into the blocks. For this reason, the traffic congestion occurring over two or more traffic lanes cannot be detected and, as a result, the state of traffic congestion cannot be measured with accuracy. Furthermore, the size of the vehicle represented in the image becomes smaller as a distance from the video camera to the vehicle becomes larger. The block size is, therefore, adjusted with difficulty to the size of vehicle spaced apart from the video camera at a long distance. Consequently, the former traffic congestion measuring system adopting the video camera cannot measure the state of traffic congestion over a long distance.

In the traffic congestion measuring system adopting the video camera, the traffic congestion measuring system is limited in forming the neural network based on a large amount of data for the sake of learning. The process of forming the neural network takes much time and labor and is a difficult task. In addition, the neural network must be re-formed whenever road circumstances are changed. Furthermore, the whole image is processed in the lump in order to measure the state of traffic congestion, so that detailed traffic information for each part of the image cannot be detected. The detailed traffic information includes, for instance, information pertain to traffic queue length expressed as "there is a traffic congestion of y meter length extending from point X1 to point X2 on the road".

The above traffic congestion measuring systems which use the video cameras encounter the foregoing drawbacks and, for this reason, are put to practical use with difficulty. In the view of the foregoing surroundings, the present invention is made and has an objective of providing a traffic congestion measuring method and apparatus capable of reducing the previous learning, detecting the traffic congestion traversing two or more traffic lanes, stably measuring the state of traffic congestion independently of the changes in circumstances such as changes of measurement points and periods, weather and traffic quantity, and detecting the traffic queue length.

The present invention has another objective of providing a traffic congestion measuring method and apparatus capable of accurately measuring the state of traffic congestion produced by a group of vehicles which are moving at a speed lower than 20 km/h, and also suitable for measurement in a highway or an expressway, in addition to the foregoing capabilities of the method and apparatus provided for the purpose of attaining the first object of the present invention.

The present invention has a further objective of providing an image processing method and apparatus that utilize processing techniques adopted by the foregoing traffic congestion measuring method and apparatus provided for the purpose of attaining the first object of the present invention.

SUMMARY OF THE INVENTION

A first aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises setting a plurality of sample points in the motion picture, each of the sample points having a brightness level; detecting, as presence sample points, the sample points which are situated in one of the series of images taken at a predetermined time and at each of which the vehicle is expected to be present; detecting, as movement sample points, the sample points which are situated in the image taken at the predetermined time and at each of which the vehicle in motion is expected to be present; detecting movement blocks each formed by part of the sample points adjacent to one another and including part of the movement sample points, a ratio of the movement sample points to all of the sample points contained in each movement block being larger than a predetermined level; detecting, as congestion sample points, the presence sample points excluded from the movement blocks; detecting congestion blocks each formed by part of the sample points adjacent to one another and including part of the congestion sample points, a ratio of the congestion sample points to all of the sample points contained in each congestion block being larger than a predetermined level; and measuring the state of traffic congestion on the road at the predetermined time on the basis of the congestion blocks.

A second aspect of the present invention describes a traffic congestion measuring apparatus for measuring a state of traffic congestion on the basis of a motion picture which represents a road and vehicles travelling on the road. The motion picture is formed by a series of images taken by a video camera. The traffic congestion measuring apparatus comprises first means for setting a plurality of sample points in the motion picture, each of the sample points having a brightness level, second means for detecting, as presence sample points, the sample points which are situated in one of the series of images taken at a predetermined time and at each of which the vehicle is expected to be present, third means for detecting, as movement sample points, the sample points which are situated in the image taken at the predetermined time and at each of which the vehicle in motion is expected to be present, fourth means for detecting movement blocks each formed by part of the sample points adjacent to one another and including part of the movement sample points, a ratio of the movement sample points to all of the sample points contained in each movement block being larger than a predetermined level, fifth means for detecting, as congestion sample points, the presence sample points excluded from the movement blocks, sixth means for detecting congestion blocks each formed by part of the sample points adjacent to one another and including part of the congestion sample points, a ratio of the congestion sample points to all of the sample points contained in each congestion block being larger than a predetermined level, and seventh means for measuring the state of traffic congestion on the road at the predetermined time on the basis of the congestion blocks.

A third aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises the steps (a) setting a plurality of sample lines in the motion picture, each of the sample lines being formed by a plurality of sample points aligned on a line perpendicular to a direction in which the road extends, and each of the sample points having a brightness level, (b) forming a criterion brightness image, in which no vehicle is expected to be present, taken by the video camera, (c) calculating a difference image indicative of a difference in brightness between one of the series of images taken at a predetermined time and the criterion brightness image by calculating brightness difference values each indicative of a difference in brightness between each of the sample points in the image taken at the predetermined time and each of the sample points in the criterion brightness image corresponding in position to each other, (d) detecting, as difference sample lines, the sample lines which are situated in the image taken at the predetermined time and each of which has a brightness level having a difference larger than a predetermined level from each of the sample lines in the criterion brightness image, on the basis of the brightness difference values of the sample points in the difference image, (e) spatially differentiating the difference image to calculate differentiation values respectively belonging to the sample points in the difference image, (f) detecting, as edge sample lines, the sample lines which are situated in the image taken at the predetermined time and each of which has a brightness level having a difference larger than a predetermined level from one of two sample lines in the direct neighborhood of each of the sample lines, on the basis of the differentiation values of the sample points in the spatially differentiated difference image, (g) detecting, as presence sample lines on each of which the vehicle is expected to be present, the difference sample lines detected in the step (d) and the edge sample lines detected in the step (f), and (h) measuring the state of traffic congestion on the basis of the presence sample lines.

A fourth aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises (a) setting a plurality of sample lines in the motion picture, each of the sample lines being formed by a plurality of sample points aligned on a line perpendicular to a direction in which the road extends, and each of the sample points having a brightness level, (b) detecting, as presence sample lines, the sample lines, on each of which the vehicle is expected to be present, on the basis of the brightness levels of the sample points on one of the series of images taken at a predetermined time, (c) estimating shadow areas including shadows of the vehicles represented in the image taken at the predetermined time, (d) correcting the presence sample lines on the basis of the shadow areas, and (e) measuring the state of traffic congestion on the basis of the presence sample lines corrected in the step (d).

A fifth aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises (a) setting a plurality of sample lines in the motion picture, each of the sample lines being formed by a plurality of sample points aligned on a line perpendicular to a direction in which the road extends, and each of the sample points having a brightness level, (b) detecting, as movement sample lines, the sample lines on each of which the vehicle in motion is expected to be present, and (c) measuring the state of traffic congestion on the basis of the movement sample lines.

A sixth aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises (a) setting a plurality of sample lines in the motion picture, each of the sample lines being formed by a plurality of sample points aligned on a line perpendicular to a direction in which the road extends, and each of the sample points having a brightness level, (b) detecting, as presence sample lines, the sample lines on each of which the vehicle is expected to be present on the basis of the brightness levels of the sample points in one of the series of images taken at a predetermined time, (c) calculating a density of the vehicles lying on the road at the predetermined time on the basis of the presence sample lines, (d) estimating a large-sized vehicle ratio indicative of a ratio of large-sized vehicles larger than a predetermined vehicle size to all of the vehicles represented in the image taken at the predetermined time, (e) correcting the density of the vehicles on the basis of the large-sized vehicle ratio estimated in the step (d), and (f) measuring the state of traffic congestion on the basis of the density of the vehicles corrected in the step (e).

A seventh aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises the steps (a) setting a plurality of sample lines in the motion picture, each of the sample lines being formed by a plurality of sample points aligned on a line perpendicular to a direction in which the road extends, and each of the sample points having a brightness level, (b) calculating mean brightness levels each indicative of a mean of brightness levels of the sample points situated on each of the sample lines in the image taken at time t, (c) calculating mean brightness levels each indicative of a mean of brightness levels of the sample points contained in each of the sample lines in the image taken at time t+γ, γ being a positive time interval, (d) detecting, as movement sample lines, the sample lines which are included in the image taken at the time t and in each of which the vehicle in motion is expected to be present, (e) detecting, as prospective post-movement sample lines, the sample lines which are included in the image taken at the time t+γ and to each of which each of the movement sample lines in the image taken at the time t is expected to be transferred, (f) calculating line velocities each indicative of a velocity of the movement sample line based on the positive time interval γ and an actual route distance between two locations on the road respectively corresponding to each of the movement sample lines and each of the post-movement sample lines, and (g) measuring the state of traffic congestion on the road on the basis of the line velocities of the movement sample lines calculated in the step (f).

An eighth aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises the steps (a) forming a criterion brightness image which is taken by the video camera and in which the vehicle is expected to be absent, (b) detecting the vehicles represented in one of the series of images taken at a predetermined time on the basis of the criterion brightness image and the image taken at the predetermined time, (c) renewing the criterion brightness image after the step (b), and (d) repeating the steps (b) and (c) at predetermined regular intervals, the criterion brightness image being renewed in the step (c) by an equation described as follows:

$$B_{n+1}=B_n+\eta\times(X_n-B_n)$$

wherein $X_n$ is a brightness level of each of picture elements forming the image taken at time $t_n$, $B_n$ is a brightness level of each of picture elements forming the criterion brightness image which is utilized for detecting the vehicles represented in the image taken at the time $t_n$, $B_{n+1}$ is a brightness level of each of picture elements forming the criterion brightness image which is utilized for detecting the vehicles represented in the image taken at time $t_{n+1}$, each of the predetermined regular intervals is equal to $t_{n+1}-t_n$, and η is a variable coefficient decreased in proportion as $|x_n-B_n|$ becomes large and as a level of the traffic congestion on the road is increased.

A ninth aspect of the present invention describes a traffic congestion measuring method of measuring a state of traffic congestion on the basis of a motion picture which represents a road and vehicles travelling on the road. The motion picture is formed by a series of images taken by a video camera. The traffic congestion measuring method comprises calculating spatial velocities each indicative of a mean of velocities of the vehicles represented in each of mesh sections into which the road represented in image taken at a predetermined time is divided, detecting, on the basis of the spatial velocities, a traffic congestion range occupied by the mesh sections in each of which the traffic congestion occurs, and detecting a tail position of the traffic congestion range.

A tenth aspect of the present invention describes a traffic congestion measuring apparatus for measuring a state of traffic congestion on the basis of a motion picture which represents a road and vehicles travelling on the road. The motion picture is formed by a series of images taken by a video camera. The traffic congestion measuring apparatus comprises means for setting a plurality of sample lines in the motion picture, each of the sample lines being formed by a plurality of sample points aligned on a line perpendicular to a direction in which the road extends, and each of the sample points having a brightness level, means for forming a criterion brightness image, in which no vehicle is expected to be present, taken by the video camera, means for calculating a difference image indicative of a difference in brightness between one of the series of images taken at a predetermined time and the criterion brightness image by calculating brightness difference values each indicative of a difference in brightness between each of the sample points in the image taken at the predetermined time and each of the sample points in the criterion brightness image corresponding in position to each other, means for detecting, as difference sample lines, the sample lines which are situated in the image taken at the predetermined time and each of which has a brightness level having a difference larger than a predetermined level from each of the sample lines in the criterion brightness image, on the basis of the brightness difference values of the sample points in the difference image, means for spatially differentiating the difference image to calculate differentiation values respectively belonging to the sample points in the difference image, means for detecting, as edge sample lines, the sample lines which are situated in the image taken at the predetermined time and each of which has a brightness level having a difference larger than a predetermined level from one of two sample lines in the direct neighborhood of each of the sample lines, on the basis of the differentiation values of the sample points in the spatially differentiated difference image, means for detecting, as presence sample lines on each of which the vehicle is expected to be present, the difference sample lines and the edge sample lines, and means for measuring the state of traffic congestion on the basis of the presence sample lines.

An eleventh aspect of the present invention describes a traffic congestion measuring apparatus for measuring a state of traffic congestion on the basis of a motion picture which represents a road and vehicles travelling on the road. The motion picture is formed by a series of images taken by a video camera. The traffic congestion measuring apparatus comprises means for setting a plurality of sample lines in the motion picture, each of the sample lines being formed by a plurality of sample points aligned on a line perpendicular to a direction in which the road extends, and each of the sample points having a brightness level, mean for detecting, as movement sample lines, the sample lines on each of which the vehicle in motion is expected to be present in the image taken at a predetermined time, and means for measuring the state of traffic congestion on the basis of the movement sample lines.

A twelfth aspect of the present invention describes a traffic congestion measuring apparatus for measuring a state of traffic congestion on the basis of a motion picture which represents a road and vehicles travelling on the road. The motion picture is formed by a series of images taken by a video camera. The traffic congestion measuring apparatus comprises means for setting a plurality of sample lines in the motion picture, each of the sample lines being formed by a plurality of sample points aligned on a line perpendicular to a direction in which the road extends, and each of the sample points having a brightness level, means for detecting, as presence sample lines, the sample lines on each of which the vehicle is expected to be present on the basis of the brightness levels of the sample points in one of the series of images taken at a predetermined time, means for calculating a density of the vehicles lying on the road at the predetermined time on the basis of the presence sample lines, means for estimating a large-sized vehicle ratio indicative of a ratio of large-sized vehicles larger than a predetermined vehicle size to all of the vehicles represented in the image taken at the predetermined time, and means for correcting the density of the vehicles on the basis of the large-sized vehicle ratio.

A thirteenth aspect of the present invention describes a traffic congestion measuring apparatus for measuring a state of traffic congestion on the basis of a motion picture which represents a road and vehicles travelling on the road. The motion picture is formed by a series of images taken by a video camera. The traffic congestion measuring apparatus comprises means for setting a plurality of sample lines in the motion picture, each of the sample lines being formed by a plurality of sample points aligned on a line perpendicular to a direction in which the road extends, and each of the sample points having a brightness level, means for calculating mean brightness levels each indicative of a mean of brightness levels of the sample points situated on each of the sample lines in the image taken at time t, means for calculating mean brightness levels each indicative of a mean of brightness levels of the sample points situated on each of the sample lines in the image taken at time $t+\gamma$, $\gamma$ being a positive time interval, means for detecting, as movement sample lines, the sample lines which are included in the image taken at the time t and in each of which the vehicle in motion is expected to be present, means for detecting, as prospective post-movement sample lines, the sample lines which are included in the image taken at the time $t+\gamma$ and to each of which each of the movement sample lines in the image taken at the time t is expected to be transferred, means for calculating line velocities each indicative of a velocity of the movement sample line based on the positive time interval $\gamma$ and an actual route distance between two locations on the road respectively corresponding to each of the movement sample lines and each of the post-movement sample lines, and means for measuring the state of traffic congestion on the road on the basis of the line velocities of the movement sample lines.

A fourteenth aspect of the present invention describes an image processing method of processing an image taken by a camera and representing an object and a background, comprising forming a criterion brightness image representing only the background, calculating a difference image indicative of a difference in brightness between the image and the criterion brightness image, judging whether a brightness level of each of picture elements forming the difference image is larger than a predetermined level or not, and varying the predetermined level, which is utilized for judging each of the picture elements, in accordance with an actual distance from the camera to an actual location corresponding to a position of each of the picture elements in the image.

A fifteenth aspect of the present invention describes an image processing method comprising calculating a first difference image indicative of a difference in brightness between an image at time t and another image at time t−α, α being a predetermined positive time interval, and the image at the time t and another image at the time t−α being contained in a series of images taken by a video camera, binarizing the first difference image with a first predetermined threshold level to form a first feature abstractive image containing only picture elements each having a level of "0" or "1", calculating a second difference image indicative of a difference in brightness between the image at the time t and a further image at time t+β, β being a predetermined positive time interval, and the further image at the time t+β being contained in the series of images, binarizing the second difference image with a second predetermined threshold level to form a second character abstractive image containing only picture elements each having a level of "0" or "1", calculating a product of the first feature abstractive image and the second feature abstractive image to form a product image, varying α and β, which are utilized for discriminating each of picture elements among the series of images, in accordance with an actual distance from the video camera to an actual location corresponding to a position of each of the picture elements in the image taken at the time t.

A sixteenth aspect of the present invention describes an image processing method comprising separating picture elements included in an image taken by a camera into two picture element groups on the basis of brightness levels of the picture elements, one of the picture element groups consisting of a plurality of first picture elements, and the other of the picture element groups consisting of a plurality of second picture elements, calculating first picture element ratios each indicative of a ratio of the first picture elements to all of the picture elements contained in each of candidate blocks which partially forms the image, detecting the candidate blocks each having the first picture element ratio larger than a predetermined level, and varying the predetermined level, which is utilized for judging each of the candidate blocks, in accordance with an actual distance from the camera to an actual location corresponding to a position of each of the candidate blocks in the image.

A seventeenth aspect of the present invention describes an image processing method comprising separating picture elements included in an image taken by a camera into two picture element groups on the basis of brightness levels of the picture elements, one of the picture element groups consisting of a plurality of first picture elements, and the other of the picture element groups consisting of a plurality of second picture elements, calculating first picture element ratios each indicative of a ratio of the first picture elements to all of the picture elements contained in each of the candidate blocks which partially forms the image, detecting the candidate blocks each having the first picture element ratio larger than a predetermined level, and varying, in size, each of the candidate blocks in accordance with an actual distance from the camera to an actual location corresponding to a position of each of the candidate blocks in the image.

An eighteenth aspect of the present invention describes an image processing apparatus for processing an image taken by a camera and representing an object and a background, comprising means for forming a criterion brightness image representing only the background, means for calculating a difference image indicative of a difference in brightness between the image and the criterion brightness image, means for judging whether a brightness level of each of picture elements forming the difference image is larger than a predetermined level or not, and means for varying the predetermined level, which is utilized for judging each of the picture elements, in accordance with an actual distance from the camera to an actual location corresponding to a position of each of the picture elements in the image.

A nineteenth aspect of the present invention describes an image processing apparatus comprising means for calculating a first difference image indicative of a difference in brightness between an image at time t and another image at time t−α, α being a predetermined positive time interval, and the image at the time t and another image at the time t−α being included in a series of images taken by a video camera, means for binarizing the first difference image with a first predetermined threshold level to form a first feature abstractive image containing only picture elements each having a level of "0" or "1", means for calculating a second difference image indicative of a difference in brightness between the image at the time t and a further image at time t+β, β being a predetermined positive time interval, and the further image at the time t+β being included in the series of images, means for binarizing the second difference image with a second predetermined threshold level to form a second feature abstractive image containing only picture elements each having a level of "0" or "1", means for calculating a product of the first feature abstractive image and the second feature abstractive image to form a product image, and means for varying α and β, which are utilized for discriminating each of picture elements among the series of images, in accordance with an actual distance from the video camera to an actual location corresponding to a position of each of the picture elements in the image taken at the time t.

A twentieth aspect of the present invention describes an image processing apparatus comprising means for separating picture elements included in an image taken by a camera into two picture element groups on the basis of brightness levels of the picture elements, one of the picture element groups consisting of a plurality of first picture elements, and the other of the picture element groups consisting of a plurality of second picture elements, means for calculating first picture element ratios each indicative of a ratio of the first picture elements to all of the picture elements contained in each of candidate blocks which partially forms the image, means for detecting the candidate blocks each having the first picture element ratio larger than a predetermined level, and means for varying the predetermined level, which is utilized for judging each of the candidate blocks, in accordance with an actual distance from the camera to an actual location corresponding to a position of each of the candidate blocks in the image.

A twenty-first aspect of the present invention describes an image processing apparatus comprising means for separating picture elements included in an image taken by a camera into two picture element groups on the basis of brightness levels of the picture elements, one of the picture element groups consisting of a plurality of first picture elements, and the other of the picture element groups consisting of a plurality of second picture elements, means for calculating first picture element ratios each indicative of a ratio of the first picture elements to all of the picture elements contained in each of candidate blocks which partially forms the image, means for detecting the candidate blocks each having the first picture element ratio larger than a predetermined level, and means for varying, in size, each of the candidate blocks in accordance with an actual distance from the camera to an actual location corresponding to a position of each of the candidate blocks in the image.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENTS

<First Embodiment>

Referring to FIGS. 1 to 19 of the drawings, a first preferred embodiment of a traffic control system adopting traffic congestion measuring method and apparatus according to the present invention will be described in detail hereinafter.

Figure 1:
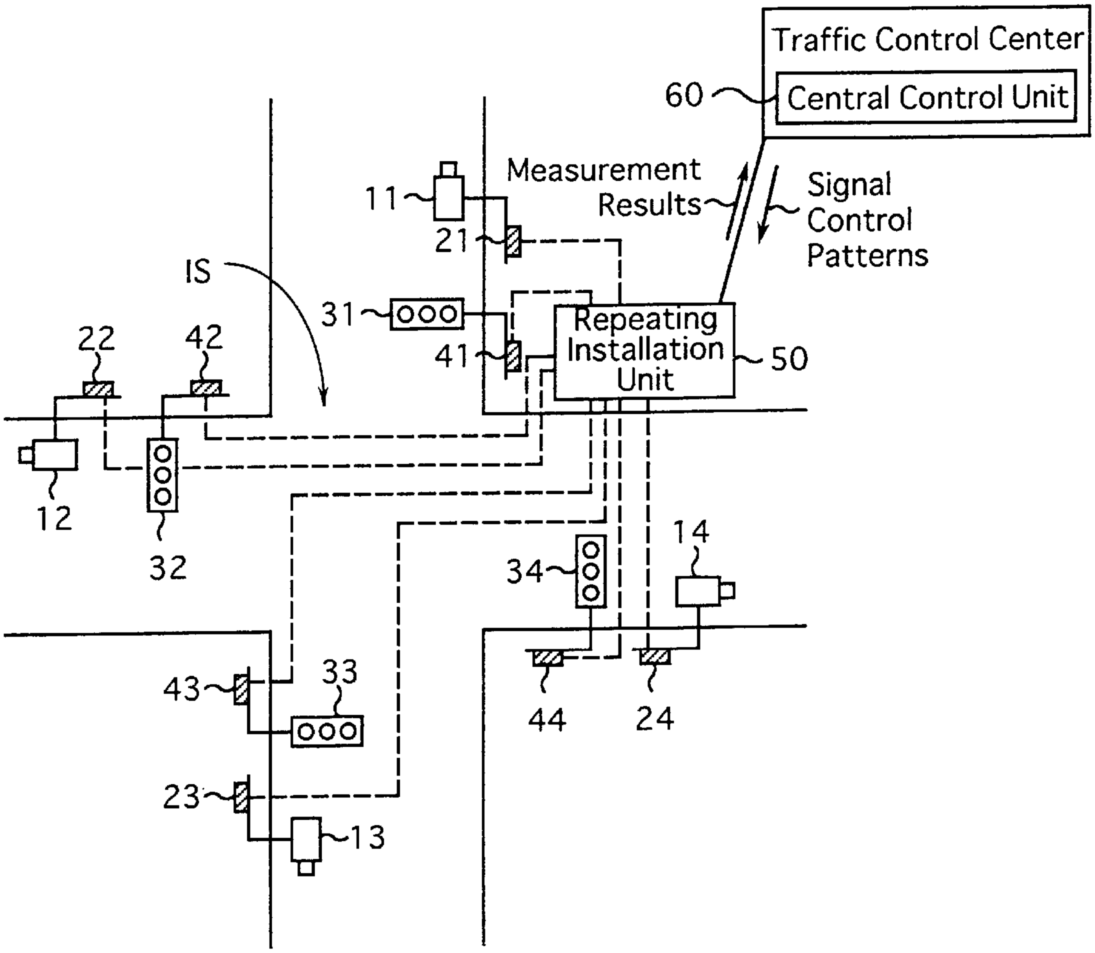
FIG. 1 is a schematic view showing a first preferred embodiment of a traffic control system utilizing traffic congestion measuring method and apparatus according to the present invention.
Figure 2:
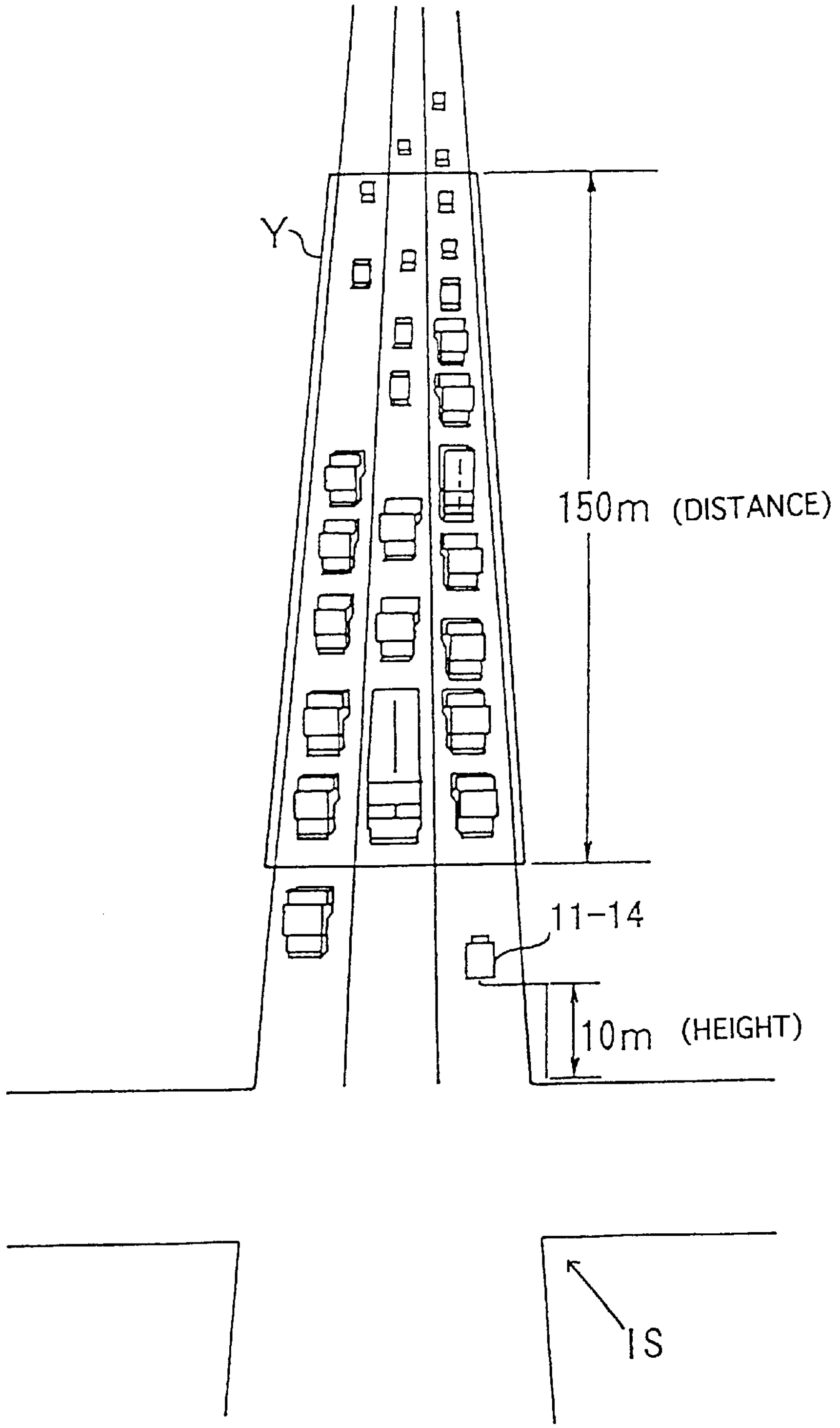
FIG. 2 is a perspective view showing an area shot by a video camera shown in FIG. 1.

The traffic control system is shown in FIG. 1 and includes video cameras 11 to 14, traffic congestion measuring units 21 to 24, traffic signals 31 to 34, signal control units 41 to 44 and a repeating installation unit 50. All of these units and devices are located in the neighborhood of an intersection IS. The traffic control system further comprises a central control unit 60 that is located in a traffic control center built in remotely spaced relationship to the intersection IS. As shown in FIG. 2, the video cameras 11 to 14 are spaced apart from a road surface near the intersection IS, for example, at 10 meters, and set to shoot a road area Y covering three traffic lanes and each extending from a certain position in the neighborhood of the intersection over a distance of 150 meters. In the present embodiment, each of the video cameras 11 to 14 is positioned on the downstream side of each of the roads and directed toward the upstream side of each of the roads.

Figure 3:
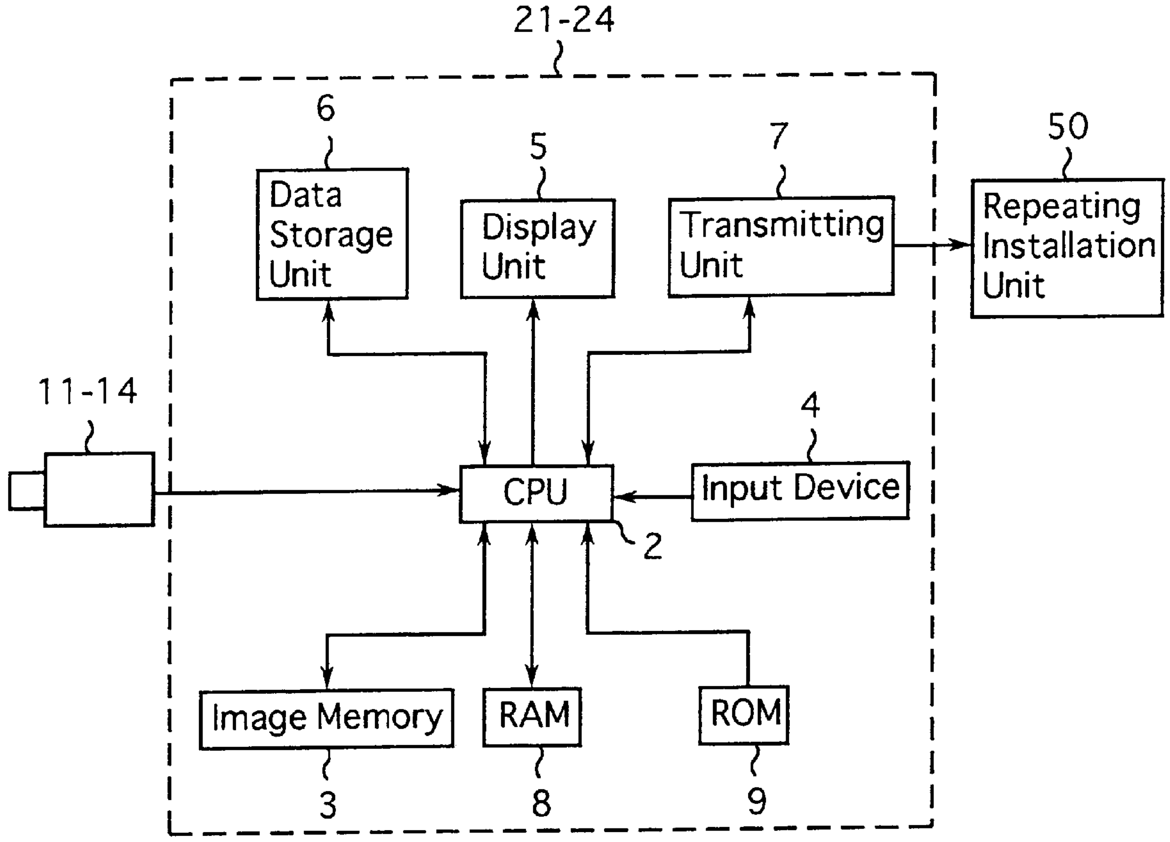
FIG. 3 is a block diagram showing the traffic congestion measuring apparatus shown in FIG. 1.

The traffic congestion measuring units 21 to 24 are designed to measure not only traffic quantity but also traffic congestion ranges or traffic queue lengths on the basis of the number, the velocities and the types of vehicles that are approaching the intersection IS. Each of the traffic congestion measuring units 21 to 24 is shown in FIG. 3 and includes a CPU 2, an image memory 3, an input device 4, a display unit 5, a data storage unit 6, a transmitting unit 7, a RAM (Random Access Memory) 8 and a ROM (Read-only Memory) 9.

When each of the video cameras 11 to 14 are operated to obtain image data, the image data are transmitted to the CPU 2 of each of the traffic congestion measuring units 21 to 24. The image data is further transmitted from the CPU 2 and stored in the image memory 3. The ROM 9 previously stores various programs to be read and executed by the CPU 2. When the programs are executed by the CPU 2, the RAM 8 serves as a work area and outputs the required image data from the image memory 3. Based on the required image data, various calculations are carried out and, finally, the following measurement results pertinent to the state of traffic congestion are calculated. The calculation values produced during the execution of the programs are temporarily stored in the image memory 3. The measurement results pertinent to the state of traffic congestion are transmitted to the display unit 5, the data storage unit 6 and the transmitting unit 7. The display unit 5 displays the inputted measurement results pertinent to the state of traffic congestion on its own screen. The data storage unit 6 is operated to store therein the inputted measurement results pertinent to the state of traffic congestion. The transmitting unit 7 transmits the inputted measurement results pertinent to the state of traffic congestion to the central control unit 60 in the traffic control center shown in FIG. 1 by way of the repeating installation unit 50. The input device 4 serves as an input means for allowing set values and threshold values to be inputted therein and allowing the present values to be replaced with new values.

Returning back to FIG. 1 of the drawings, the central control unit 60 in the traffic control center is adapted to transmit signal control patterns, which are produced on the basis of the measurement results of the traffic congestion measuring units 21 to 24, to the signal control units 41 to 44 through the repeating installation unit 50. If, for instance, the traffic congestion measuring units 21 and 23 receiving the image data from the video cameras 11 and 13 detects traffic congestion ranges respectively having lengths which are longer than those by the traffic congestion measuring units 22 and 24 receiving the image data from the video cameras 12 and 14, the central control unit 60 is operated to transmit, to the signal control units 41 to 44, the signal control patterns indicating that green light periods in the signal control units 31 and 32 are longer than those in the signal control units 33 and 34, thereby relieving the traffic congestion on the roads shot by the video cameras 11, and 13.

Figure 4:
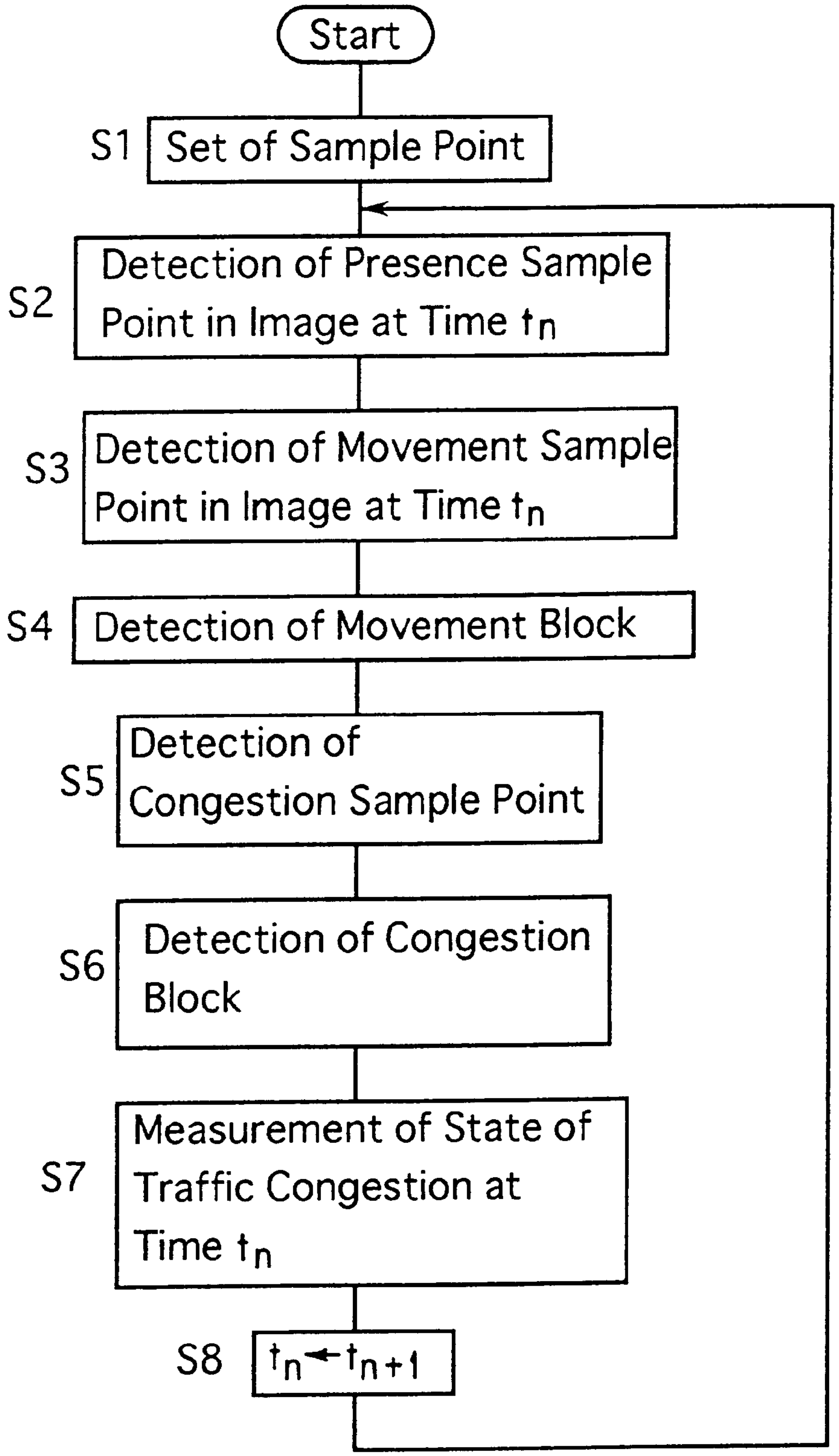
FIG. 4 is a flowchart showing traffic congestion measuring steps performed by the traffic congestion measuring system shown in FIG. 1.

The traffic congestion measuring method performed by the traffic congestion measuring units thus constructed is described hereinlater with reference to FIG. 4 showing a flowchart and formed by steps S1 through S8.

Figure 6:
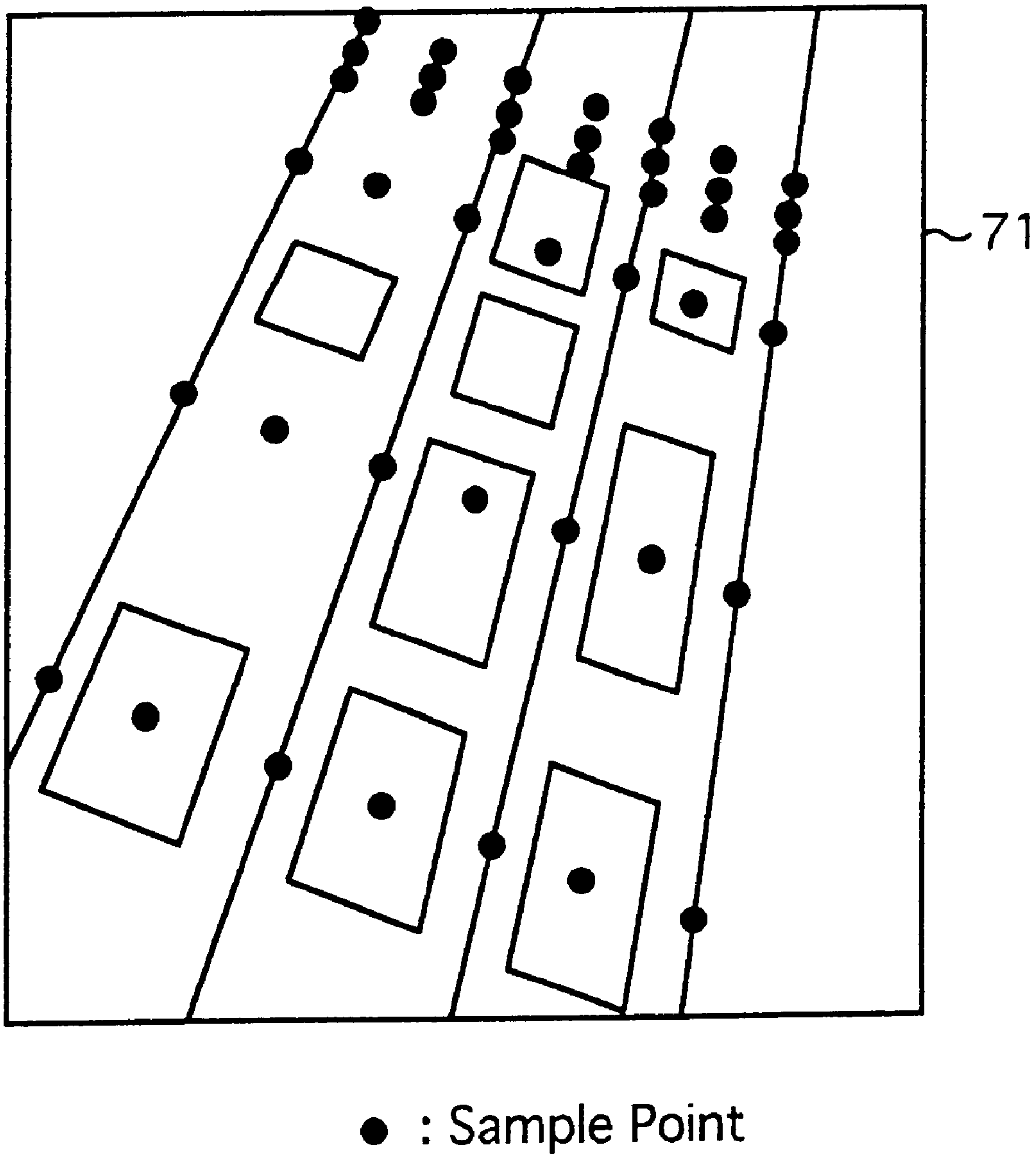
FIG. 6 is a view showing sample points set in the image taken by the video camera shown in FIG. 1.

In step S1, a plurality of sample points are set in a series of the images taken by the video camera. As seen in FIG. 6, assuming that the video camera takes an image 71 the sample points are denoted by "●". In step S2, the sample points, which are set in the image taken at time $t_n$ and at each of which the vehicle is expected to be present, are detected as presence sample points. In step S3, the sample points, which are set in the image taken at the time $t_n$ and at each of which the vehicle in motion is expected to be present, are detected as movement sample points. In step S4, rectangular blocks each formed by the sample points adjacent to one another are detected as movement blocks. Each of the detected movement blocks includes the movement sample points. A ratio of the movement sample points to all of the sample points contained in each of the movement blocks is larger than a predetermined level. In step S5, the presence sample points which are excluded from the movement blocks are detected as congestion sample points. In step S6, rectangular blocks each formed by the sample points adjacent to one another are detected as congestion blocks. Each of the detected congestion blocks includes the congestion sample points. A ratio of the congestion sample points to all of the sample points contained in each of the congestion blocks is larger than a predetermined level. In step S7, the state of traffic congestion in the measurement area at the time $t_n$ is measured depending upon the congestion blocks. In step S8, n is replaced n+1 and the control is returned from step S8 to step S2. Note that n is a positive integer and that $|t_{n+1}-t_n|$ is constant. Steps S2 through S7 are repeated at regular time intervals.

Figure 5:
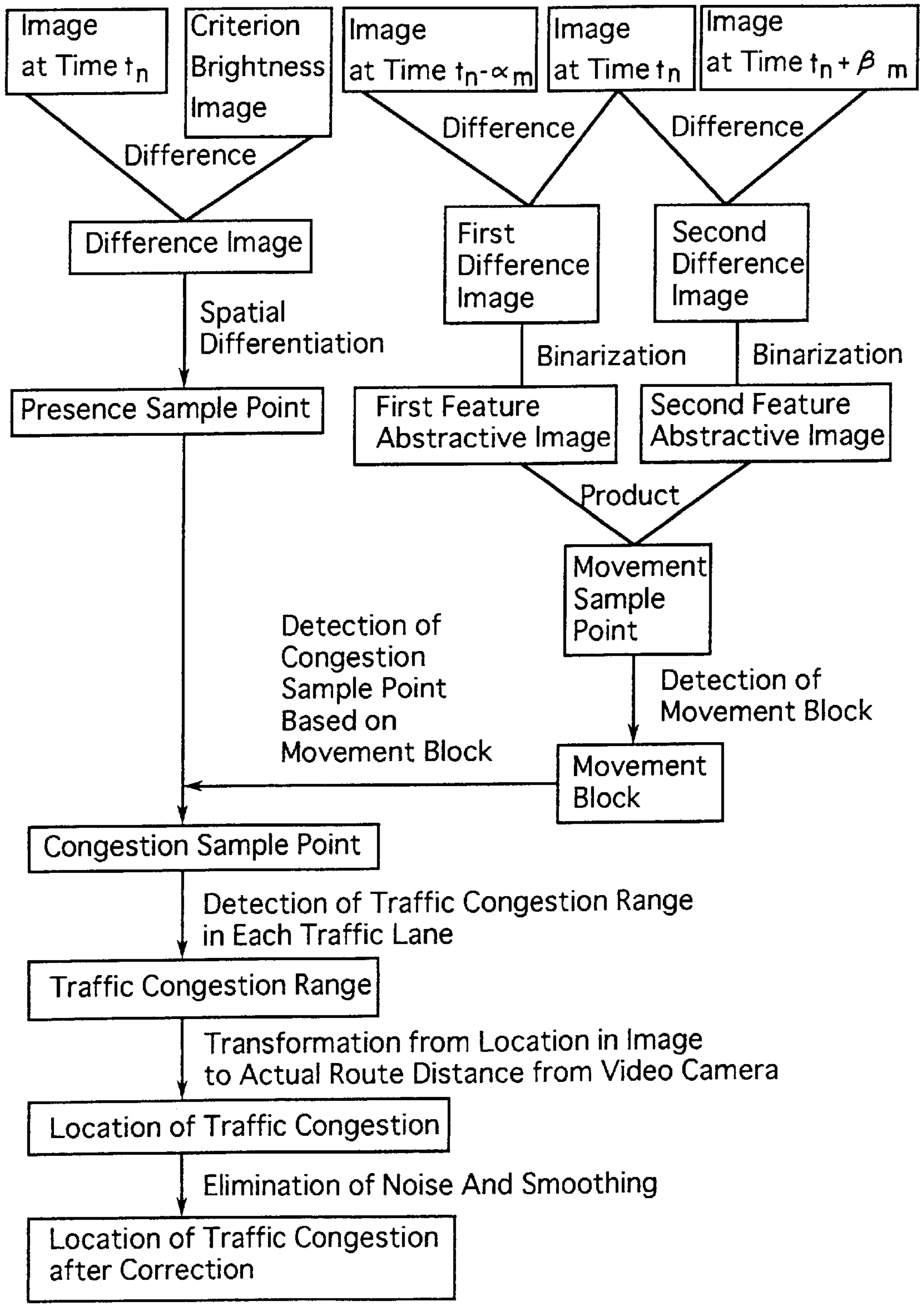
FIG. 5 is a view showing relationships between results of the calculation and the detection obtained in the steps of the flowchart shown in FIG. 4.

FIG. 5 summarily shows relationships between results of the calculation and the detection in steps S1 through S7. The results of the calculation and the detection will be apparent from the following detailed explanations of steps S1 through S7.

Step S1 of setting the sample points is described in detail hereinlater.

The image 71 shown in FIG. 6 has a lower portion representing an area portion near the video camera and an upper portion representing an area portion remote from the video camera. The image 71 represents three traffic lanes with the vehicles as rectangles shown by solid lines. As seen in FIG. 6, the sample points on each line perpendicular to a direction in which the road extends are positioned in the image to correspond to actual locations aligned at regular actual space intervals on the road. The reason why the sample points are thus positioned is that distortions in each line perpendicular to the direction in which the road extends is small and that a distance in the image between two sample points aligned on the line perpendicular to the direction in which the road represented in the image extends can be transformed into an actual distance with ease.

On the other hand, the sample points on each line parallel to the direction in which the road extends are aligned at space intervals. The space interval between two adjoining sample points aligned on each line parallel to the direction becomes smaller as two actual locations on the road respectively corresponding to the two adjoining sample points are more remote from the video camera. The reason why the sample points on each line parallel to the direction in which the road extends are thus aligned is described below. In an image area corresponding to an actual area near to the video camera, the image of the vehicle is large. For this reason, the travel condition of the vehicle can be detected with ease even if the sample points are sparsely arranged. On the contrary, in an image area corresponding to an actual area remote from the video camera, the image of the vehicle is small. For this reason, it is difficult to detect the vehicle's travel condition if sample points are sparsely arranged. For example, in a faraway image area corresponding to an area most remote from the video camera, the space interval between two sample points aligned in a direction in which the vehicle is travelling is corresponding to that between two adjoining picture elements in the image. In the image areas nearer to the video camera, as two actual locations corresponding to the two sample points are nearer to the video camera, the space interval between the two sample points becomes larger to the extent that the travel condition of the vehicle can be detected. In this case, the space intervals of the sample points may be determined depending upon a predetermine limit value indicative of the total number of the sample points. By determining the space intervals of the sample points in this way, not only can be detected the travel conditions of the vehicles remote from the video camera, but the required processing time can be reduced. When the measuring system ensures that the detection capability in the measurement area most remote from the video camera is increased to the upper limit level indigenous to the input image, and when the total number of the sample points are restricted, the measuring system is capable of enhancing the detection process in speed and performing the detection process without expensive specific hardware. If the resolution of the video camera in the measuring system is set to a constant value, other video cameras having various resolutions can be adopted with ease. When the sample points are set, the data storage unit 6 stores, in a distance table formed in its own memory area, distance values and space intervals. The distance values are indicative of an actual route distance along each traffic lane from the video camera to an actual location on the road corresponding to each of the sample points. The space intervals are indicative of the actual space interval between the two adjoining sample points aligned along each traffic lane.

Figure 7:
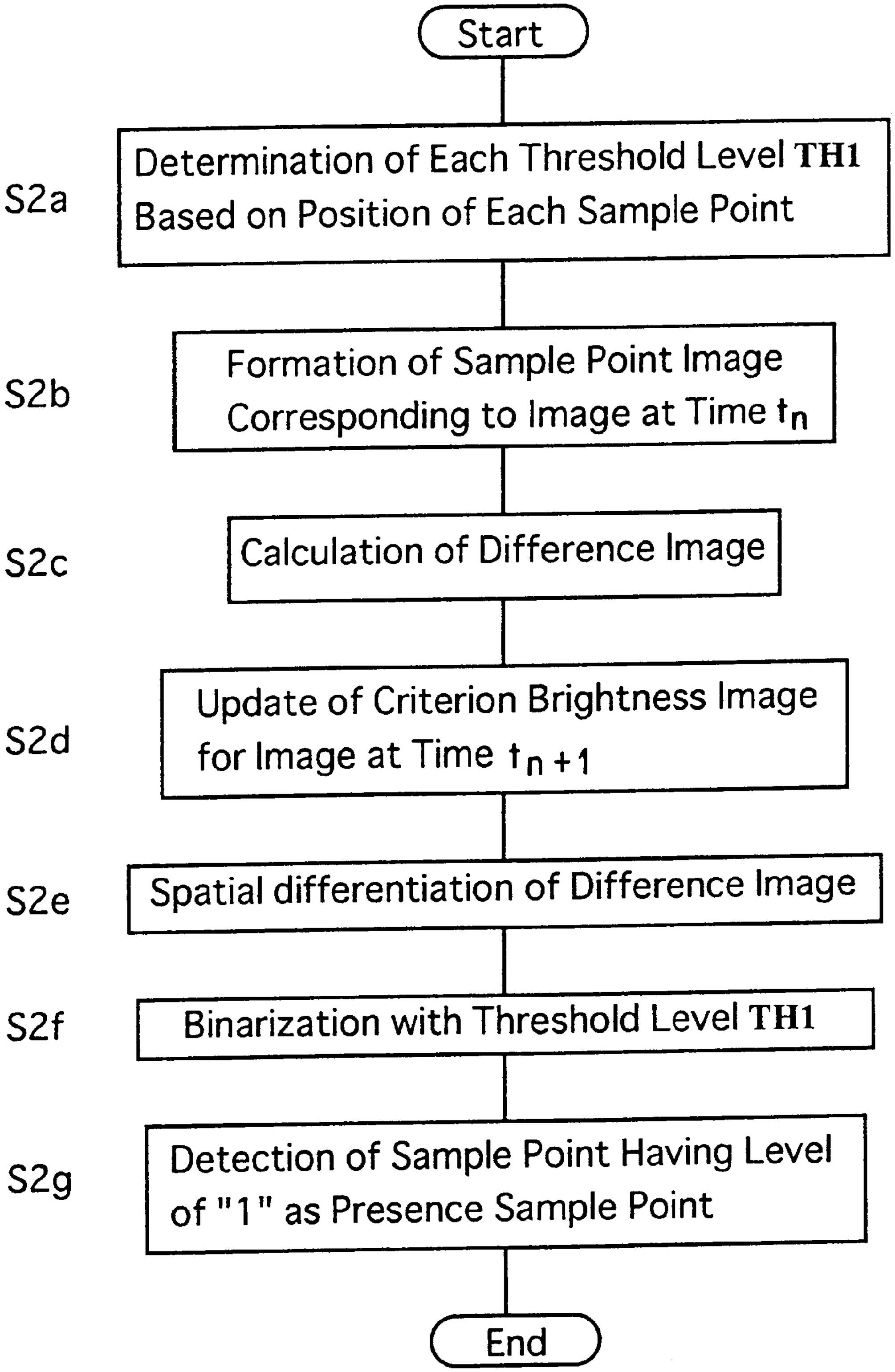
FIG. 7 is a flowchart showing detailed steps as a whole defining the step S2 of the flowchart shown in FIG. 4.

The process of detecting the presence sample points performed in step S2 shown in FIG. 4 is described in detail hereinlater with reference to FIG. 7 showing a flowchart formed by steps S2*a* through S2*g*.

Figure 8:
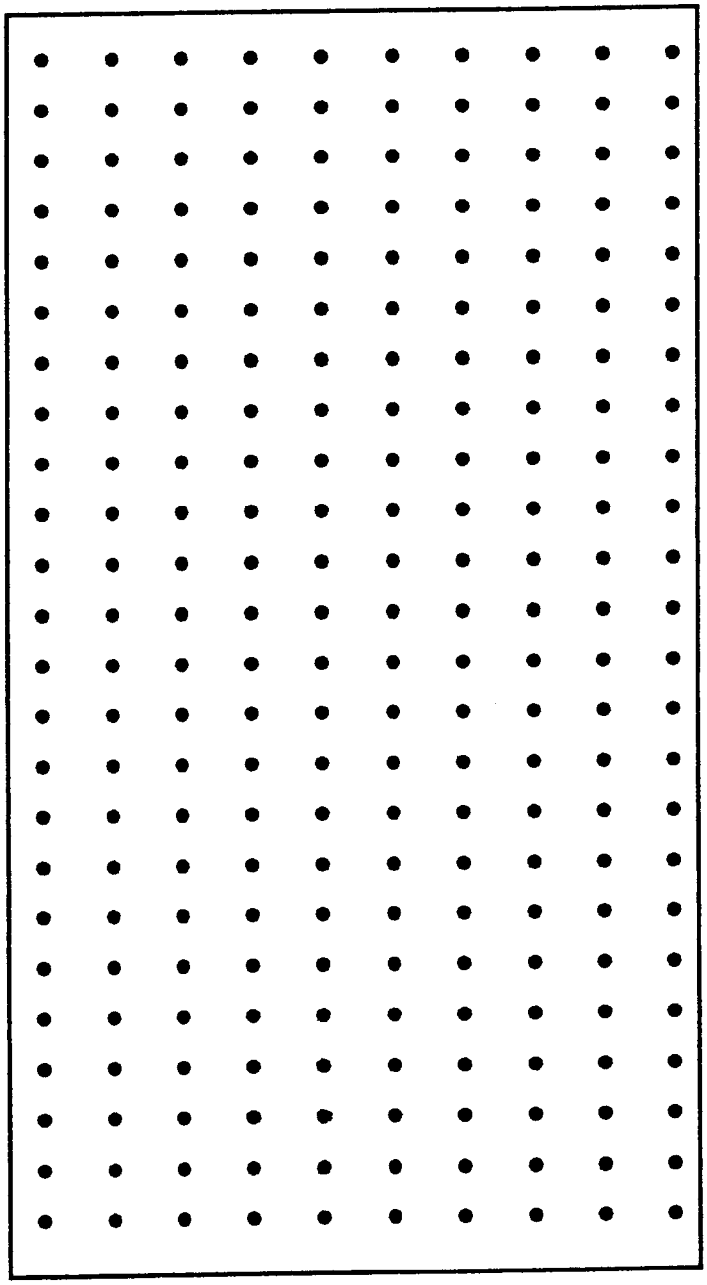
FIG. 8 is a view showing a sample point image formed in the step S2*b* of the flowchart shown in FIG. 7.
Figure 9:
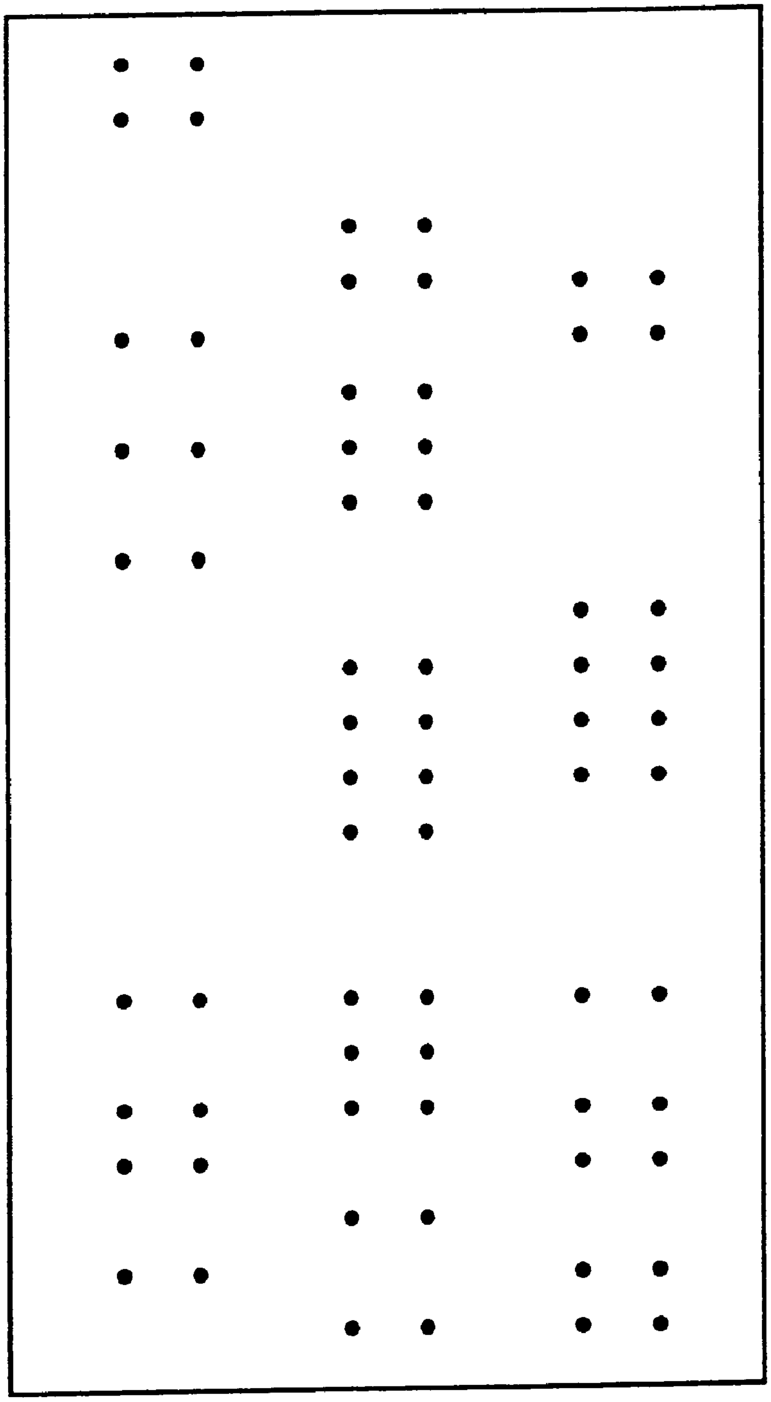
FIG. 9 is a view showing presence sample points detected in the step S2 of the flowchart shown in FIG. 4.

In step S2*a*, threshold levels TH1 are utilized for binarizing brightness level of each of the sample points. The binarization manner is determined in accordance with distance values that are indicative of an actual route distance from the video camera to an actual location on the road corresponding to a position of each of the sample points in the image. In step S2*b*, a sample point image represented by only picture elements corresponding to the sample points is formed. FIG. 8 shows an example of the sample point image. As seen in FIG. 8, the sample point image is formed by mapping the sample points in the image at the time $t_n$ into a rectangular coordinate system. The sample points forming the sample point image are stored in the form of a two-dimensional data format corresponding to the arrangement of the sample points shown in FIG. 8. Each of the brightness levels of the picture elements corresponding to the sample points is represented in the form of 8 bit data format.

Step S2*b* leads to step S2*c* in which a difference image is calculated by calculating brightness difference values which are each indicative of a difference in brightness level between each of the sample points in the sample point image and each of the sample points in a criterion brightness image corresponding in position to each other. The criterion brightness image used in the initial control flow shown in FIG. 7 may represent a background with respect to the vehicles and be taken by the video camera on the same condition as the initial measurement. Most preferably, the firstly formed criterion brightness image may represent no vehicles within the measurement area. However, the most preferable criterion brightness image can be scarcely formed because of the fact that the brightness level in the image is varied every minute in accordance with the weather and the elapsed time. Practically, the criterion brightness image may be an image having picture element data approximate to that of the most preferable image representing no vehicles even if the image represents several vehicles. Similarly to the aforesaid sample point image, the criterion brightness image is represented by only picture elements corresponding to the sample points, respectively.

In step S2*d*, the criterion brightness image which is utilized for calculating the difference image with respect to the sample point image at time $t_{n+1}$ is renewed by the following equation on the basis of the difference image calculated in step S2*c*.

$$B_{n+1}=B_n+\eta\times(X_n-B_n) \quad \text{(i)}$$

wherein $X_n$ is a brightness level of each of sample points forming the sample point image taken at time $t_n$. $B_n$ is a brightness level of each of sample points forming the criterion brightness image which is utilized for calculating the difference image with respect to the sample point image taken at time $t_n$. $B_{n+1}$ is a brightness level which is utilized for calculating the difference image with respect to the sample point image taken at time $t_{n+1}$. $\eta$ is a variable coefficient decreased in proportion as $|X_n-B_n|$ becomes large and as traffic congestion level on the road is increased. The reason why $\eta$ is inversely proportional to $|X_n-B_n|$ is that a possibility that the vehicle is present is increased in proportion as the variation in brightness is increased. In this case, $\eta$ is set for each of the sample points. On the other hand, in order to prevent the brightness level of the vehicle caught by the traffic congestion from being inputted into the system, $\eta$ is decreased in proportion to the increase in the traffic congestion level on the road. In this case, $\eta$ is set for each of the traffic lanes or each of predetermined areas in the image. The traffic congestion level is determined depending upon traffic congestion ranges described below.

Because the criterion brightness image is renewed in accordance with the equation (i) described hereinbefore, the criterion brightness image can be automatically varied in accordance with the variation in weather and the variation of the sunlight due to elapsed-time. In addition, since the criterion brightness image is renewed in accordance with the equation (i), "$X_n-B_n$" calculated in step S2*c* can be appropriated for the renewal of the criterion brightness image, thereby making it possible to reduce the calculations in quantity. If the calculation is increased, the criterion brightness image is renewed by another equation describe as follows:

$$B_{n+1}=B_n+\eta\times(X_{n+1}-B_n) \quad \text{(ii)}$$

In step S2*e*, the difference image is spatially differentiated with so-called Sobel operators. Step S2*e* is followed by step S2*f* in which each of the differentiation values of the sample points in the differentiated difference image is binarized or thresholded with each of the threshold levels TH1 determined in step S2*a*. Therefore, the sample points in the differentiated difference image each has a level of "0" or "1". In step S2*g*, the sample points having the level of "1" are detected as the presence sample points because of the fact that, on each of the sample points having the level of "1", the vehicle is expected to be present. The arrangement of the presence sample points thus detected is, by way of example, shown in FIG. 9.

Each of the threshold levels TH1 may be determined in step S2*a* as follows. The smaller of the threshold levels TH1 used for judging each of the sample points becomes smaller as an actual route distance from the video camera to a location on the road corresponding to a position of each of the sample points in the image becomes larger. The reason why the threshold levels TH1 are thus set is that the image representing an actual area remote from the video camera grows dimmer in comparison with that representing an actual area in the neighborhood of the video camera and accordingly that a difference in brightness between the vehicles and the background is decreased. Because each of the threshold levels is set for each of the sample points in accordance with the actual route distance from the video camera to the actual location on the road corresponding to the position of each of the sample points, the presence sample points in any position can be detected on an accurate level with one another.

Figure 10:
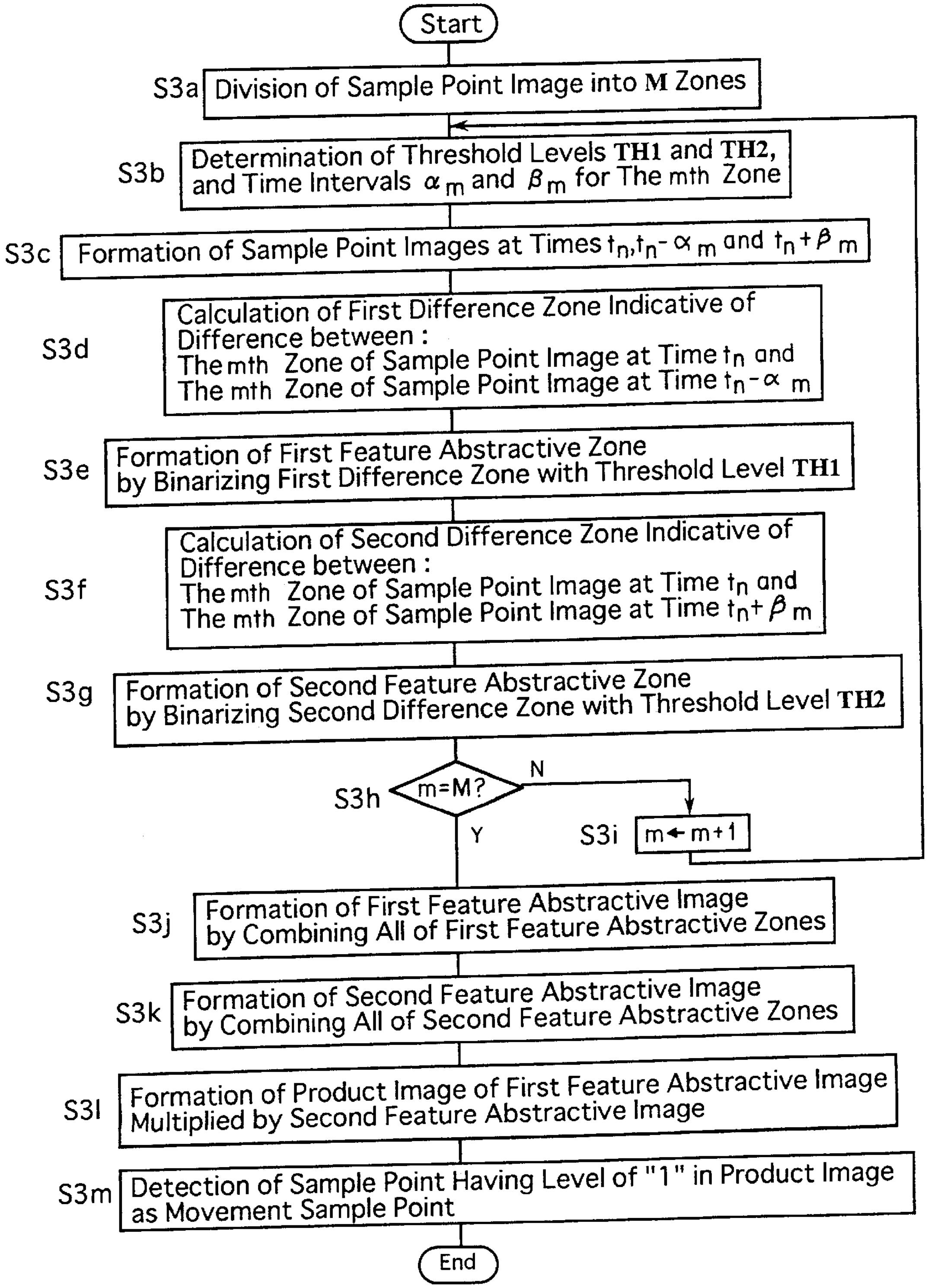
FIG. 10 is a flowchart showing detailed steps as a whole defining the step S3 of the flowchart shown in FIG. 4.
Figure 11:
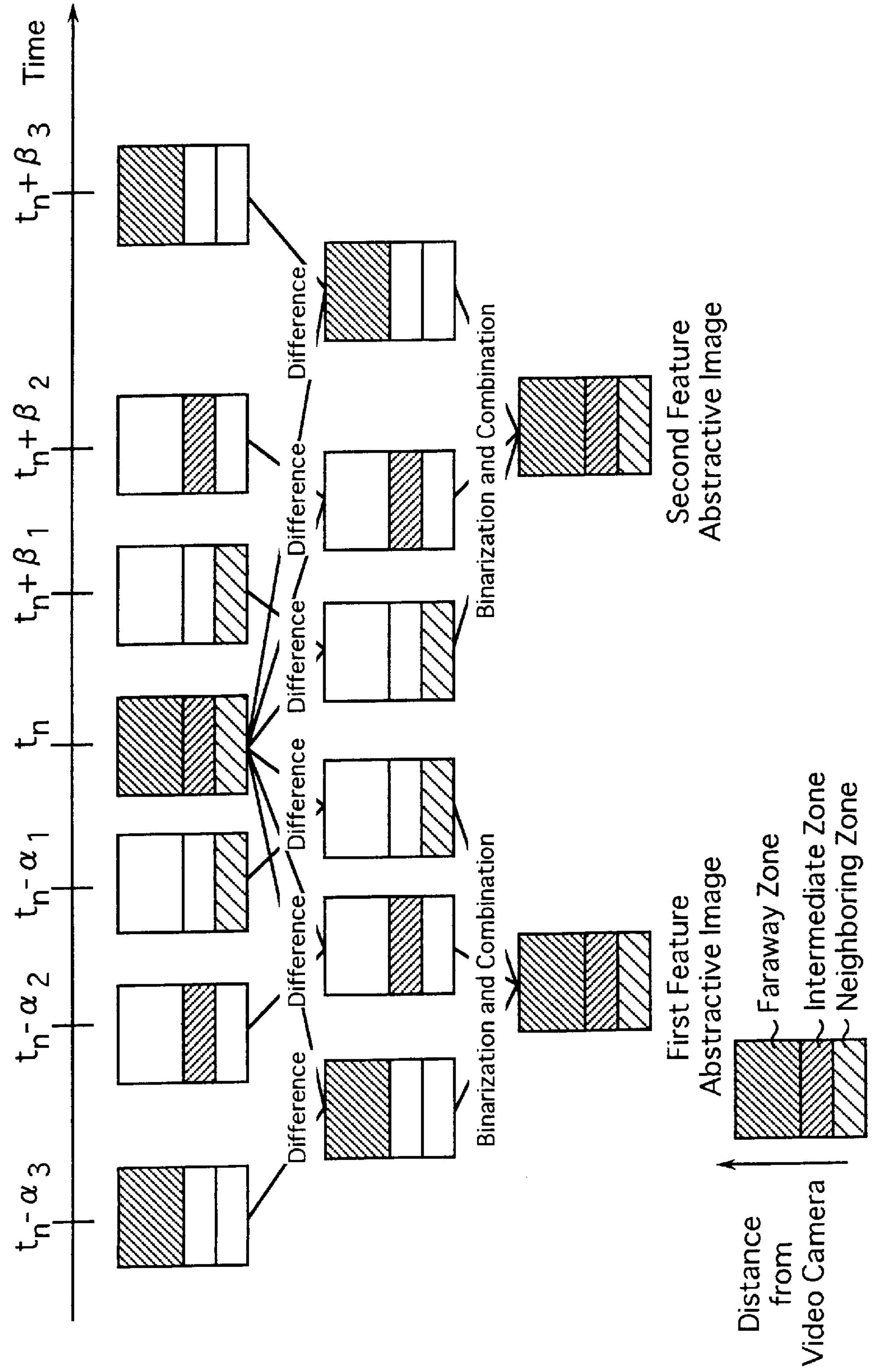
FIG. 11 is a view showing relationships between images formed in the steps S3*a* through S3*k* of the flowchart shown in FIG. 10.
Figure 12:
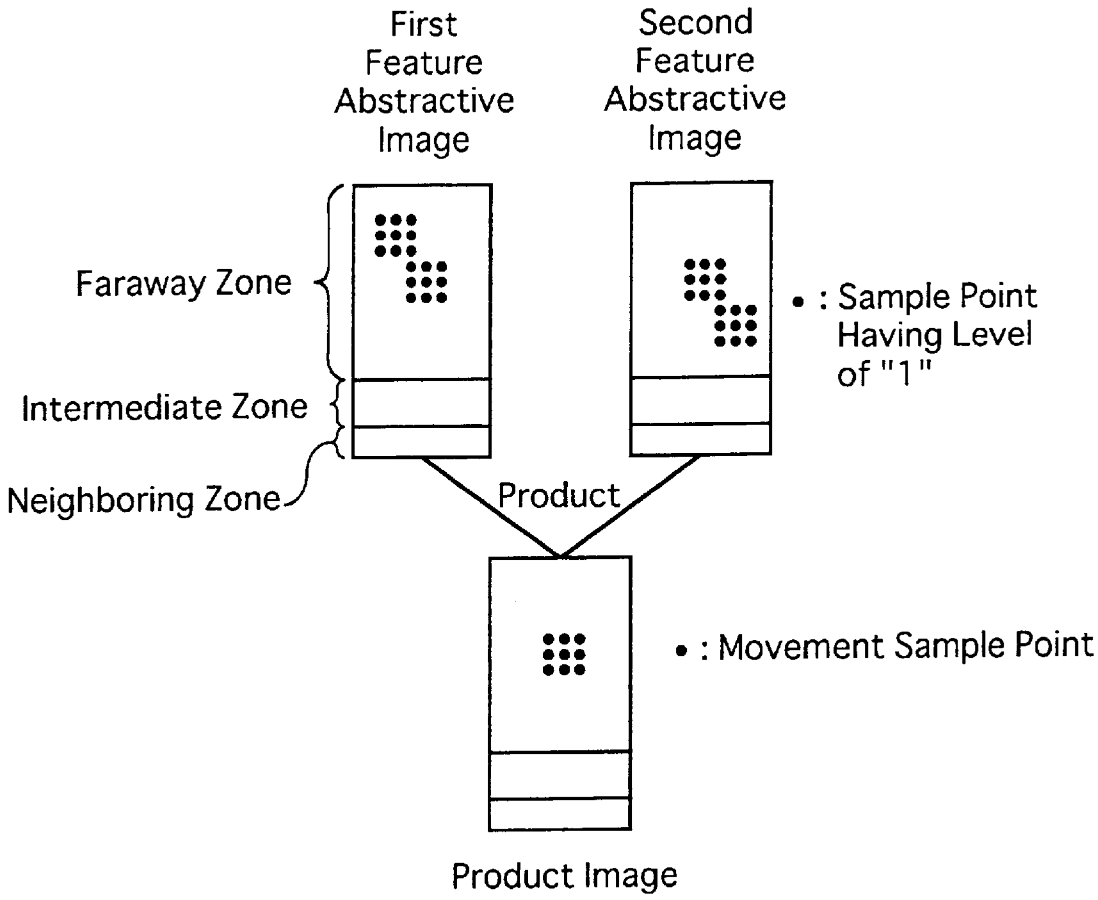
FIG. 12 is a view showing relationships between first and second feature abstractive images formed in the steps S3*j* and S3*k*, respectively, of the flowchart shown in FIG. 10 and a product image formed in the step S3*l* of the flowchart shown in FIG. 10.

The process of detecting the movement sample points performed in step S3 shown in FIG. 4 is described in detail hereinlater with reference to FIG. 10 showing a flowchart formed by steps S3*a* through S3*m*. The process will be understood with ease, provided that FIGS. 11 and 12 are referred to in each step.

In step S3*a*, the sample point image is divided into a plurality of image zones, the number of which is designated by "M". In the present embodiment, the sample point image is divided into three different image zones consisting of a faraway image zone which corresponds to an actual area remote from the video camera, a neighboring image zone which corresponds to an actual area near to the video camera, an intermediate image zone located between the faraway image zone and the neighboring image zone. M is, therefore, equal to 3 in the present embodiment. Step S3*b* determines time intervals $\alpha_m$ and $\beta_m$ that are used for judging the mth image zone and threshold levels TH1 and TH2 that are used for the following binarization process. Note that the time intervals $\alpha_m$ and $\beta_m$ are positive, $\alpha_1<\alpha_2<\alpha_3$, and $\beta_1<\beta_2<\beta_3$. The reason why the time intervals $\alpha_m$ and $\beta_m$ are thus determined is described hereinlater. In appearance, the velocity of the vehicle represented in an image zone corresponding to an actual area near to the video camera is higher than that of the vehicles represented in an image zone corresponding to an actual area remote from the video camera. For this reason, in the image zone near to the video camera, the velocity of the vehicle can be detected with easy by comparing the sample point images taken at different times between which there is a short time interval. Consequently, the time intervals $\alpha_m$ and $\beta_m$ used for selecting the sample points in the neighboring image zone corresponding to the actual area near to the video camera may be short. On the other hand, in the faraway zone corresponding to the actual area remote from the video camera, the velocity of the vehicle can be scarcely detected by comparing the sample point images taken at different times between which there is a short time interval. Consequently, the time intervals $\alpha_m$ and $\beta_m$ use for selecting the sample points in the faraway image zone corresponding to the actual area remote from the video camera may be long. The time intervals $\alpha_m$ and $\beta_m$ may be different from each other however, the time intervals $\alpha_m$ and $\beta_m$ are preferably equal to each other.

When step S3*b* leads to step S3*c*, the sample point images are formed from the images taken at times $t_n$, $t_n-\alpha_m$ and $t_n+\beta_m$. Step S3*d* calculates a first difference image zone indicative of a difference in brightness between the mth image zone of the sample point image taken at the time $t_n$ and the mth image zone of the sample point image taken at the time $t_n-\alpha_m$. The first difference image zone is binarized with the threshold level TH1 determined in step S3*b* to calculate a first feature abstractive image zone in step S3*e*. This results in the fact that each of the sample points in the first feature abstractive image zone has a level of "0" or "1".

Step S3*f* calculates a second difference image zone indicative of a difference in brightness between the mth image zone of the sample point image taken at the time $t_n$ and the mth image zone of the sample point image taken at the time $t_n+\beta_m$. Step S3*f* leads to step S3*g* in which the second difference image zone is binarized with the threshold level TH2 determined in step S3*b* to calculate a second feature abstractive image zone. This means that each of the sample points in the second feature abstractive image zone has a level of "0" or "1".

By virtue of steps S3*h* and S3*i* following step S3*g*, steps S3*b* through S3*g* are repeated until m is equal to M. Accordingly, three first feature abstractive image zones and three second feature abstractive image zones are calculated. In step S3*j*, all of the first feature abstractive image zones are combined to form a first feature abstractive image. Likewise, in step S3*k*, all of the second feature abstractive image zones are combined to form a second feature abstractive image.

In step S3*l*, a product image is formed by calculating a product of the first feature abstractive image and the second feature abstractive image. The sample points each having the level indicated by "1" are detected as the movement sample points in step S3*m*. FIG. 12 shows the relationships between the product image and the first and second feature abstractive images.

The reason why the movement sample points are detected on the basis of the sample point image taken at the time $t_n$ and the two sample point images respectively taken before and after the time $t_n$ is described below. If the movement sample points are detected on the basis of the sample point image taken at the time $t_n$ and only one of two sample point images taken before and after the time $t_n$, the sample points indicative of the moving vehicle not represented in the sample point image at the time $t_n$ remain in the feature abstractive image as will be understood from the first or second feature abstractive image shown in FIG. 12. This means that the movement sample points cannot be detected on the basis of only one of the first and second feature abstractive images.

If the time intervals $\alpha_m$ and $\beta_m$ are appropriately controlled in the process of detecting the movement sample points, it is possible that the sample points indicative of the low speed moving vehicle, which is moving at 20 km/h or lower, are prevented from being detected as the movement sample points. The present embodiment, therefore, can be applied to measurement for the traffic congestion caused by the low speed vehicles by appropriately controlling the time intervals $\alpha_m$ and $\beta_m$.

Figure 13:
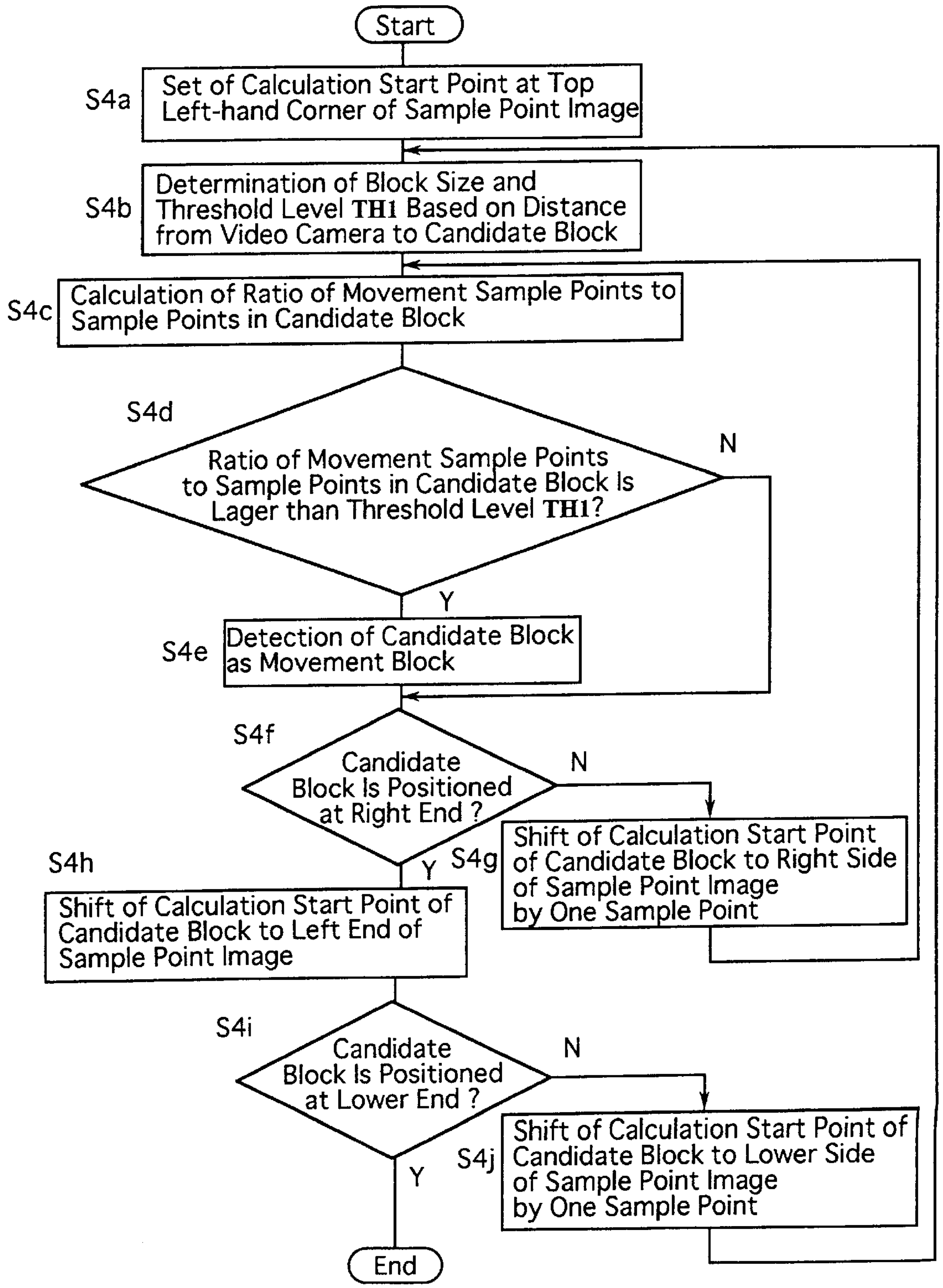
FIG. 13 is a flowchart showing detailed steps as a whole forming the step S4 of the flowchart shown in FIG. 4.

The process of detecting the movement blocks in step S4 shown in FIG. 4 is described in detail hereinlater with reference to FIG. 13 showing a flowchart formed by steps S4*a* through S4*j*.

In step S4*a*, a calculation start point is set to the sample point located at the top left-hand corner of the sample point image. It is assumed that candidate blocks which might be detected as the movement blocks are rectangular blocks each partially forming the sample point image and formed by a plurality of sample points adjacent to one another and arranged in the form of a matrix array. In step S4*b*, the size of each of the candidate blocks and a threshold level TH1 utilized for binarizing the sample points in each of the candidate blocks are determined in accordance with an actual route distance from the video camera to an actual location on the road corresponding to a position of each of the candidate blocks in the image. Step S4*c* calculates a ratio of the movement sample points included in the candidate block to all of the sample points contained in the same candidate block. In step S4*d*, a judgment is made upon whether the ratio of the movement sample points to all of the sample point in the candidate block is larger than the threshold level TH1 determined in step S4*b*. If the answer in step S4*d* is an affirmative "YES", step S4*d* leads to step S4*e* in which the candidate block is detected as the movement block. If the answer in step S4*d* is a negative "NO", step S4*d* leads to step S4*f*. By virtue of steps S4*f* and S4*g*, steps S4*c* through S4*e* are repeated until judgments whether all of the candidate blocks aligned in a row by one sample point pitch are movement blocks or not are finished.

Step S4*f* is followed by step S4h in which the calculation start point is shifted to the left side end in the sample point image. By virtue of steps S4*i* and S4*j*, steps S4*b* through S4*h* are repeated. In the other hand, the calculation point is shifted to a lower side of the sample point image (the downstream side toward which the vehicles run) in the detecting process for the candidate blocks aligned in a row and the process is repeated. This results in the fact that the judgments whether all of the candidate blocks aligned in a row are movement blocks or not are repeated all over the rows, thereby making it possible to detect all of the movement blocks included in the sample point image.

Figure 14:
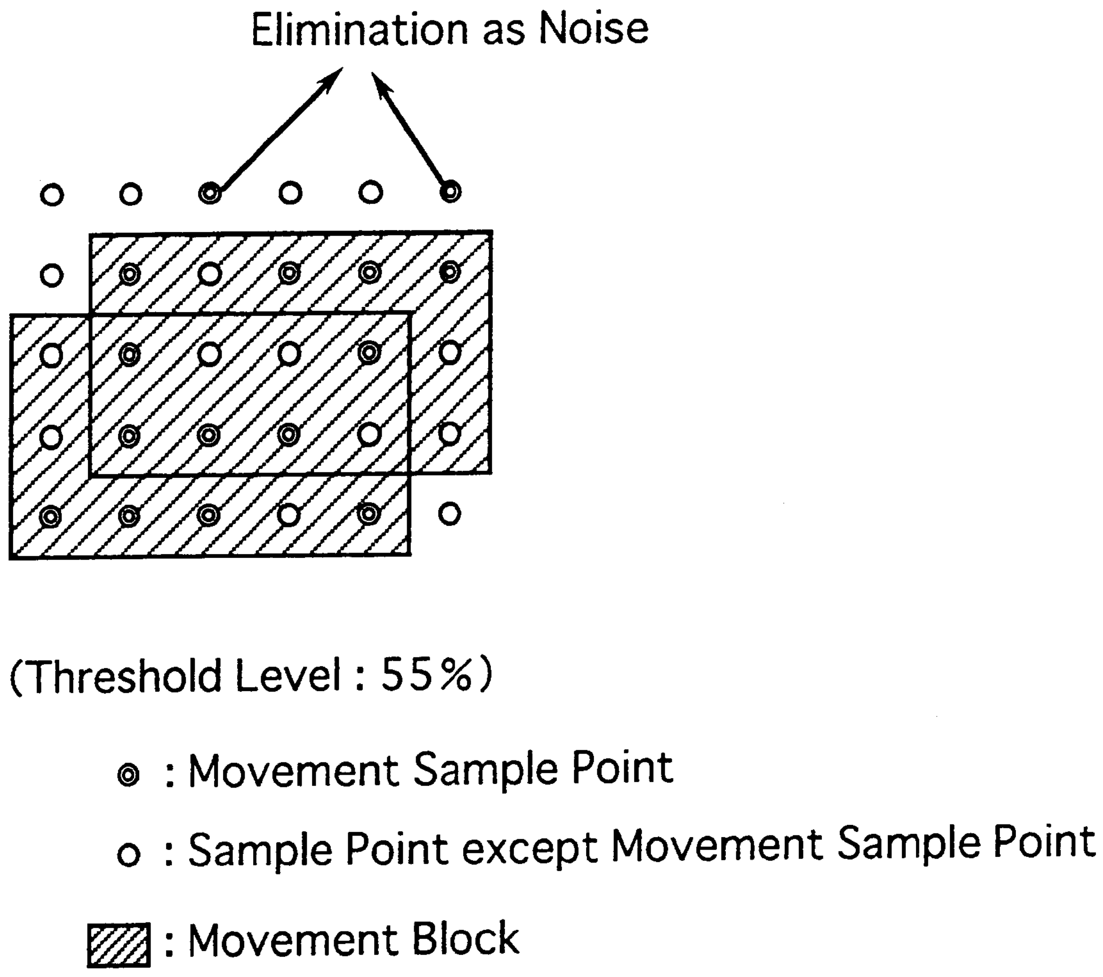
FIG. 14 is a view showing movement blocks detected in the step S4 of the flowchart shown in FIG. 10.

FIG. 14 shows, by way of example, two detected movement blocks overlapping with each other. Each of the movement blocks shown in FIG. 14 is formed by five columns of three sample points. The movement sample points are denoted by "●" and the sample points except the movement sample points are denoted by "○". The ratio of the movement sample points to all of the sample points contained in each of the movement blocks shown in FIG. 14 is 60%. In this case, the threshold level TH1 used for judging the candidate block is 55%. As shown in FIG. 14, the movement sample points excluded from the movement blocks are eliminated as noises.

In the aforesaid step S4*b*, the size of each of the candidate blocks i.e., the total number of the sample points contained in each of the candidate blocks, and the threshold level TH1 may be determined as follows. Each of the candidate blocks may be substantially equal in size to an average vehicle represented in the image and, accordingly, roughly indicative of the outline of one vehicle in the sample point image. In the faraway image zone corresponding to the actual area remote from the video camera, the candidate block becomes smaller because of the fact that the vehicle image becomes smaller. In the neighboring image zone corresponding to the actual area near to the video camera, the candidate block becomes larger because of the fact that the vehicle image becomes larger. In the meantime, the threshold level TH1 used for judging the candidate blocks in the faraway image zone remote from the video camera is decreased because of the fact that a difference in brightness between the adjoining picture elements in the candidate block is small. Conversely, the threshold level TH1 used for judging the candidate blocks in the neighboring image zone near to the video camera is increased. If the size of the candidate block and the threshold level TH1 are thus determined, the movement blocks in the whole image can be detected with the same accuracy independently of an actual route distance between the video camera and a location on the road corresponding to a position of each of the candidate blocks.

Figure 15:
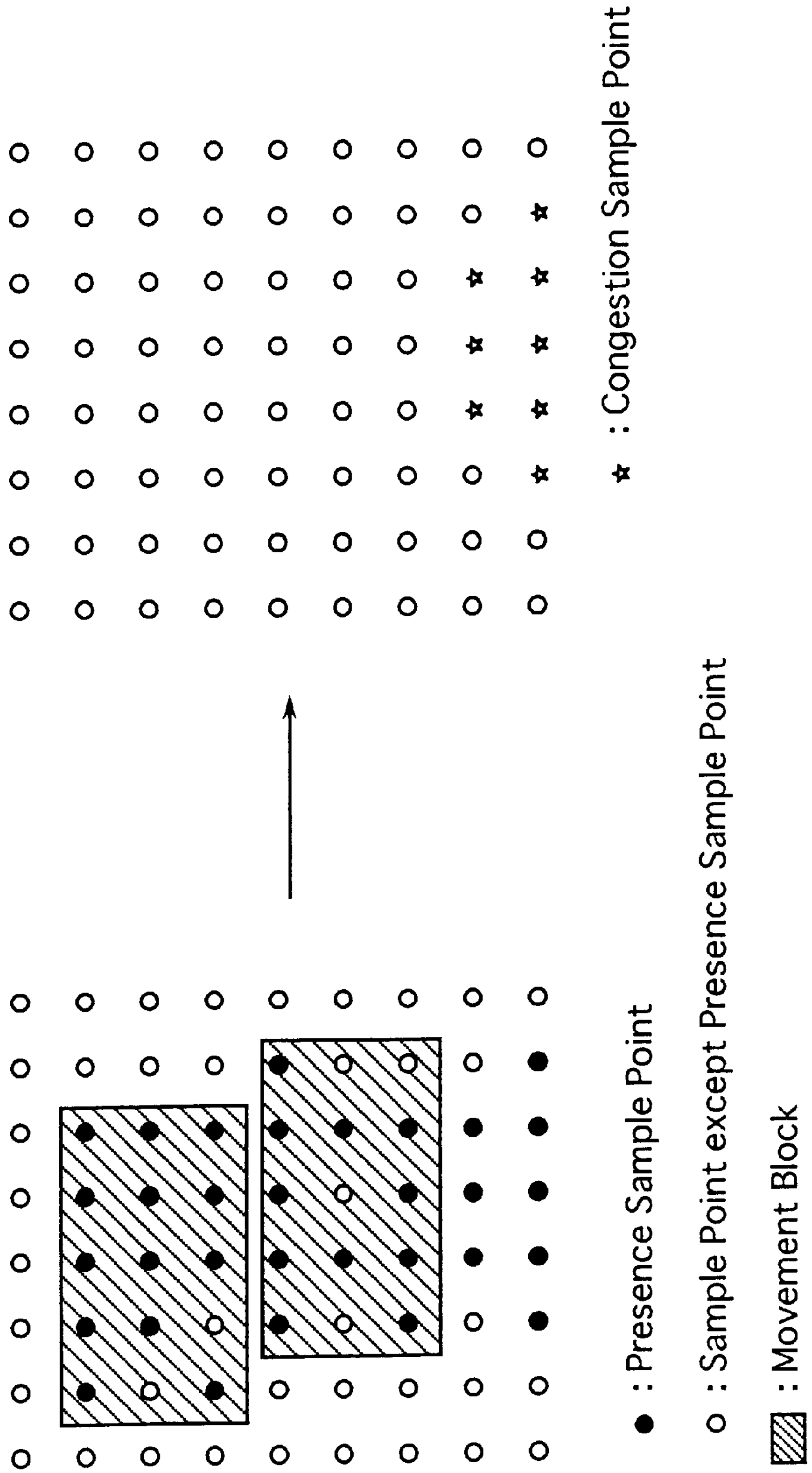
FIG. 15 is a view illustrated for explaining a manner in which congestion sample points are detected in the step S5 of the flowchart shown in FIG. 4.

In step S5 of the flowchart shown in FIG. 4, the presence sample points excluded from the movement blocks are detected as the congestion sample points. FIG. 15 shows, by way of example, the process of detecting the congestion sample points. The presence sample points are denoted by "●", the sample points except the presence sample points are denoted by "○" and the congestion sample points are denoted by "●".

Figure 16:
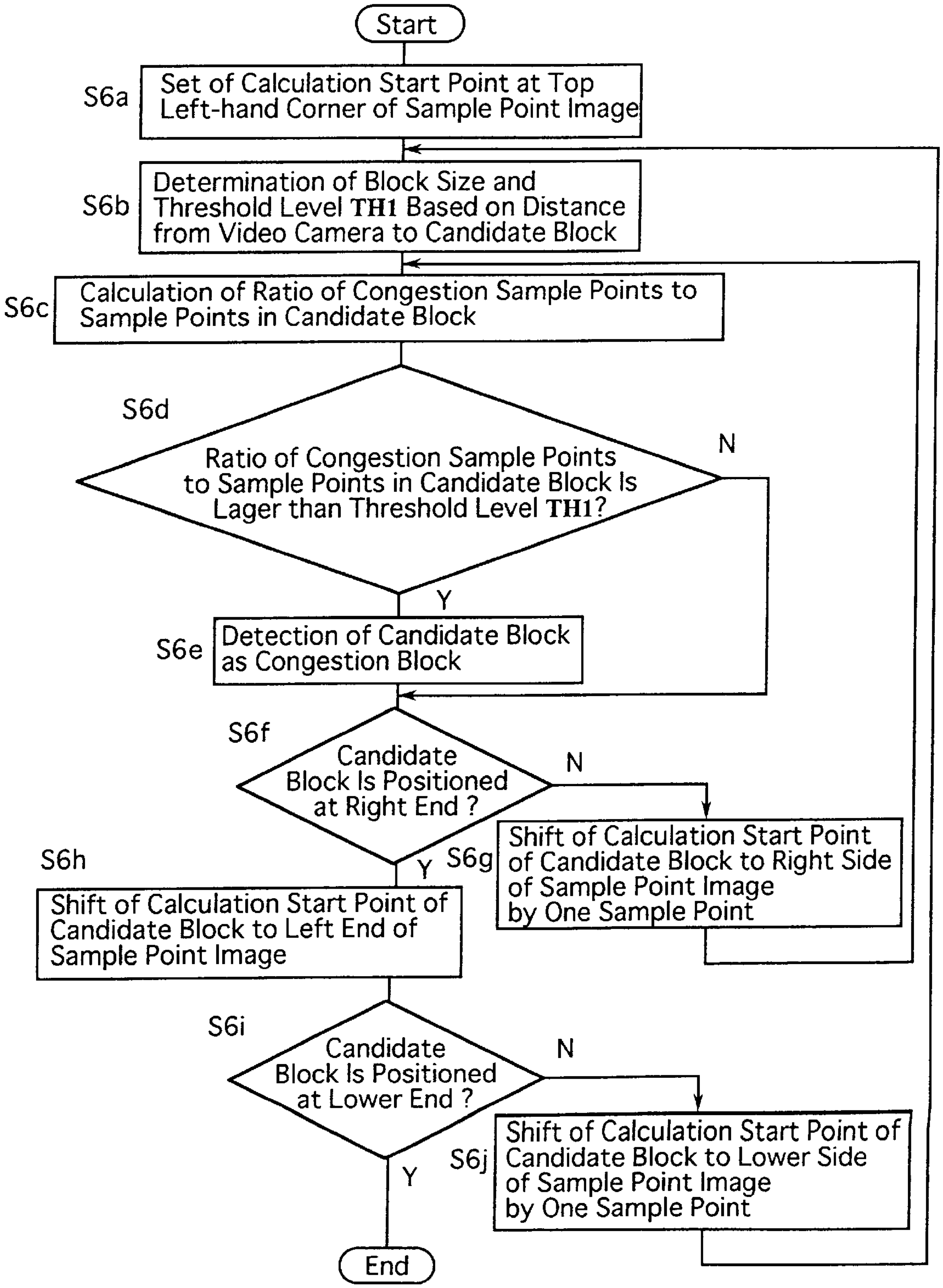
FIG. 16 is a flowchart showing detailed steps as a whole forming the step S6 of the flowchart shown in FIG. 4.

The process of detecting the congestion blocks performed in step S6 shown in FIG. 4 is described in detail hereinlater with reference to FIG. 16 showing a flowchart formed by steps S6*a* through S6*j*.

In step S6*a*, a calculation start point is set to the sample point located at the top left-hand corner of the sample point image. It is assumed that candidate blocks which might be detected as the congestion blocks are rectangular blocks each partially forming the sample point image and formed by a plurality of sample points adjacent to one another and arranged in the form of a matrix array. In step S6*b*, the size of each of the candidate blocks and a threshold level TH1 utilized for judging the sample points in each of the candidate blocks are determined in accordance with an actual route distance from the video camera to a location on the road corresponding to a position of each of the candidate blocks.

Step S6*c* calculates a ratio of the congestion sample points included in the candidate block to all of the sample points included in the same candidate block. In step S6*d*, a judgment is made upon whether the ratio of the congestion sample points to all of the sample points in the candidate block is larger than the threshold level TH1 determined in step S6*b*. If the answer in step S6*d* is an affirmative "YES" step S6*d* leads to step S6*e* in which the candidate block is detected as the congestion block. If the answer in step S6*d* is a negative "NO", step S6*d* leads to step S6*f*.

By virtue of steps S6*f* and S6*g*, steps S6*c* through S6*e* are repeated until judgments whether all of the candidate blocks aligned in a row by one sample point pitch are congestion blocks or not are finished.

Step S6*f* is followed by step S6*h* in which the calculation start point is shifted to the left side end in the sample point image. By virtue of steps S6*i* and S6*j*, steps S6*b* through S6*h* are repeated. In the other hand, the calculation point is shifted to a lower side of the sample point image (the downstream side toward which the vehicles run) in the detecting process for the candidate blocks aligned in a row and the process is repeated. This results in the fact that the judgments whether all of the candidate blocks aligned in a row are congestion blocks or not are repeated all over the rows, thereby making it possible to detect all of the congestion blocks included in the sample point image.

Figure 17:
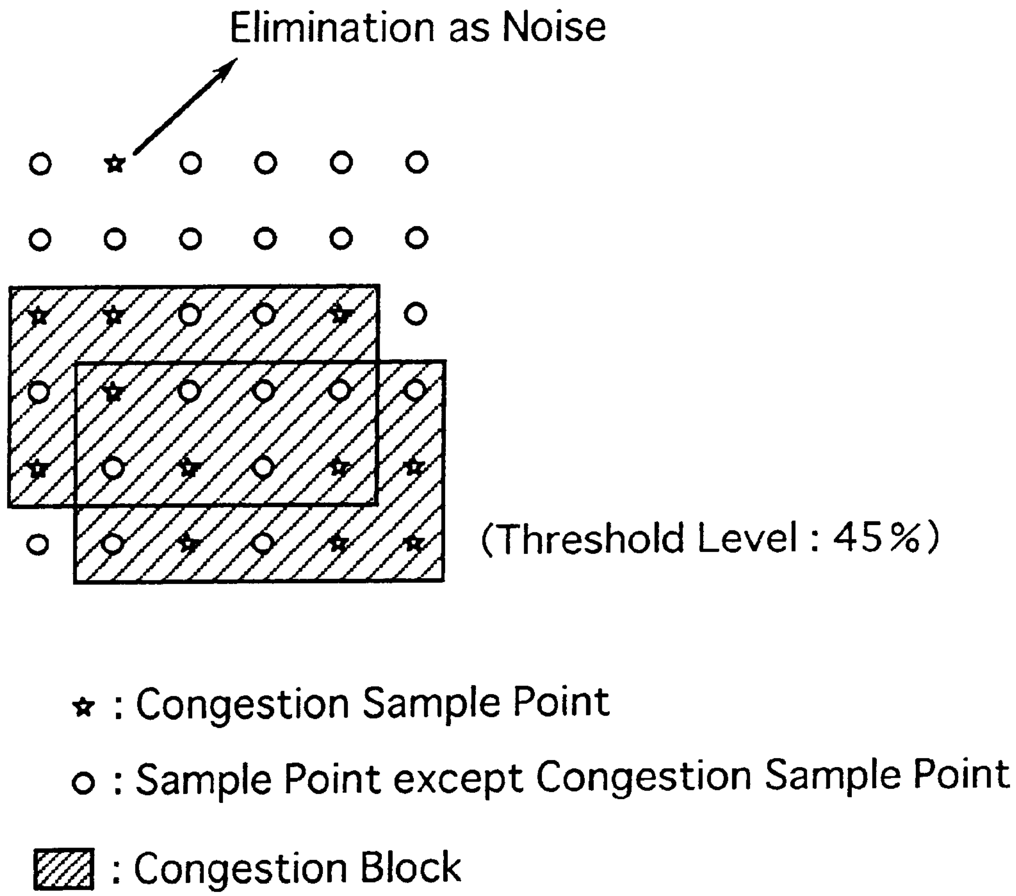
FIG. 17 is a view showing congestion blocks detected in the step S6 of the flowchart shown in FIG. 4.

FIG. 17 shows, by way of example, two detected congestion blocks overlapping with each other. Each of the congestion blocks shown in FIGS. 17 is formed by five columns of three sample points. The congestion sample points are denoted by "●" and the sample points except the congestion sample points are denoted by "○". In this case, the threshold level TH1 used for judging the congestion blocks is 45%. The ratio of the congestion sample points of all of the sample points contained in each of the congestion blocks shown in FIG. 17 is 47%. As shown in FIG. 17, the congestion sample points excluded from the congestion blocks are eliminated as noises.

In step S6*b*, the size of each of the candidate blocks i.e., the total number of the sample points contained in each of the candidate blocks, and the threshold level TH1 may be determined as follows. Each of the candidate blocks may be substantially equal in size to an average vehicle represented in the image and, accordingly, roughly indicative of the outline of one vehicle in the sample point image. In the faraway image zone corresponding to the actual area remote from the video camera, the candidate block becomes smaller because of the fact that the vehicle image becomes smaller. In the neighboring image zone corresponding to the actual area near to the video camera, the candidate block becomes larger because of the fact that the vehicle image becomes larger. In the meantime, the threshold level TH1 used for judging the candidate block in the faraway image zone remote from the video camera is decreased because of the fact that a difference in brightness between the adjoining picture elements in the candidate block is small. Conversely, the threshold level TH1 used for judging the candidate blocks in the neighboring image zone near to the video camera is increased. If the size of the candidate block and the threshold level TH1 are thus determined, the congestion blocks in the whole image can be detected with the same accuracy independently of an actual route distance between the video camera and a location on the road corresponding to a position of each of the candidate blocks.

Figure 18:
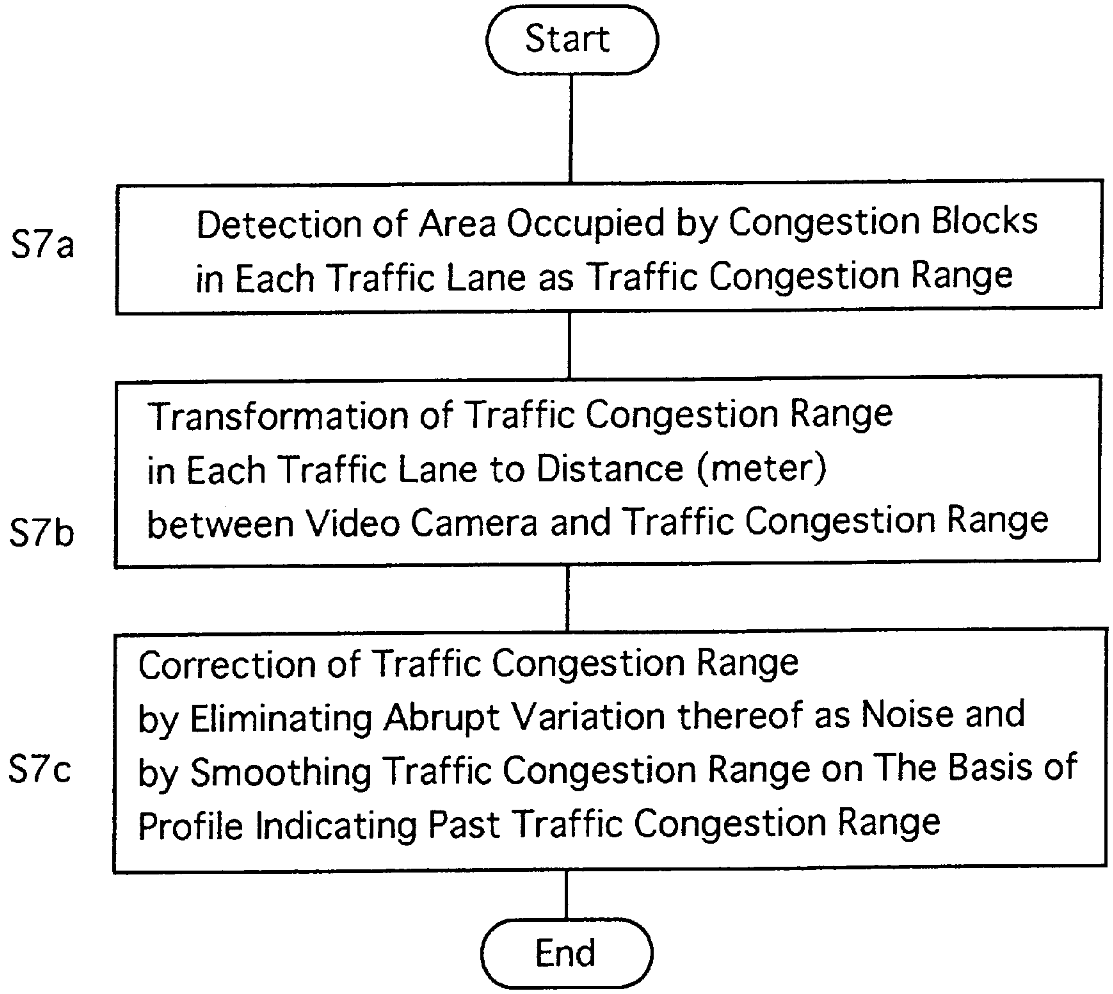
FIG. 18 is a flowchart showing the detailed steps as a whole defining the step S7 of the flowchart shown in FIG. 4.

The process of measuring the state of traffic congestion in step S7 shown in FIG. 4 is described in detail hereinlater with reference to FIG. 18 showing a flowchart formed by steps S7*a* through S7*c*.

Figure 19:
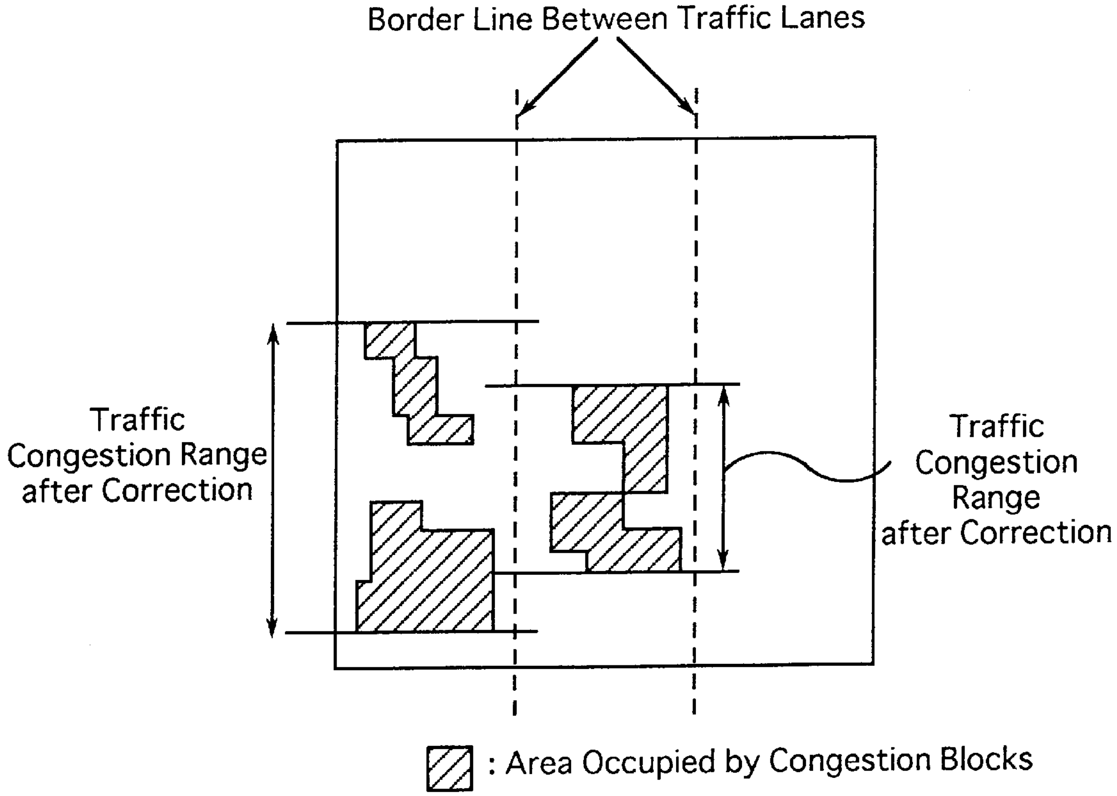
FIG. 19 is a view showing relationships between traffic congestion ranges detected in the step S7*a* of the flowchart shown in FIG. 18 and the corrected traffic congestion ranges obtained in the step S7*c* of the flowchart shown in FIG. 18.

In step S7*a*, the congestion blocks in each of the traffic lanes is detected as traffic congestion ranges per traffic lane. Each of the traffic congestion ranges contains a single congestion block or a plurality of congestion blocks connected to or overlapping with one another. FIG. 19 shows, by way of example, a measurement area including the congestion blocks. If there is one congestion block included in both of two traffic lanes, it is determined that the congestion block belongs to one of the traffic lanes including a larger part of the congestion block.

In step S7*b*, the traffic congestion ranges per traffic lane is transformed to actual traffic queue lengths on the road with reference to the foregoing distance table. In step S7*c*, the abrupt variations of the traffic congestion ranges in position are eliminated as noises on the basis of a profile indicating the positions of past traffic congestion. At the same time, the positions of the current traffic congestion are corrected through smoothing process. As a result, the traffic congestion ranges are corrected and outputted as conclusive measurement results.

According to the aforesaid embodiment, not all of the picture elements contained in the image but the sample points corresponding to part of the picture elements contained in the image are processed, so that data produced in the calculation process can be extremely decreased in quantity. Hence, the traffic congestion measuring apparatus can be simplified in hardware and reduced in cost. In addition, the traffic congestion measuring apparatus can process the image at high speed and, accordingly, measure the state of traffic congestion in real time. More specifically, the measurement result can be outputted within one or two seconds, i.e., (the longest time interval)+(processing time). The present invention is, therefore, extremely suitable for the present embodiment of the traffic control system designed to control the green or yellow light of the traffic signals. As will be appreciated from the foregoing description of the embodiment, it is possible that the traffic congestion measuring apparatus starts to measure the state of the traffic congestion without the previously learning and with accuracy immediately after the setup of the apparatus is completed. In addition, the traffic congestion measuring apparatus can be stably operated to measure the state of the traffic congestion independently of the variations in circumstances such as locations, time, weather and traffic densities. The traffic congestion measuring apparatus can also measure the traffic queue length with ease.

Each of the various parameters serving as criterion levels in the various judgments is varied in accordance with an actual route distance from the video camera to a location on the road corresponding to a position of each of the sample points, so that the resulting measurement is extremely enhanced in accuracy. Since the various parameters are automatically determined in accordance with the actual route distance from the video camera to the location on the road corresponding to position of each of the sample points, the traffic control system is managed with great facility. There is no need for the traffic congestion measuring apparatus to consider the traffic lanes until the final output timing. The vehicle which is present over both of two traffic lanes can be detected as a vehicle caught up in the traffic congestion, so that the traffic congestion measuring apparatus is stably operated to measure the state of the traffic congestion. Based on the detected movement sample points and the detected congestion sample points, a moving vehicle and a vehicle caught up in the traffic congestion are detected as the movement block and the congestion block, respectively. Hence, the movement sample point and the congestion sample point respectively excluded from the movement block and the congestion block are eliminated as noises with facility. When a plurality of video cameras and a plurality of traffic congestion measuring units are arranged along the road and when the adjoining video cameras spaced apart from each other at a distance covered by the video camera, the traffic control system can be operated to measure the state of traffic congestion over a long distance range. In the present embodiment, the state of traffic congestion in the whole measurement area is not estimated from measurement results in a local part of the measurement area but directly measured, thereby enabling the traffic control system to quickly detect various accidents such as traffic accidents or vehicular accidents.

As will be appreciated from the foregoing description, the present embodiment is also a preferred embodiment of the image processing method and apparatus according to the present invention.

The aforesaid traffic congestion measuring units were set at two locations in Tokyo and Osaka, respectively, in 1995 and are operated practically. The measurement results of the field test will be described hereinafter.

(Measurement Results of Field Test in Tokyo)

(A) Measurement condition

Location: Uchisaiwai-cho Intersection in Tokyo

Environment: The field test was carried out under six different measurement conditions in view of various possible environments such as the weather (fine, cloudy and rainy), measurement time (daytime, twilight and night), traffic quantity (light traffic and heavy traffic).

(1) August 2nd, 15:00–17:00 (daytime, cloudy to rainy, heavy traffic)

(2) August 2nd, 18:30–20:30 (twilight and night, cloudy, heavy traffic)

(3) August 3rd, 14:45–16:45 (daytime, fine, heavy traffic)

(4) August 3rd, 18:30–20:30 (twilight and night, fine, heavy traffic)

(5) August 5th, 15:00–17:00 (daytime, cloudy, light traffic)

(6) August 5th, 18:30–20:30 (twilight and night, cloudy, light traffic)

(B) Measurement Method

Measurement area: An area covering two traffic lanes and having a length of 150 meters from the position at which the video camera is placed.

Judgment of traffic congestion: Vehicles in low speed motion are considered to be vehicles caught by traffic congestion;

When part of the vehicles caught by the traffic congestion is moving and when traffic queue following the moving vehicles is stationary, the position of the traffic congestion most remote from the intersection is judged to be a tail position of the traffic congestion;

The tail position of the traffic congestion is outputted every second and the average of peaks of the traffic queue lengths calculated every 5 minutes is considered as an average of peaks of the measurement values.

(C) Standard Evaluation of Measurement Results

The precision of the traffic congestion measurement results of are calculated by the following equation. Note that the following average of peaks of true value is an average of peaks of traffic queue lengths calculated every 5 minutes, the traffic queue lengths being calculated in simultaneous relationship to signal cycle.

[Traffic Congestion Measurement Precision (%)]=[{Average of Peaks of Measured Traffic Queue Length (meter)}÷{Average of Peaks of True Values of Traffic queue length (meter)}]×100 (iii)

(D) Evaluation of Precision

The precision of the traffic congestion measurement results under the aforementioned conditions (1)–(6) are described as follows:

| | | |
|---|---|---|
| (1): 95.4% | (2): 96.4% | (3): 98.6% |
| (4): 95.5% | (5): 98.2% | (6): 95.7% |

This means that the state of traffic congestion approximate to the true valve can be measured under every conditions. The peaks of the traffic queue length has the measurement precision higher than 95%.

(Measurement Results of Field Test in Osaka)

(A) Measurement condition

Location: Deyashiki-minami Intersection on JP Route 1 in Hirakata

Environment: The field test was carried out under five different measurement conditions in view of various possible environments such as the weather (fine and rainy), measurement time (daytime, twilight and night).

(1) August 30th, 20:45–21:15 (night, rainy)

(2) August 31st, 10:20–10:50 (daytime, rainy)

(3) September 4th, 11:00–11:30 (daytime, fine)

(4) September 4th, 18:20–18:50 (twilight, fine)

(5) September 4th, 19:30–20:00 (night, fine)

(B) Measurement Method

Measurement area: An area covering two traffic lanes and having a length of 100 meters from the position at which the video camera is placed.

Judgment of traffic congestion: Vehicles in low speed motion are considered to be a vehicle caught by traffic congestion.

When part of the vehicles caught by the traffic congestion is moving and when traffic queue following the moving vehicles is stationary, the position of the traffic congestion most remote from the intersection is judged to be a tail position of the traffic congestion;

Position of Traffic Congestion: One of two head positions of two traffic queues on the two traffic lanes nearer to the video camera is detected as the head position of the traffic congestion. One of two tail positions of two traffic queues on two traffic lanes more remote from the video camera is detected as the tail position of the traffic congestion.

The head and tail positions of traffic congestion are replaced with any of several output values described below, in accordance with a route distance from the video camera to the position of the traffic congestion.

| Distance x(m) from Camera Position | Output Value (meter) |
|---|---|
| 0 < x ≦ 10 | 10 |
| 10 < x ≦ 20 | 20 |
| 20 < x ≦ 30 | 30 |
| 30 < x ≦ 40 | 40 |
| 40 < x ≦ 50 | 50 |
| 50 < x ≦ 60 | 60 |
| 60 < x ≦ 75 | 75 |
| 75 < x ≦ 100 | 100 |

The head and tail positions of the traffic congestion are outputted every second.

(C) Measurement of True Value

In August 30th and 31st, true values indicative of head and tail positions of the traffic congestion indicated by any of distances of 10, 20, 30, 40, 50, 60 and 100 meters are measured with the eye from the image taken by the video camera.

In September 4th, true values indicative of head and tail positions of the traffic congestion are measured by measurement staff members stood at the locations of the route distances 50, 75 and 100 meters, respectively. The true head and tail positions of the traffic congestion indicated by any of distances of 10, 20, 30, 40 and 60 meters are measured with the eye from the image taken by the video camera.

(D) Standard Evaluation of Measurement Results

Based on the measurement results obtained through the traffic congestion measuring method according to the present invention, a measured total stagnating period is calculated depending upon upper one of two equations described below. Based on the true values of the head and tail positions of the traffic congestion, a true total stagnating period is calculated depending upon the upper equation. A ratio of the measured total stagnating period to the true total stagnating period is calculated depending upon lower one of the two equations.

[Total Stagnating Period (meter·sec)]=[Traffic Queue Length (meter)]×[Time(sec)]=[{Tail Position of Traffic Congestion (meter)}−{Head Position of Traffic Congestion (meter)}]×[time(sec)] (iv)

[Traffic Congestion Measurement Precision (%)]=[{Measured Value of Total Stagnating Period (meter·sec)}÷{True Value of Total Stagnating Period (meter·sec)}]×100 (v)

(E) Evaluation of Precision

The results of the measured value of the total stagnating duration (a), the true value of the total stagnating duration (b) and the traffic congestion measurement precision (c) under the aforementioned conditions (1)–(5) are described as follows:

| | (a) (m · sec) | (b) (m · sec) | (c) (%) |
|---|---|---|---|
| (1) | 42350 | 43775 | 96.7 |
| (2) | 36620 | 37135 | 98.6 |
| (3) | 38755 | 39030 | 99.3 |
| (4) | 45940 | 46695 | 98.4 |
| (5) | 44690 | 46465 | 96.2 |

This means that the state of traffic congestion approximate to the true value can be measured under every conditions. The total stagnating duration has the measurement precision higher than 96%.

Resulting from the evaluation of precision described above, the stable measurement of the traffic congestion queue length and the head and tail of the traffic congestion can be performed without respect to the measurement position, measurement time, the weather and the traffic quantity.

<Second Embodiment>

Referring to FIGS. 20 to 45 of the drawings, a second preferred embodiment of a traffic control system adopting traffic congestion measuring method and apparatus according to the present invention will be described in detail hereinafter.

Figure 20:
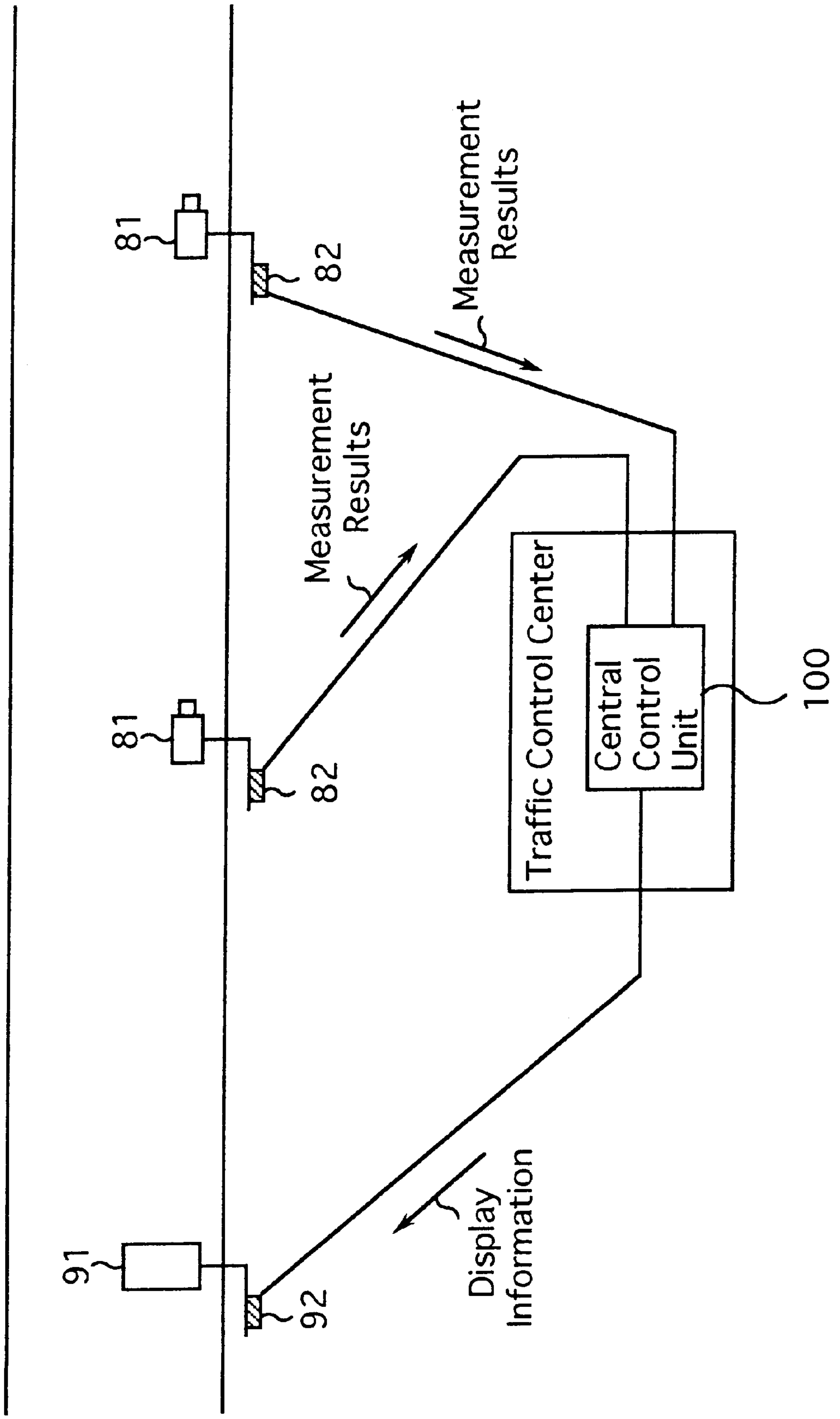
FIG. 20 is a schematic view showing a second preferred embodiment of a traffic control system utilizing traffic congestion measuring method and apparatus according to the present invention.
Figure 21:
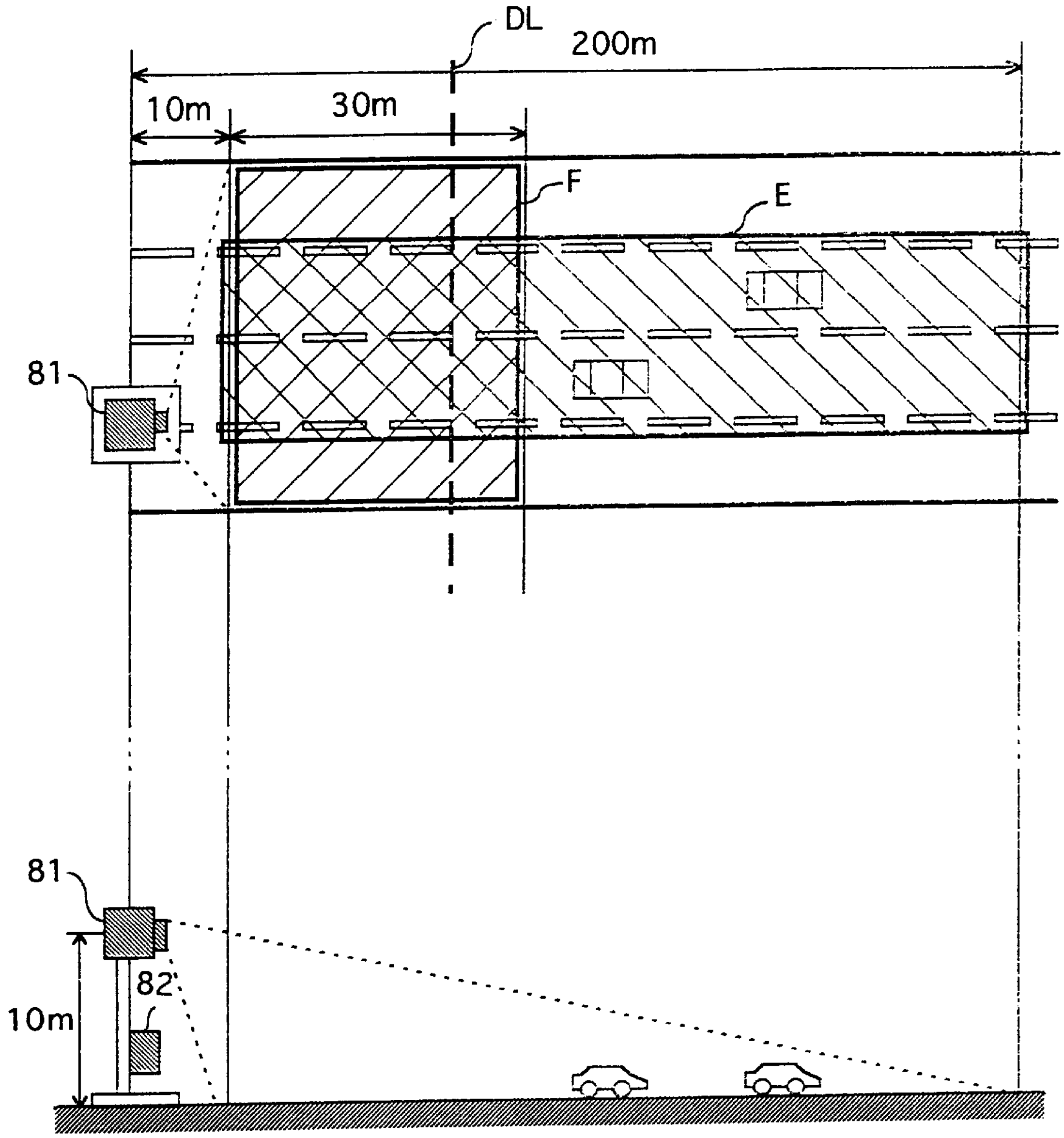
FIG. 21 is a view showing relationships between a spatial measurement area and a traffic flow measurement area which are measured by the traffic congestion measuring apparatus shown in FIG. 20.

The second embodiment of the traffic control system is shown in FIG. 20 as comprising video cameras 81, traffic congestion measuring units 82, an information display board 91, a display control unit 92 and a central control unit 100 that is located in a traffic control center. The video cameras 81 are positioned above a highway in spaced relationship to each other at a certain distance. As shown in FIG. 21, each of the video cameras 81 is directed from the upstream side of the highway toward the downstream side of the highway. This means that each of the video cameras 81 is intended to shoot rear side portions of the vehicles. Because the video cameras are thus fixed in the present embodiment, the traffic control system is able to measure the tail position of the traffic congestion range with accuracy. If, reversely, the traffic control system is intended to measure the head position of the traffic congestion range with accuracy, the video camera may be directed from the downstream side of the highway toward the upstream side of the highway, i.e., the video camera may be fixed so as to shoot front side portions of the vehicles.

The information display board 91 is positioned above the highway on the upstream side of the left side end video camera 81 shown in FIG. 20 and directed toward the upstream side of the highway. Each of the traffic congestion measuring units 82 is designed similarly to the traffic congestion units 21 to 24 of the first embodiment shown in FIG. 3. Although the repeated description of the traffic congestion measuring units 82 is omitted, various programs and initial setting values used for the measurement of the present embodiment differ from those used for the measurement of the first embodiment. Each of the traffic congestion measuring units 82 is designed to measure the state of the traffic congestion in both of a spatial measurement area E and a traffic flow measurement area F shown in FIG. 21. The traffic flow measurement area F extends over a distance of 30 meters from a line spaced apart from the video camera 81 at 10 meters and covers four traffic lanes. In the traffic flow measurement area F, the traffic congestion measuring unit is operated not only to detect the vehicles which are present in the area F but also to detect the number, the velocities, the lengths and the types of the vehicles which crosses a sense line DL. The measurement method in the traffic flow measurement area F is disclosed in detail in Japanese Patent Laid-open Publication No. 5-307695 and, for this reason, the description of the measurement method is omitted herein.

In the meantime, the spatial measurement area E extends over a distance of 200 meters from a line spaced apart from the video camera at 10 meters and covers two traffic lanes. In the spatial measurement area E, are measured spatial densities, spatial velocities and tail positions of traffic congestion. The manner of calculating these values will be apparent as the description proceeds.

The results of the measurement by the traffic congestion measuring units 82 are transmitted to the central control unit 100 in the traffic control center. The central control unit 100 is designed to produce traffic information, that is useful to drivers driving on the highway, on the basis of the received measurement results. The traffic information is transmitted from the central control unit 100 to the display control unit 92 and displayed on the screen of the information display board 91.

Figure 22:
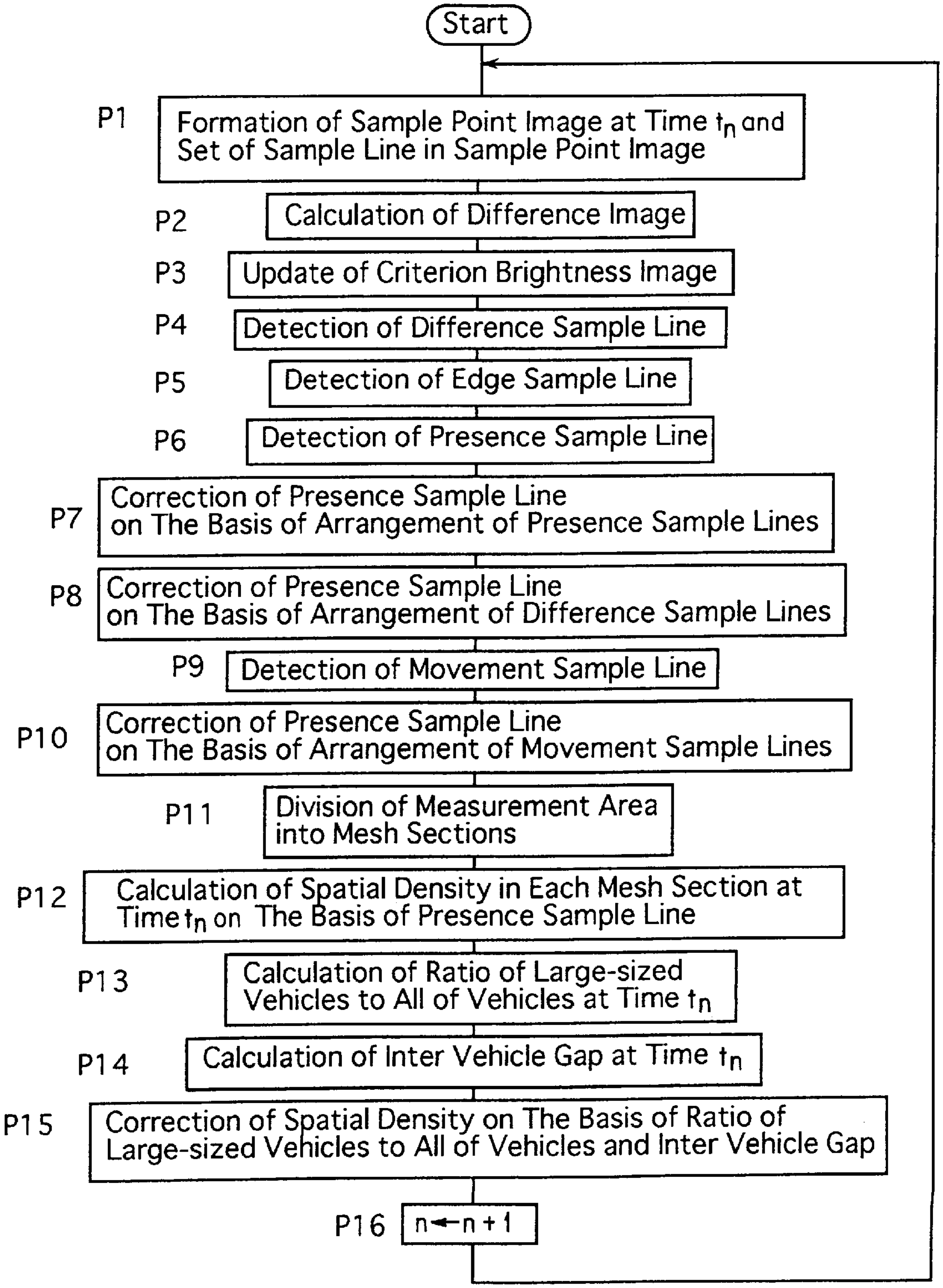
FIG. 22 is a flowchart showing steps of measuring spatial densities in the traffic congestion measuring system shown in FIG. 20.

The process of calculating the spatial densities performed by the traffic congestion measuring unit 82 thus constructed will be summarily described hereinlater with reference to FIG. 22 showing a flowchart formed by steps P1 through P16.

Figure 24:
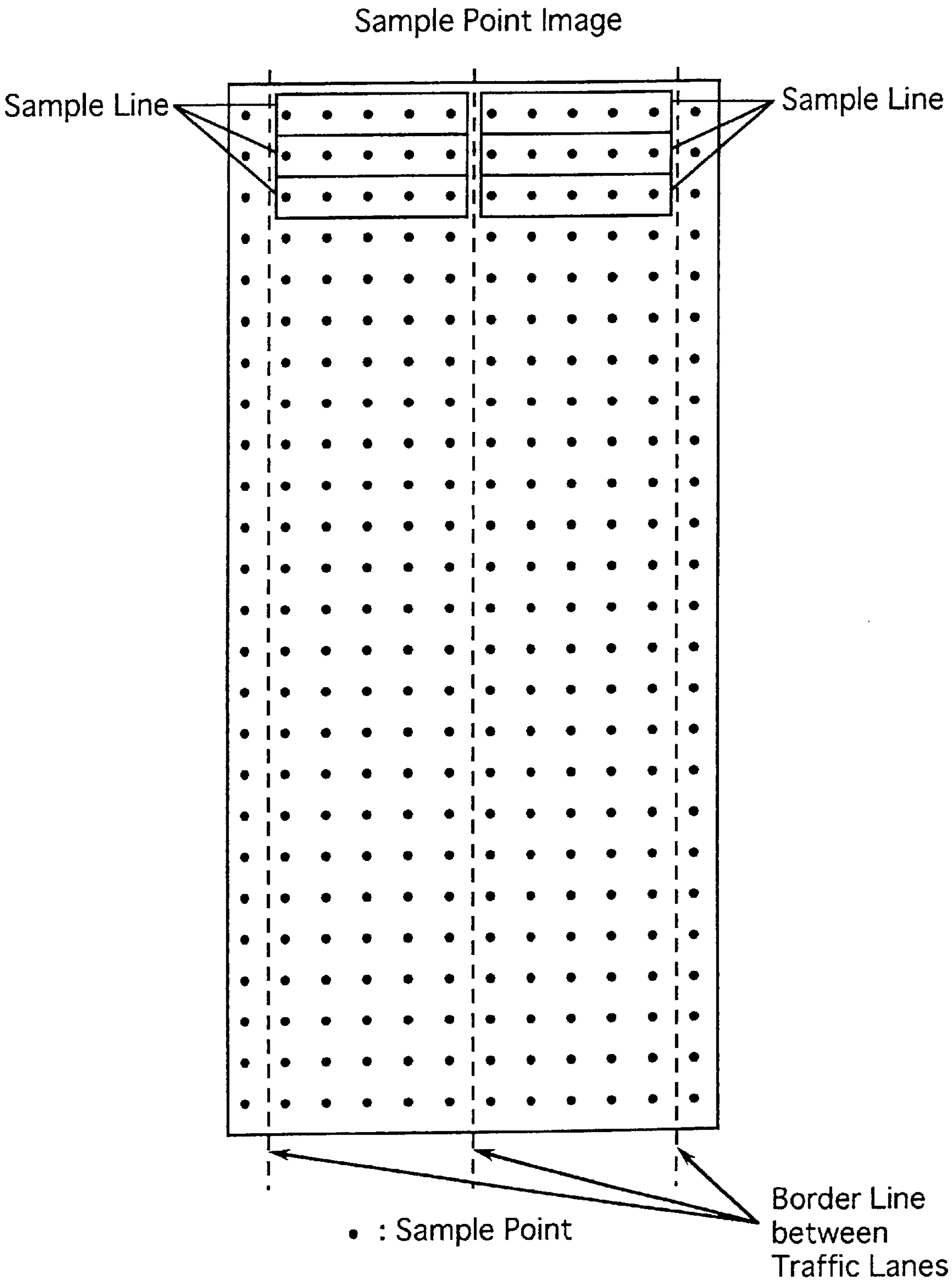
FIG. 24 is a view showing relationships between a sample point image formed in the step P1 of the flowchart shown in FIG. 22 and sample lines set in the same step.

In step P1, a sample point image is formed from the image taken at time $t_n$ and, subsequently, a plurality of sample lines are set in the sample point image. Because the sample point image of the present embodiment is formed similarly to that of the aforesaid first embodiment, the description of the manner of forming the sample point image is omitted herein. Each of the sample lines is formed by a plurality of sample points aligned on a line perpendicular to a direction in which the road extends. FIG. 24 shows relationships between the sample points and the sample lines in the sample point image.

Step P1 is followed by steps P2 and P3 which are similar to steps S2*c* and S2*d*, respectively, as shown in FIG. 7. The description of steps P2 and P3 is omitted herein with the intention of avoiding the repeated description.

In steps P4 and P5, difference sample lines and edge sample lines, respectively, are detected on the basis of the difference image. In step P6, presence sample lines are detected depending upon the difference sample lines and the edge sample lines detected in steps P4 and P5, respectively. Step P6 leads to step P7 in which the presence sample points are corrected on the basis of the arrangement of the presence sample lines. In step P8, the presence sample lines are further corrected on the basis of the arrangement of the difference sample lines detected in step P4.

In step P9, movement sample lines are detected as a function of three sample images taken at time $t_n$, time $t_n-\alpha_m$, and time $t_n+\beta_m$. In step P10, the presence sample lines are further corrected on the basis of arrangement of the movement sample lines.

In step P11, the measurement area is divide into a plurality of mesh sections. In step P12, the spatial density in each of the mesh sections at the time $t_n$ is calculated depending upon the presence sample line corrected in step P10.

Step P13 calculates a ratio of large-sized vehicles of all of the vehicles which are present in the measurement area at the time $t_n$. Step P14 calculates an inter vehicle gap of vehicles which are present in the measurement area at the time $t_n$. In step P15, the spatial density in each of the mesh sections is corrected depending upon the calculated large-sized vehicle ratio and the calculated inter vehicle gap.

In step P16, n is replaced with n+1 and the control is returned from step P16 to step P1. Note that n is a positive integer and that $|t_{n+1}-t_n|$ is constant. Steps P1 to P16 are, therefore, repeated at regular time intervals.

Figure 23:
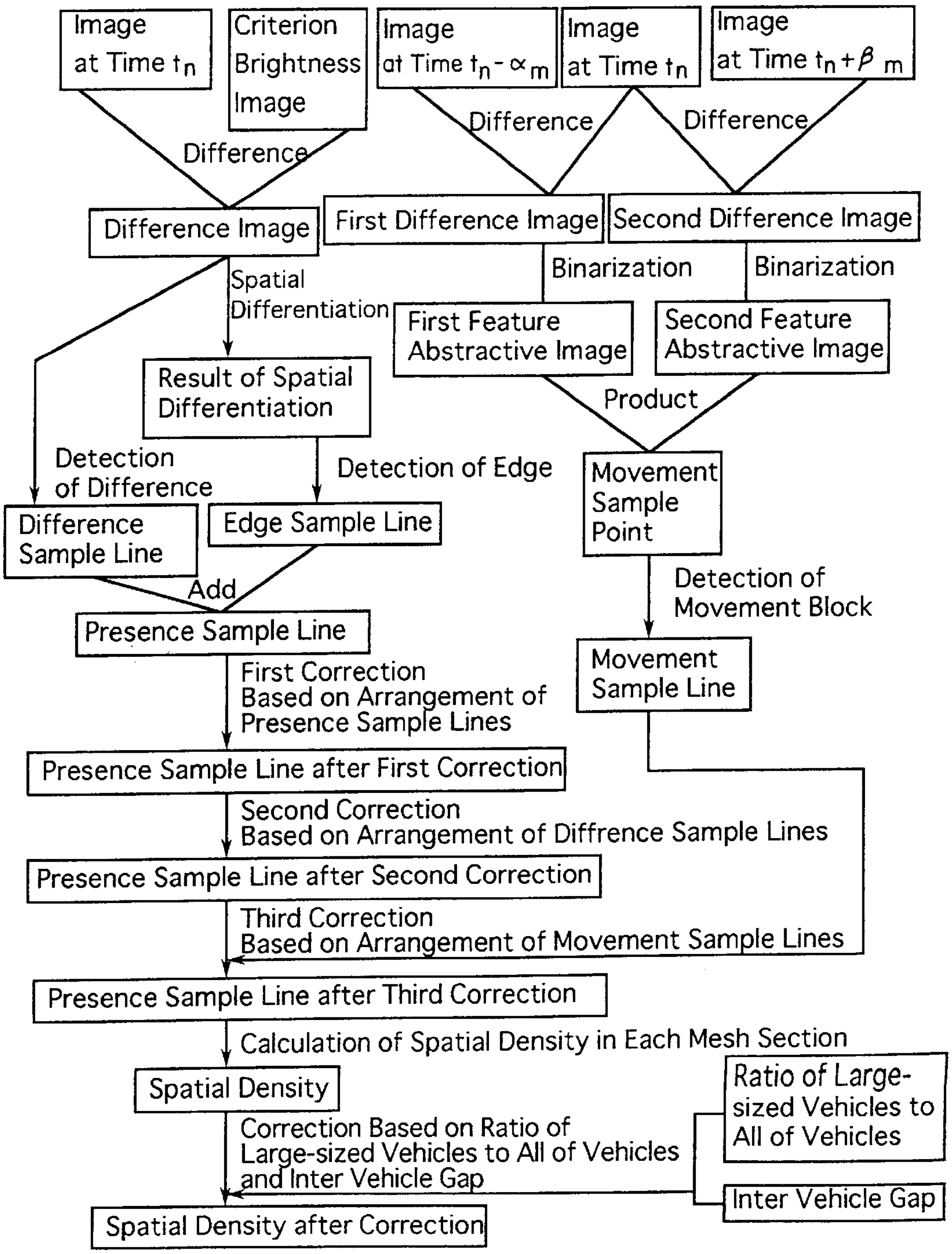
FIG. 23 is a view showing relationships between results of the calculation and the detection obtained in the steps of the flowchart shown in FIG. 22.

FIG. 23 is a view summarily showing relationships between the detection and the calculation results in steps P1 through P15. The detection and the calculation results will be apparent from the following detailed explanations of steps P1 through P15.

Figure 25:
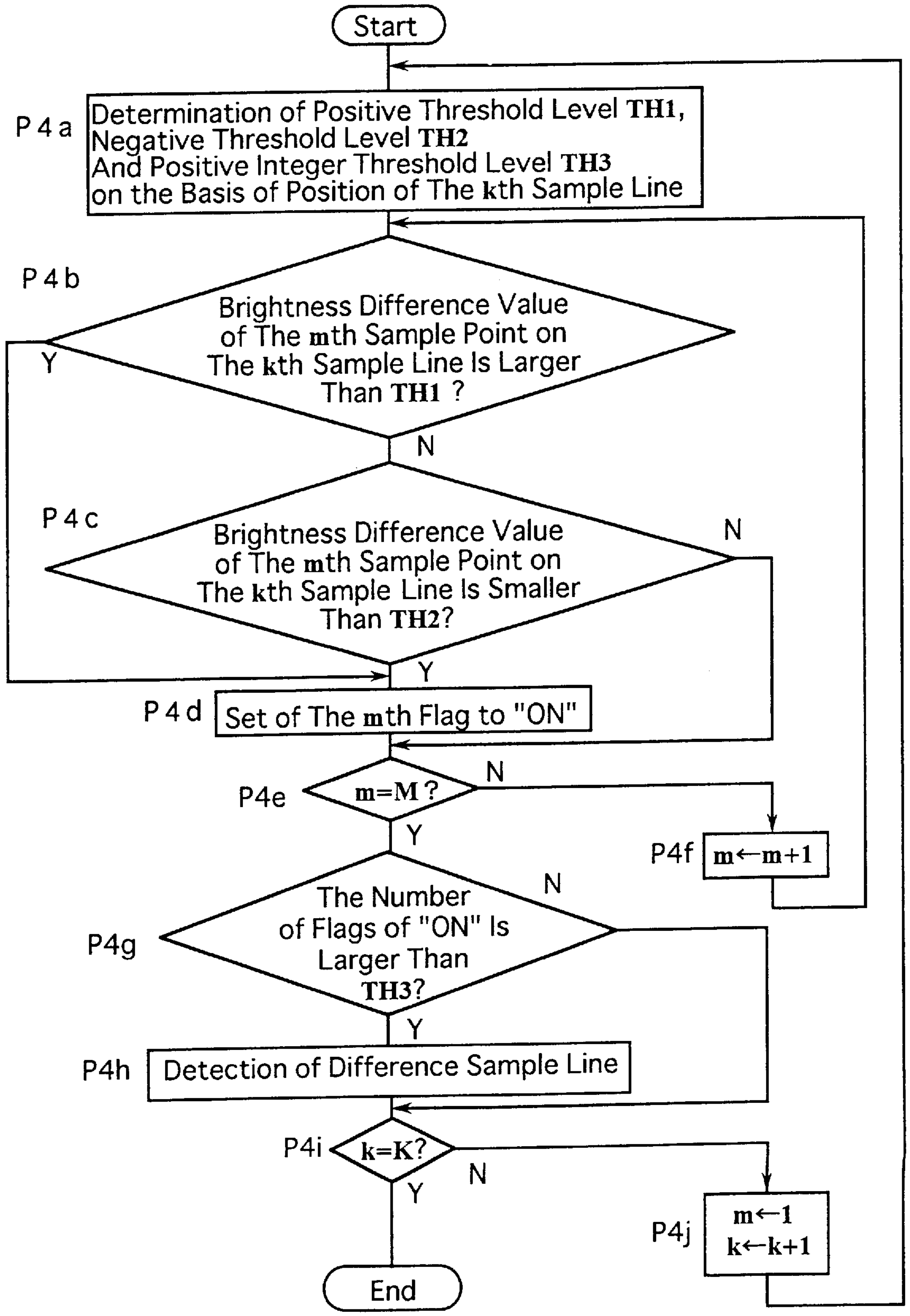
FIG. 25 is a flowchart showing a first example of detailed steps as a whole defining the step P4 of the flowchart shown in FIG. 22.

A first example of the process of detecting the difference sample lines performed in step P4 of FIG. 22 will be described in detail hereinlater with reference to FIG. 25 showing a flowchart formed by steps P4*a* through P4*j*.

In step P4*a*, a positive threshold level TH1, a negative threshold level TH2 and a positive integer threshold level TH3 are determined in accordance with an actual route distance from the video camera to a location on the road corresponding to kth sample line formed by M sample points. In step P4*b*, a judgment is made upon whether a brightness difference value of the mth sample point on the kth sample line is larger than the positive threshold level TH1 or not. Note that the brightness difference values belong to the sample points, respectively, in the difference image calculated in step P2 of FIG. 22.

If the answer in step P4*b* is an affirmative "YES", step P4*b* leads to step P4*d*. If the answer in step P4*b* is a negative "NO", step P4*b* leads to step P4*c*. In step P4*c*, a judgment is made upon whether the brightness difference value of the mth sample point on the kth sample line is smaller than the negative threshold level TH2 or not. If the answer in step P4*c* is an affirmative "YES", step P4*c* leads to step P4*d*. If the answer in step P4*c* is a negative "NO", step P4*c* leads to step P4*e*.

In step P4*d*, a flag relevant to the mth sample point on the kth sample line is set to "ON" condition and, subsequently, the control proceeds to step P4*e*. By virtue of steps P4*e* and P4*f*, steps P4*b* through P4*d* are repeated until m is equal to M. The repetition of steps P4*b* through P4*d* has the effect of judging whether the brightness difference values of all of the sample points on the kth sample line are larger than the positive level TH1 or not and smaller than the negative level TH2 or not.

In step P4*g*, a judgment is made upon whether the number of the flags set to "ON" condition exceeds the positive integer threshold level TH3 or not. If the answer in step P4*g* is an affirmative "YES", step P4*g* leads to step P4*h* in which the kth sample line is detected as the difference sample line. If the answer in step P4*g* is a negative "NO", step P4*g* leads to step P4*i*. By virtue of steps P4*i* and P4*j*, steps P4*a* through P4*h* are repeated until k is equal to K. Note that K is indicative of the number of all of the sample lines contained in one traffic lane within the measurement area. The repetition of steps P4*a* through P4*h* has the effect of detecting all of the difference sample lines included in one traffic lane within the measurement area.

The positive threshold level TH1 may be determined in step P4*a* as described below. The positive threshold value TH1 used for judging each of the sample lines becomes smaller as an actual route distance from the video camera to a location on the road corresponding to a position of each of the sample lines in the image becomes larger. Reversely, the negative threshold value TH2 used for judging each of the sample lines becomes larger as the actual route distance from the video camera to the location on the road corresponding to a position of each of the sample lines in the image becomes larger. The reason why the positive threshold value TH1 and the negative threshold value TH2 are thus determined is that an image area corresponding to an actual area remote from the video camera grows dimmer in comparison with that near to the video camera and, consequently, that a difference in brightness between the vehicle and the background represented in the image is decreased. Because the positive and negative threshold values TH1 and TH2 utilized for judging each of the sample lines are determined in accordance with the actual route distance from the video camera to the location on the road corresponding to the position of each of the sample lines in the image, all of the presence sample lines can be detected on an accuracy level with one another. The positive integer threshold level TH3 may be determined in step P4*a* as described below. The positive integer threshold value TH3 used for judging each of the sample lines becomes smaller as the actual route distance from the video camera to the location on the road corresponding to the position of each of the sample lines becomes larger, i.e., as a difference in brightness between the adjoining sample points on the sample line becomes smaller. Reversely, the positive integer threshold value TH3 becomes larger as the actual route distance from the video camera to the location on the road corresponding to the position of each of the sample lines becomes smaller, i.e., as the difference in brightness between the adjoining sample points on the sample line becomes larger. By determining the positive integer threshold level TH3 in this way, the difference sample lines in any position can be detected on an accuracy level with one another.

Figure 26:
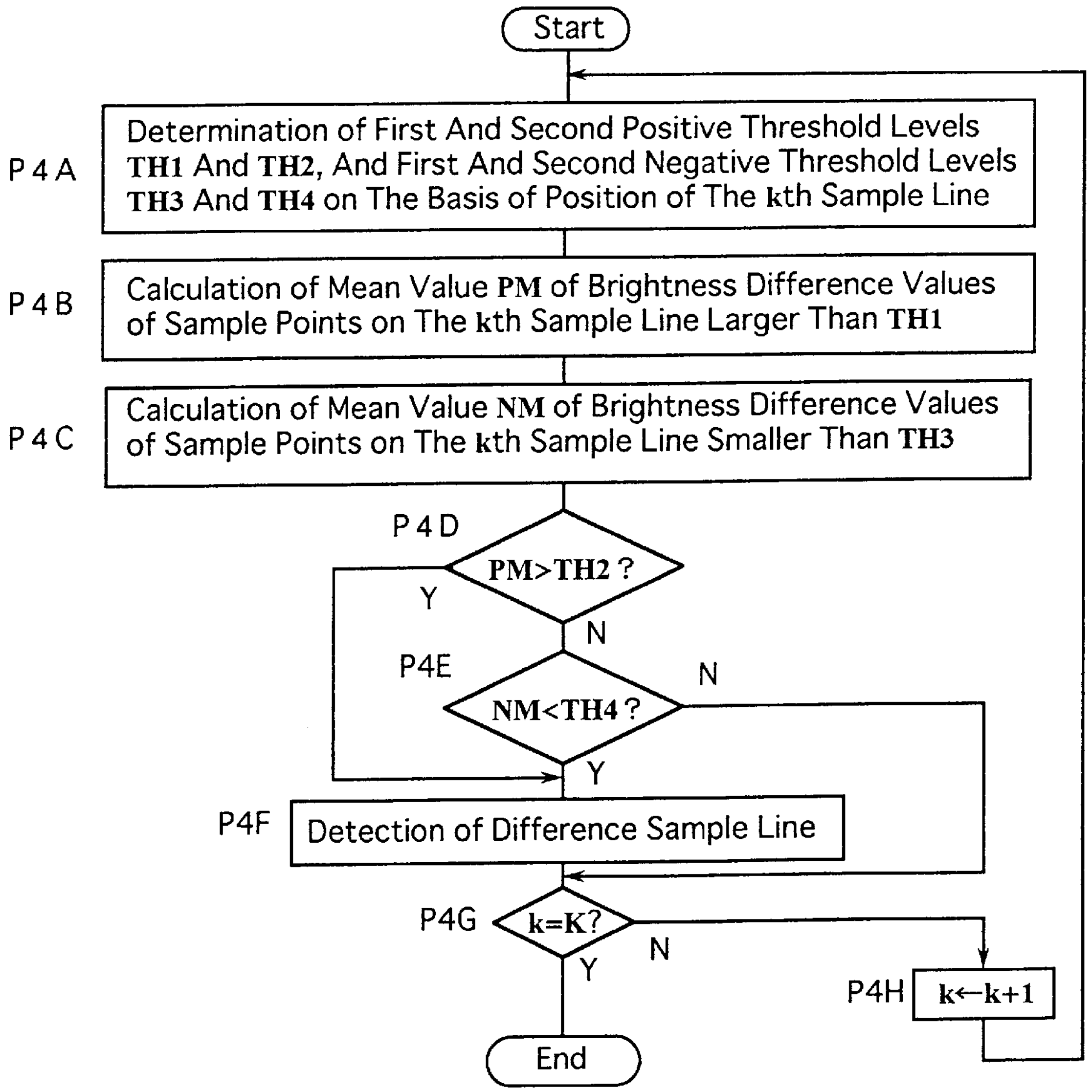
FIG. 26 is a flowchart showing a second example of detailed steps as a whole defining the step P4 of the flowchart shown in FIG. 22.

A second example of the process of detecting the difference sample lines performed in step P4 of FIG. 22 will be described in detail hereinlater with reference to FIG. 26 showing a flowchart formed by steps P4A through P4H.

In step P4A, first and second positive threshold levels TH1 and TH2 and first and second negative threshold levels TH3 and TH4 are determined in accordance with an actual route distance from the video camera to a location on the road corresponding to the position of the kth sample line. Note that TH4<TH3<0<TH1<TH2. The reason why both of the positive threshold levels and the negative threshold levels are required to be thus prepared is described as follows. There is a possibility that part of the brightness difference values of the sample points on one sample line assume positive levels and the remains of the brightness difference values assume negative levels. If the brightness difference values are processed without distinction of positive or negative, the positive and negative brightness difference values cancel each other. In addition, the results of the processing are liable to include noises. The cancellation and noises are liable to result in the fact that there are produced inaccurate measurement results. In order to prevent such inaccurate measurement results from being produced, the positive brightness difference values are thresholded with the positive threshold levels, while the negative brightness difference values are thresholded with the negative threshold levels.

Step P4B calculates a mean value PM indicative of a mean of the brightness difference values which belong to the sample points on the kth sample line and each of which is larger than the first positive threshold level TH1. Step P4C calculates a mean value NM indicative of a mean of the brightness difference values which belong to the sample points on the kth sample line and each of which is smaller than the first negative threshold level TH3.

Step P4C leads to step P4D in which a judgment is made upon whether the mean value PM exceeds the second positive threshold level TH2 or not. If the answer in step P4D is an affirmative "YES", step P4D leads to step P4F. If the answer in step P4D is a negative "NO", step P4D leads to step P4E in which a judgment is made upon whether the mean value NM is smaller than the second negative threshold level TH4 or not. If the answer in step P4E is an affirmative "YES", step P4E leads to step P4F in which the kth sample line is detected as the difference sample line. If the answer in step P4E is a negative "NO", step P4E leads to step P4G. By virtue of steps P4G and P4H, steps P4A through P4F are repeated until k is equal to K. The repetition of steps P4A through P4F has the effect of detecting all of the difference sample lines included in one traffic lane within the measurement area.

The first positive threshold levels TH1 and TH2 may be determined in step P4A as described below. The first and second positive threshold levels TH1 and TH2 used for judging each of the sample lines may become smaller as an actual route distance from the video camera to a location on the road corresponding to a position of each of the sample lines in the image becomes larger. Reversely, the first and second negative threshold levels TH3 and TH4 used for judging each of the sample lines may become larger as the actual route distance from the video camera to the location on the road corresponding to the position of each of the sample lines in the image may become larger. If the threshold values TH1 to TH4 are determined in accordance with the aforesaid actual route distance from the video camera, the difference sample lines in any position can be detected on an accuracy level with one another.

Figure 27:
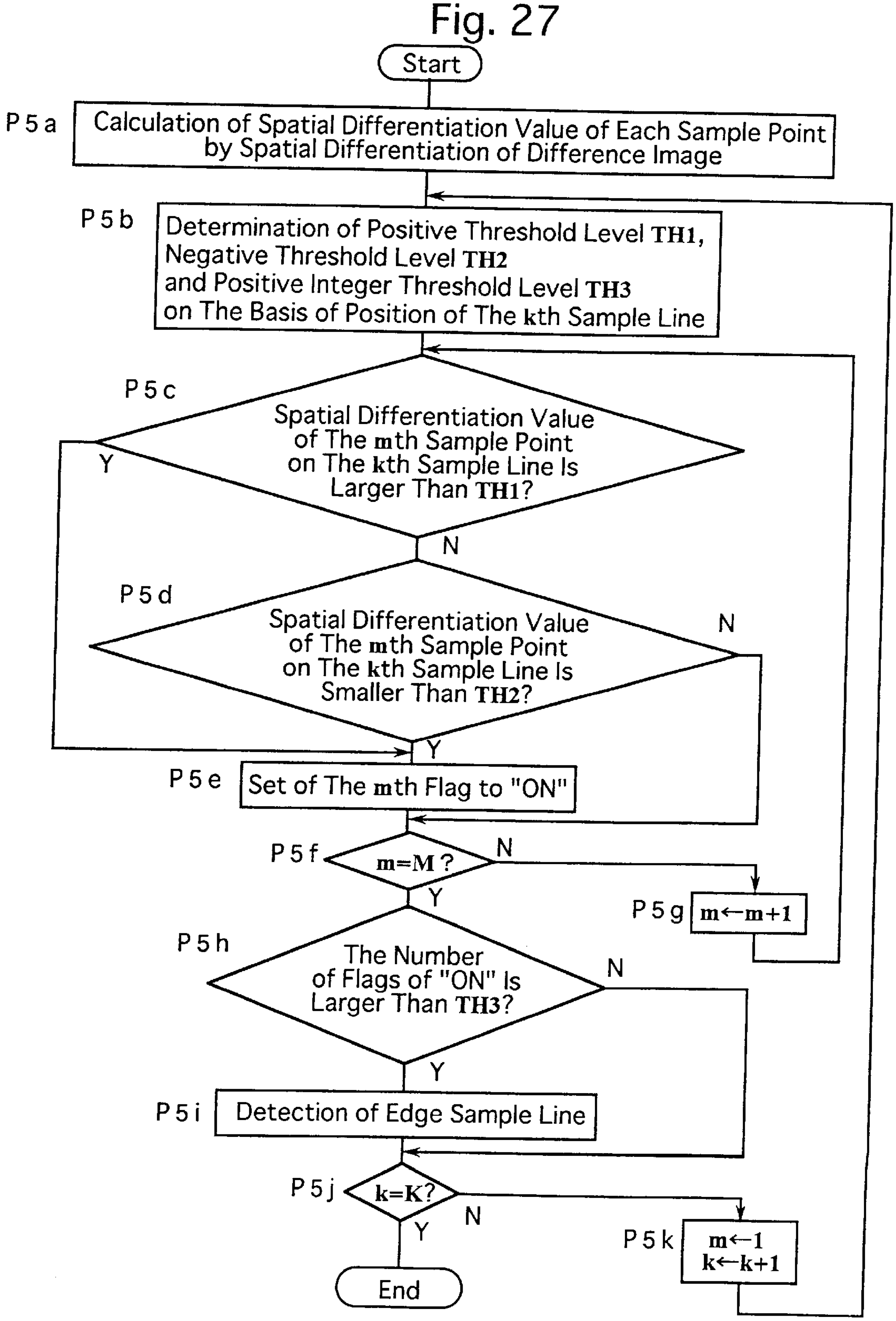
FIG. 27 is a flowchart showing a first example of detailed steps as a whole defining the step P5 of the flowchart shown in FIG. 22.

A first example of the process of detecting the edge sample lines performed in step P5 shown in FIG. 22 will be described in detail hereinlater with reference to FIG. 27 showing a flowchart formed by steps P5*a* through P5*k*.

In step P5*a*, the difference image calculated in step P2 of FIG. 22 is spatially differentiated with Sobel operators to calculate the spatial differentiation values belonging to the sample points, respectively. In step P5*b*, a positive threshold level TH1, a negative threshold level TH2 and a positive integer threshold level TH3 are determined in accordance with an actual route distance from the video camera to a location on the road corresponding to a position of the kth sample line.

Step P5*b* is followed by step P5*c* in which a judgment is made upon whether the spatial differentiation value of the mth sample point on the kth sample line exceeds the positive threshold level TH1 or not. If the answer in step P5*c* is an affirmative "YES", step P5*c* leads to step P5*e*. If the answer in step P5*c* is a negative "NO", step P5*c* leads to step P5*d*. In step P5*d*, a judgment is made upon whether the spatial differentiation value of the mth sample point on the kth sample line is smaller than the negative threshold level TH2 or not. If the answer in step P5*d* is an affirmative "YES", step P5*d* leads to step P5*e*. If the answer in step P5*d* is a negative "NO", step P5*d* leads to step P5*f*.

Step P5*c* or P5*d* leads to step P5*e* in which a flag relevant to the mth sample point on the kth sample line is set to "ON" condition and, subsequently, the control proceeds to step P5*f*. By virtue of steps P5*f* and P5*g*, steps P5*c* through P5*e* are repeated until m is equal to M. The repetition of steps P5*c* through P5*e* has the effect of judging whether the spatial differentiation values of all of the sample points on the kth sample line are larger than the positive threshold level TH1 or not and smaller than the negative threshold level TH2 or not.

When step P5*f* leads to step P5*h*, a judgment is made upon whether the number of the flags set to "ON" condition exceeds the positive integer threshold level TH3. If the answer in step P5*h* is an affirmative "YES", step P5*h* leads to step P5*i* in which the kth sample line is detected as the edge sample line. If the answer in step P5*h* is a negative "NO", step P5*h* leads to step P5*j*. By virtue of steps P5*j* and P5*k*, steps P5*b* through P5*i* are repeated until k is equal to K. The repetition of steps p5*b* through pSi has the effect of detecting all of the edge sample lines included in one traffic lane within the measurement area.

The positive threshold level TH1 may be determined in step P5*b* as described below. The positive threshold value TH1 used for judging each of the sample lines may become smaller as an actual route distance from the video camera to a location on the road corresponding to a position of each of the sample lines becomes larger. Reversely, the negative threshold value TH2 used for judging each of the sample lines may become larger as the actual route distance from the video camera to the location on the road corresponding to the position of each of the sample lines becomes larger. If the positive and negative threshold values TH1 and TH2 are determined in accordance with the actual route distance from the video camera, all of the edge sample lines can be detected on an accuracy level with one another. The positive integer threshold level TH3 may be determined in step P5*b* as described below. The positive integer threshold level TH3 used for judging each of the sample lines may become smaller as the actual route distance from the video camera to the location on the road corresponding to the position of each of the sample lines becomes longer, i.e., as a difference in brightness between the adjoining sample points on each of the sample lines becomes smaller. Reversely, the positive integer threshold value TH3 may become larger as the actual route distance from the video camera to the location on the road corresponding to the position of each of the sample lines becomes smaller, i.e., as the difference in brightness between the adjoining sample points on the sample line becomes larger. By determining the positive integer threshold level TH3 in this way, the edge sample lines in any position can be detected on an accuracy level with one another.

Figure 28:
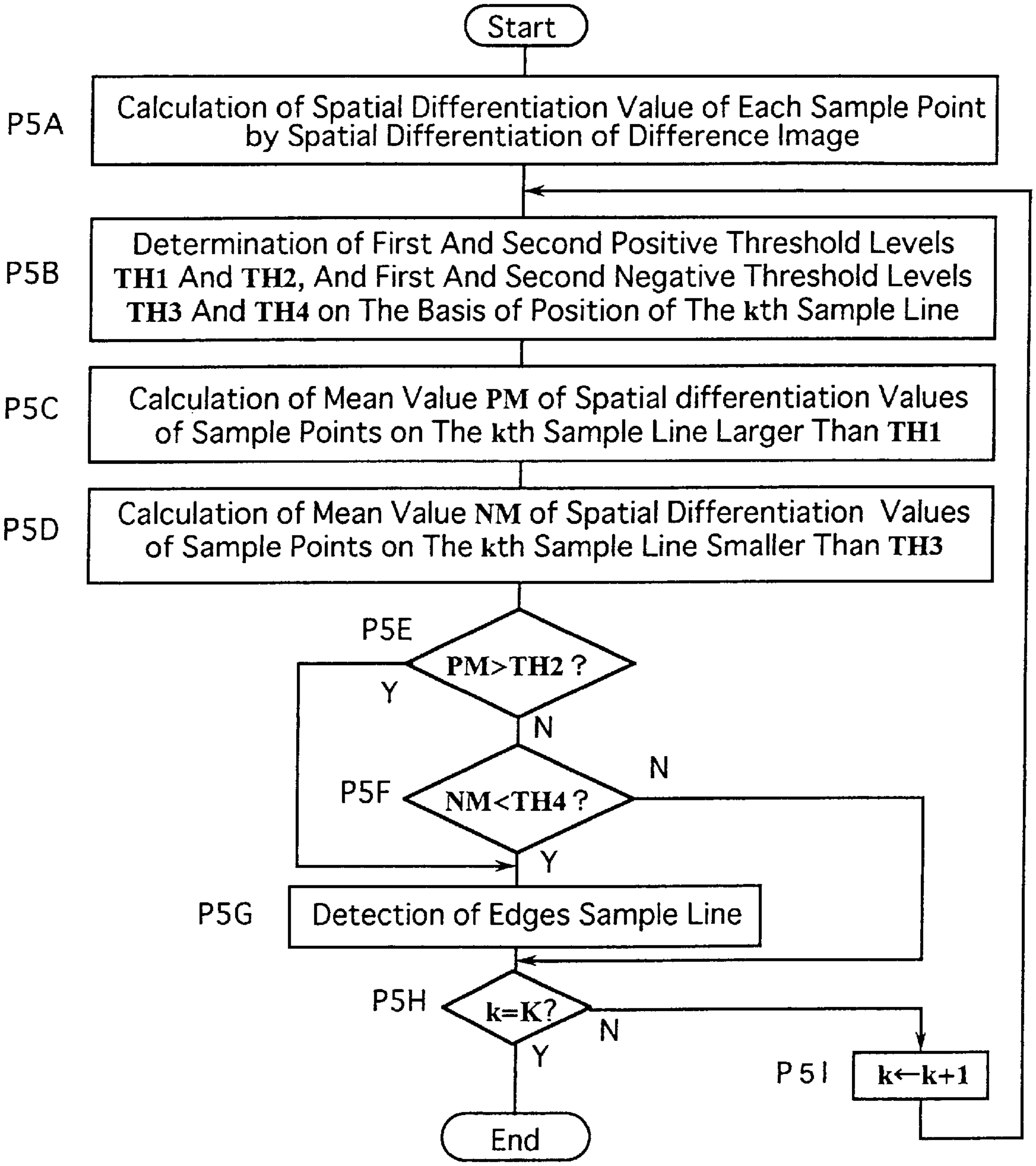
FIG. 28 is a flowchart showing a second example of detailed steps as a whole defining the step P5 of the flowchart shown in FIG. 22.

A second example of the process of detecting the edge sample lines performed in step P5 of FIG. 22 will be described in detail hereinlater with reference to FIG. 28 showing a flowchart formed by steps P5A through P5I.

In step P5A, the difference image calculated in step P2 of FIG. 22 is spatially differentiated with Sobel operators to calculate the spatial differentiation values belonging to the sample points, respectively.

In step P5B, first and second positive threshold levels TH1 and TH2 and first and second negative threshold levels TH3 and TH4 are determined in accordance with an actual route distance from the video camera to a location on the road corresponding to a position of the kth sample line in the image. Note that TH4<TH3<0<TH1<TH2. The reason why both of the positive threshold levels and the negative threshold levels are required to be thus prepared is described as follows. There is a possibility that part of the spatial differentiation values of the sample points on each of the sample lines assume positive levels and the remains of the spatial differentiation values assume negative levels. If the spatial differentiation value is processed without distinction of positive or negative, the positive and negative spatial differentiation values cancel each other. In addition, the results of the processing are liable to include noises. The cancellation and noises are liable to result in the fact that there are produced inaccurate measurement results. In order to prevent such inaccurate measurement results from being produced, the positive spatial differentiation values are thresholded with the positive threshold level, while the negative spatial differentiation values are thresholded with the negative threshold level.

Step P5C calculates a mean value PM indicative of a mean of the spatial differentiation values which belong to the sample points, respectively, on the kth sample line and each of which exceeds the first positive threshold level TH1. Step P5D calculates a mean value NM indicative of a mean of the spatial differentiation values which belong to the sample points on the kth sample line and each of which is smaller than the first negative threshold level TH3.

Step P5D leads to step P5E in which a judgment is made upon whether the mean value PM exceeds the second threshold level TH2 or not. If the answer in step P5E is an affirmative "YES", step P5E leads to step P5G. If the answer in step P5E is a negative "NO", step P5E leads to step P5F in which a judgment is made upon whether the mean value NM is smaller than the second negative threshold level TH4 or not. If the answer in step P5F is an affirmative "YES", step P5F leads to step P5G in which the kth sample line is detected as the edge sample line. If the answer in step P5F is a negative "NO", step P5F leads to step P5H. By virtue of steps P5H and P5I, steps P5B through P5G are repeated until k is equal to K. The repetition of steps P5B through P5G has the effect of detecting all of the edge sample lines included in one traffic lane within the measurement area.

In step P5B, the first and second positive threshold levels TH1 and TH2 may be determined as described below. The first and second positive threshold levels TH1 and TH2 used for judging each of the sample lines may become smaller as an actual route distance from the video camera to a location on the road corresponding to a position of each of the sample lines becomes larger. Reversely, the first and second negative threshold levels TH3 and TH4 used for judging each of the sample lines may become larger as the actual route distance from the video camera to the location on the road corresponding to the position of each of the sample lines becomes larger. If the threshold levels TH1 to TH4 are determined in accordance with the foregoing actual route distance from the video camera, the edge sample lines in any position can be detected on an accuracy level with one another.

The process of detecting the presence sample lines performed in step P6 of FIG. 22 will be described as follows. Both of the difference sample lines detected in step P4 and the edge sample lines detected in step P5 are detected as the presence sample lines.

Figure 29:
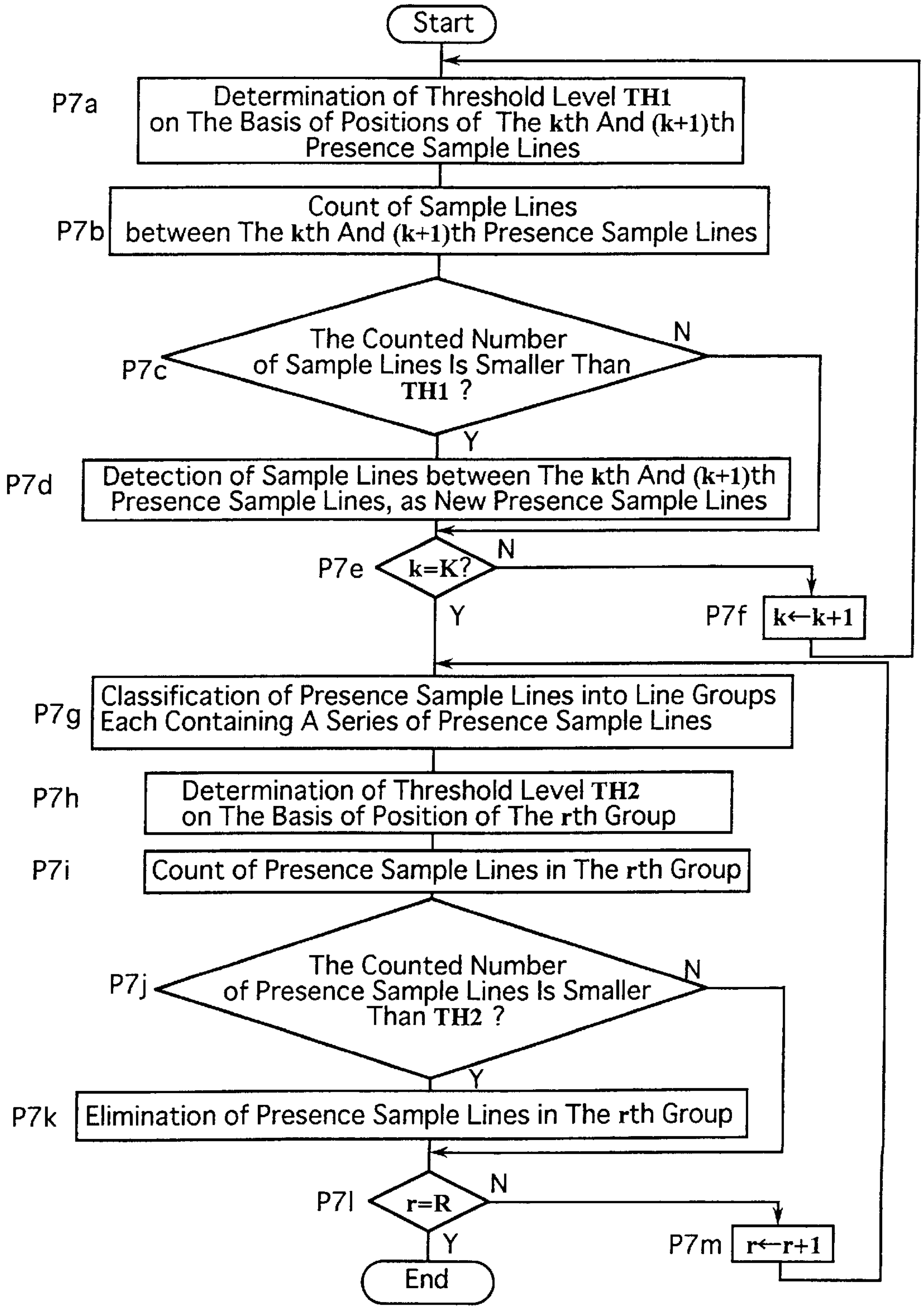
FIG. 29 is a flowchart showing detailed steps as a whole defining the step P7 of the flowchart shown in FIG. 22.

The process of correcting the presence sample lines on the basis of the arrangement of thereof performed in step P7 shown in FIG. 22 will be described in detail hereinlater with reference to FIG. 29 showing a flowchart formed by steps P7*a* through P7*m*. The first half of the correction process formed by steps P7*a* through P7*e* intends the unnoticed presence sample lines caused within image zones respectively representing vehicle bodies to be corrected. The second half of the correction process formed by steps P7*g* through P7*m* intends the mistakenly detected presence sample lines caused within image zones each representing no vehicle body to be corrected.

In step P7*a*, a threshold level TH1 is determined in accordance with an actual route distance from the video camera to locations on the road respectively corresponding to positions of the kth and (k+1)th presence sample lines. In step P7*b*, the sample lines between the kth and (k+1)th presence sample lines are counted.

Step P7*b* is followed by step P7*c* in which a determination is made upon whether the counted number of the sample lines is smaller than the threshold level TH1 or not. If the answer in step P7*c* is an affirmative "YES", step P7*c* leads to step P7*d* in which the sample lines between the kth and (k+1)th presence sample lines are detected as the presence sample lines and added to the previously detected the presence sample lines. If the answer in step P7*c* is a negative "NO", step P7*c* leads to step P7*e*. By virtue of steps P7*e* and P7*f*, steps P7*a* through P7*d* are repeated until k is equal to K. The repetition of steps P7*a* through P7*d* has the effect of correcting all of the presence sample lines which are included in one of the traffic lanes on the basis of the arrangement of the presence sample lines detected in step P6 shown in FIG. 22.

Figures 30A, 30B, 30C:
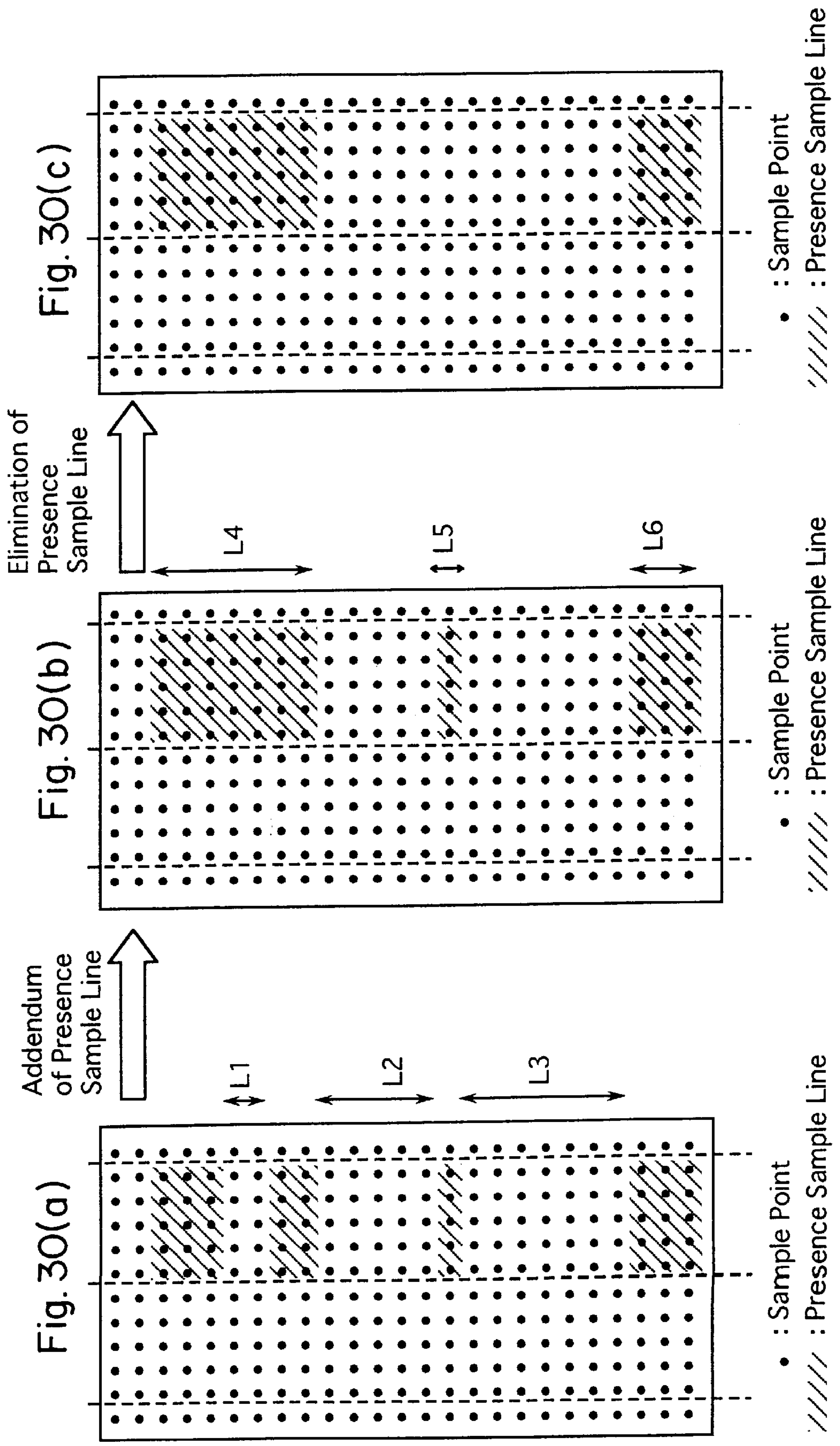
FIG. 30 is a view showing the changes of presence sample lines before, while and after the presence sample lines are corrected in the step P7 of the flowchart shown in FIG. 22.

If the presence sample lines detected in step P6 are positioned as shown in FIG. 30(*a*), the number of the sample lines between the kth and (k+1)th presence sample lines is as follows. Between the first presence sample line or the uppermost presence sample line in FIG. 30(*a*) and the second presence sample line, there, and between the second and third presence sample lines, there is no sample line. Between the third and fourth presence sample lines, there are two sample lines in a range L1. Between the fourth and fifth presence sample lines, there is no sample line. Between the fifth and sixth presence sample lines, there are five sample lines in a range L2. Between the sixth and seventh presence sample lines, there are seven sample lines in a range L3. Between the seventh and eighth presence sample lines and between the eighth and ninth presence sample lines, there is no sample line. When, therefore, the threshold level TH1 is determined to be equal to 3 and constant, only the two sample lines in the range L1 are detected as the presence sample lines and added to the previously detected presence sample lines as understood from FIGS. 30(*a*) and 30(*b*).

Returning back to FIG. 29 of the drawings, step P7*e* is followed by step P7*g* in which the presence sample lines are classified into a plurality of line groups. Each of the line groups contains a series of presence sample lines and never includes other types of sample lines. In step P7*h*, the threshold level TH2 utilized for judging the rth line group is determined in accordance with an actual route distance from the video camera to a location on the road corresponding to a position of each of the line groups. In step P7*i*, the presence sample lines contained in the rth line group are counted.

Step P7*i* leads to step P7*j* in which a judgment is made upon whether the counted number of the presence sample lines is smaller than the threshold level TH2 or not. If the answer in step P7*j* is an affirmative "YES", step P7*j* leads to step P7*k* in which all of the presence sample lines contained in the rth line group are eliminated. If the answer in step P7*j* is a negative "NO", step P7*j* leads to step P7*l*. By virtue of steps P7*l* and P7*m*, steps P7*g* through P7*k* are repeated until r is equal to R. Note that R is the total number of the line groups contained in one of the traffic lanes within the measurement area. The repetition of steps P7*g* through P7*k* has the effect of further correcting all of the presence sample lines included in one of the traffic lanes on the basis of the arrangement of the presence sample lines corrected in step P7*d*.

If the presence sample lines detected after step P7*d* are positioned as shown in FIG. 30(*b*), the number of the presence sample lines of the rth line group is as follows. In the first line group denoted by L4, there are seven presence sample lines. In the second line group denoted by L5, there is one presence sample line. In the third line group denoted by L6, there are three presence sample lines. When, therefore, the threshold level TH2 is determined to be equal to 3 and constant, the presence sample lines of the second line group denoted by L5 are canceled as shown in FIGS. 30(*b*) and 30(*c*).

The threshold levels TH1 and TH2 determined in steps P7*a* and P7*h* may be equal to the number of the sample lines corresponding to quarter of the length of an average vehicle represented in the image. As a result, the threshold levels TH1 and TH2 for judging each of the line groups may become smaller as an actual route distance from the video camera to a location on the road corresponding to a position of each of the line groups becomes larger. The reason is that the vehicle represented in the image becomes smaller as an actual route distance from the video camera to the vehicle becomes larger. While, the threshold levels TH1 and TH2 may become larger as the actual route distance from the video camera to the location on the road corresponding to the position of each of the line groups becomes smaller. The reason is that the vehicle represented in the image becomes larger as the actual route distance from the video camera to the vehicle becomes smaller. If the threshold levels TH1 and TH2 are determined in this way, the mistakenly detected presence sample lines in any position and the unnoticed presence sample lines in any position can be eliminated and newly detected, respectively, on an accuracy level with one another independently of the actual route distance from the video camera.

Figure 31:
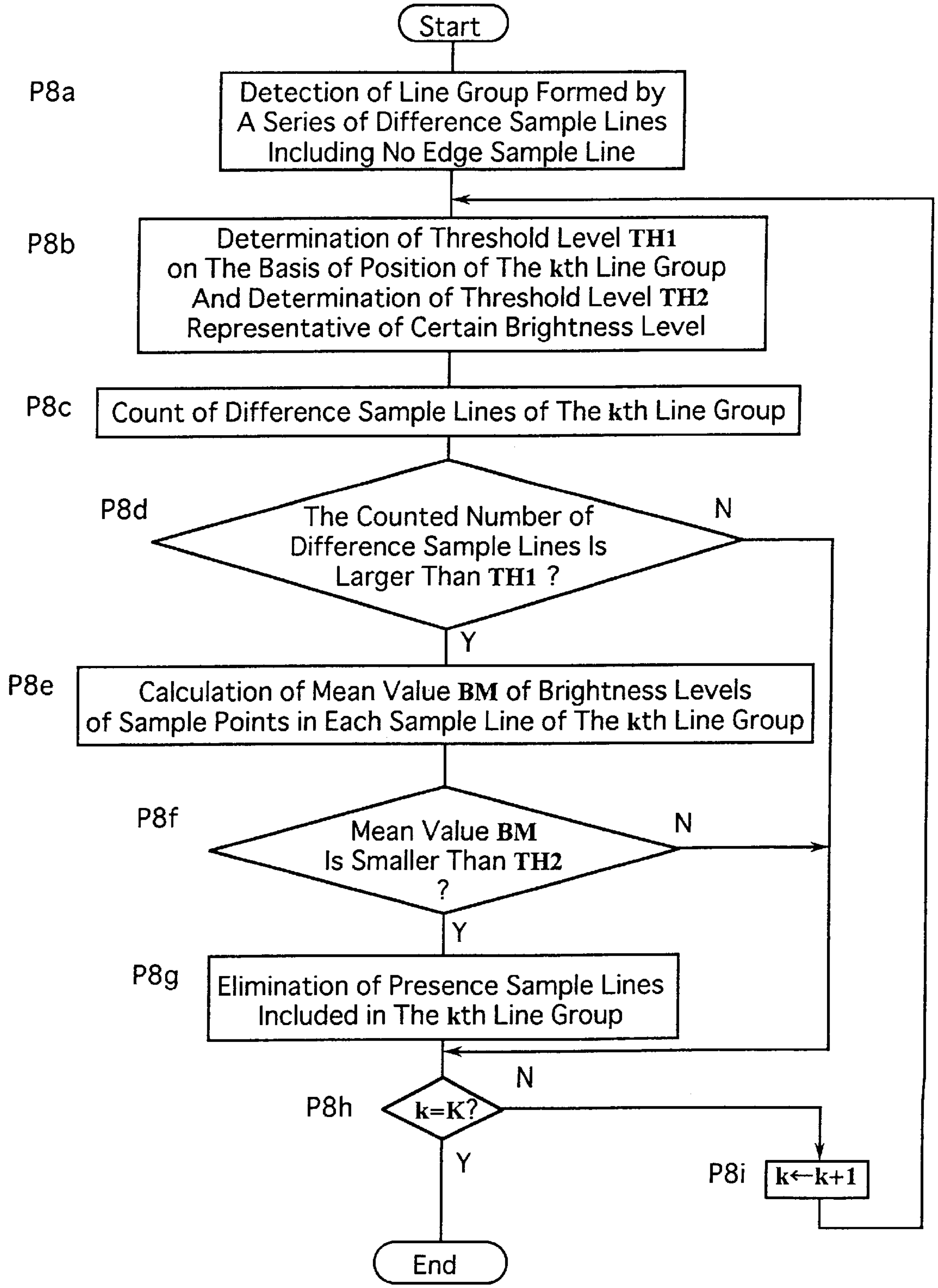
FIG. 31 is a flowchart showing detailed steps as a whole defining the step P8 of the flowchart shown in FIG. 22.

An example of the process of correcting the presence sample lines on the basis of the arrangement of the difference sample lines, performed in step P8 of FIG. 22, will be described in detail hereinafter with reference to FIG. 31 showing a flowchart formed by steps P8*a* through P8*i*. The correction process based on the arrangement of the difference sample lines is intended to eliminating the presence sample lines which are detected by mistaking shadows of the vehicles and buildings for the vehicles. More specifically, the difference sample lines are simply detected depending upon a difference in brightness between the sample point image taken at the time $t_n$ and the criterion brightness image, so that image areas representing the shadows of the vehicles and the shadows of the buildings suddenly produced due to a sharp variation of sunlight are liable to be detected as the presence sample lines. For this reason, the presence sample lines mistakenly detected owing to the shadows of the vehicles and buildings are required to be corrected on the basis of the arrangement of the difference sample lines.

Step P8*a* detects line groups each formed by a series of difference sample lines and including no edge sample line. The reason why the line groups including no edge sample line are required to be detected is described below. In general, edges in the image areas representing shadows can be scarcely detected. In addition, brightness levels of the sample points positioned in the image areas representing shadows are relatively small. As a result, no edge sample line is usually detected in the image areas representing shadows. This means that the image area including edge sample lines may be thought to represent no shadow. In step P8*b*, the threshold level TH1 used for judging the kth line group is determined depending upon an actual route distance from the video camera to a location on the road corresponding to a position of the kth line group. In step P8*b*, the threshold level TH2 is also determined. The threshold level TH2 is representative of a certain brightness level. In step P8*c*, the difference sample lines contained in kth line group are counted.

Step P8*c* is followed by step P8*d* in which a judgment is made upon whether the counted number of the difference sample lines exceeds the threshold level TH1 or not. If the answer in step P8*d* is an affirmative "YES", step P8*d* leads to step P8*e*. Step P8*e* calculates a mean value BM indicative of a mean of the brightness levels of the sample lines which is in the sample point image taken at the time $t_n$ and which corresponds to the difference sample lines contained in the kth line group. If the answer in step P8*d* is a negative "NO", step P8*d* leads to step P8*h*.

Step P8*e* leads to step P8*f* in which a judgment is made upon whether the mean value BM is smaller than the threshold level TH2. If the answer in step P8*f* is an affirmative "YES", step P8*f* leads to step P8*g* in which the presence sample lines corresponding in position to the difference sample lines, respectively, contained in the kth line group are eliminated. If the answer in step P8*f* is a negative "NO", step P8*f* leads to step P8*h*. By virtue of steps P8*h* and P8*i*, steps P8*b* through P8*g* are repeated until k is equal to K. The repetition of steps P8*b* through P8*i* has the effect of correcting all of the presence sample lines contained in one of the traffic lanes within the measurement area, on the basis of the arrangement of the difference sample lines.

The threshold level TH1 determined in step P8*b* may be equal to the number of the sample lines corresponding to quarter of the length of an average vehicle represented in the image. As a result, the threshold level TH1 for judging each of the line groups may become smaller as an actual route distance from the video camera to a location on the road corresponding to a position of each of the line groups in the image becomes larger. The reason is that the vehicle represented in the image becomes smaller as an actual route distance from the video camera to the vehicle becomes larger. While, the threshold level TH1 may become larger as the actual route distance from the video camera to the location on the road corresponding to the position of each of the line groups in the image becomes smaller. The reason is that the vehicle represented in the image becomes larger as the actual route distance from the video camera to the vehicle becomes smaller. If the threshold level TH1 is determined in this way, the presence sample lines mistakenly detected due to the shadows can be eliminated on an accuracy level with one another independently of the actual route distance from the video camera.

Figure 32:
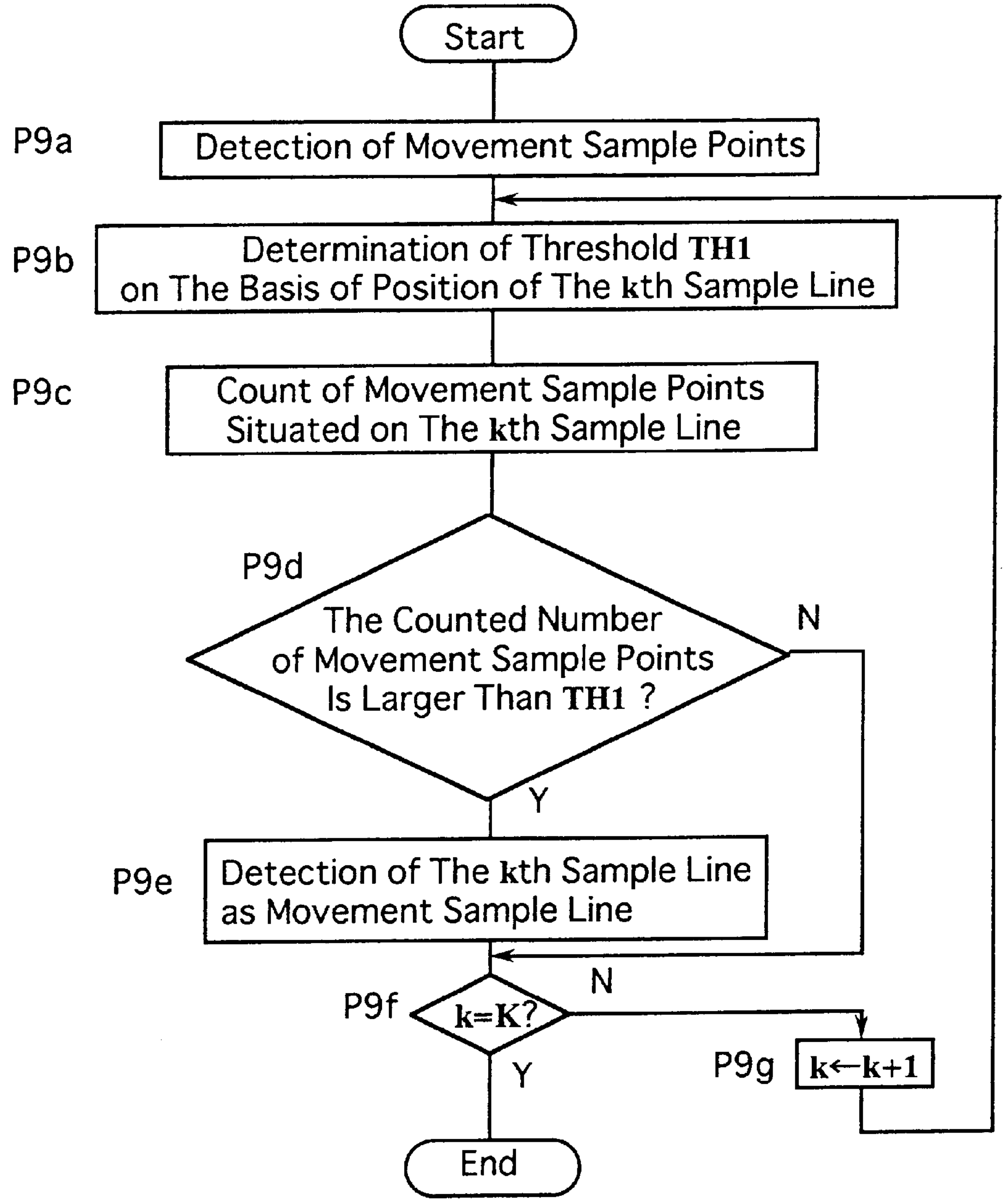
FIG. 32 is a flowchart showing detailed steps as a whole defining the steps P9 of the flowchart shown in FIG. 22.

The process of detecting the movement sample points performed in step P9 of FIG. 22 will be described in detail with reference to FIG. 32 showing a flowchart formed by steps P9*a* through P9*g*.

In step P9*a*, the movement sample points are detected. Because the detection process is described in detail in the aforesaid first embodiment with reference to FIG. 10, the description of the detection process will be omitted herein to avoid the repeating the description.

In step P9*b*, a threshold level TH1 used for judging the kth sample line is determined on the basis of an actual route distance from the video camera to a location on the road corresponding to a position of the kth sample line. In step P9*c*, the movement sample points on the kth sample line are counted.

Step P9*c* is followed by step P9*d* in which a judgment is made upon whether the counted number of the movement sample points exceeds the threshold level TH1 or not. If the answer in step P9*d* is an affirmative "YES", step P9*d* leads to step P9*e* in which the kth sample line is detected as the movement sample line. If the answer in step P9*d* is a negative "NO", step P9*d* leads to step P9*f*. Steps P9*f* and P9*g* cause steps P9*b* through P9*e* to be repeated until k is equal to K. The repetition of steps P9*b* through P9*e* has the effect of detecting all of the movement sample lines contained in one of the traffic lanes within the measurement area.

The threshold level TH1 in step P9*b* may be determined as follows. The threshold level TH1 for judging each of the sample lines may become smaller as an actual route distance from the video camera to a location on the road corresponding to a position of each of the sample lines becomes larger. If the threshold level TH1 is thus varied in accordance with the position of each sample line, the movement sample lines in any position can be detected on an accurate level with one another independently of the actual route distance from the video camera to the location on the road corresponding to the position of each of the sample lines.

Figure 33:
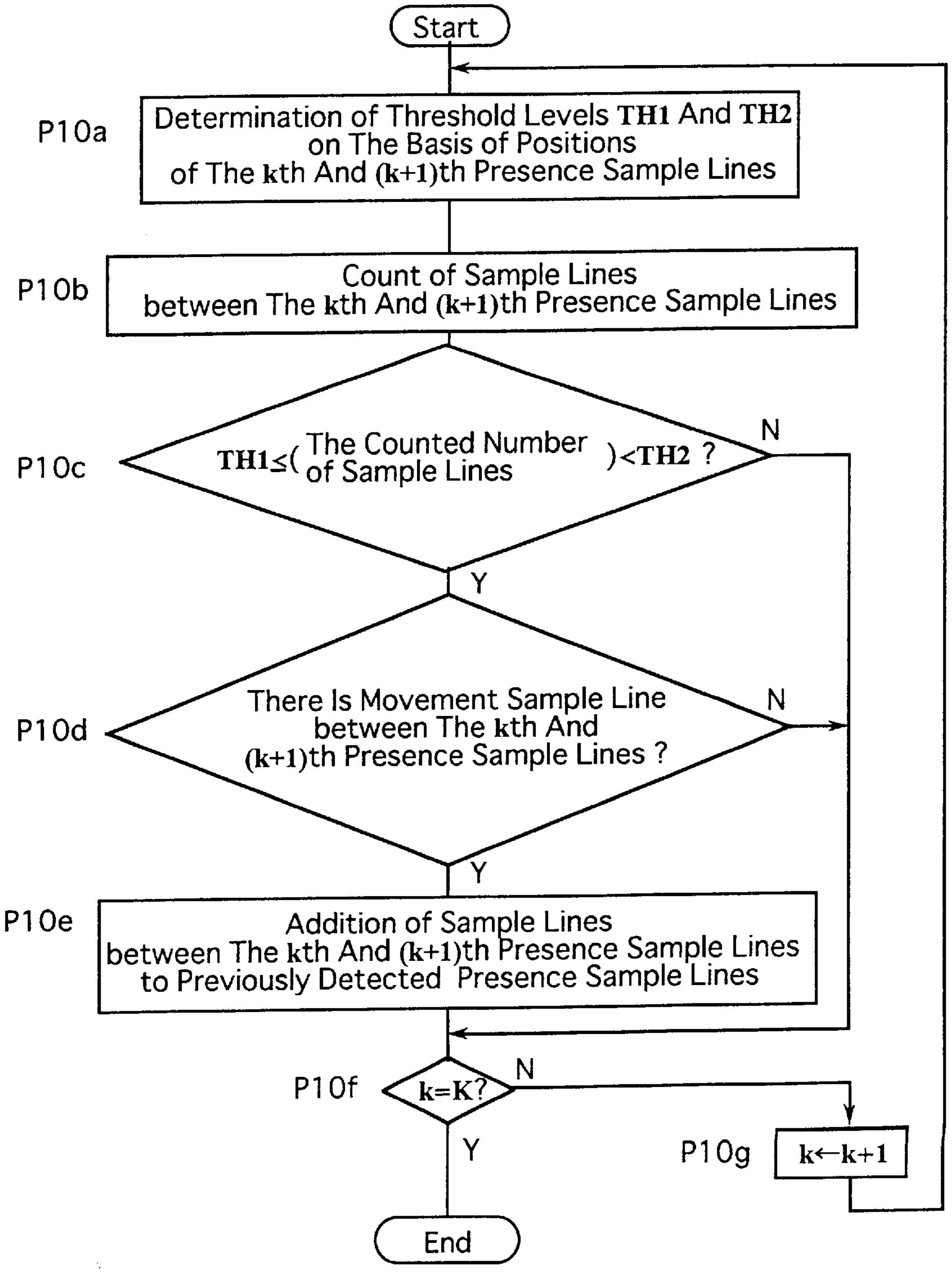
FIG. 33 is a flowchart showing detailed steps as whole defining the step P10 of the flowchart shown in FIG. 22.

An example of the process of correcting the presence sample lines performed in step P10 of FIG. 22 in accordance with the arrangement of the movement sample lines will be described in detail hereinafter with reference to FIG. 33 showing a flowchart formed by steps P10*a* through P10*g*. The correction process based on the arrangement of the movement sample lines is performed with the intention of compensating the presence sample lines which are omitted in steps P7*a* through P7*f* shown in FIG. 29 and which are located within an image area representing a vehicle body. If, more specifically, there is a vehicle on the road having a body image which forms a small contrast with the criterion brightness image and within which the variation in brightness is small, the presence of the vehicle can be scarcely detected as the difference sample lines or edge sample lines. The omitted detection cannot be compensated through the foregoing steps P7*a* to P7*f*. Because there is a possibility that the presence of the vehicle thus omitted can be detected as the movement sample lines, the omitted present sample lines are compensated on the basis of the arrangement of the movement sample lines.

In step P10*a*, threshold levels TH1 and TH2 for judging the kth and (k+1)th presence sample lines are determined depending upon at least one of two actual route distances, one of the two actual route distances being from the video camera to a location on the road corresponding to a position of the kth presence sample line in the image, and the other of the two actual route distances being from the video camera to a location on the road corresponding to a position of the (k+1)th presence sample line in the image. Note that TH1<TH2 and that the threshold level TH1 in step P10*a* may be equal to that in step P7*a* shown in FIG. 29. If both the threshold levels TH1 are equal to each other, an object of the compensation through steps P10*a* to P10*g* can be limited to the omitted presence sample lines which cannot be compensated through steps P7*a* to P7*f*, thereby making it possible to prevent useless correction processes from being performed and prevent essential correction processes from being omitted.

Step P10*b* counts the sample lines between the kth and (k+1)th presence sample lines. In step P10*c*, a judgment is made upon whether the counted number of the sample lines is equal to or larger than the threshold level TH1 or not and smaller than the threshold level TH2 or not. If the answer in step P10*c* is an affirmative "YES", step P10*c* leads to step P10*d*. If the answer in step P10*c* is a negative "NO", step P10*c* leads to step P10*f*.

Step P10*c* leads to step P10*d* in which a judgment is made upon whether there is at least one movement sample line between the kth and (k+1)th presence sample lines or not. If the answer in step P10*d* is an affirmative "YES", step P10*d* leads to step P10*e*. In step P10*e*, the sample lines interposed between the kth and (k+1)th presence sample lines and comprising the movement sample line are newly detected as the presence sample lines and added to the previously detected presence sample lines. If the answer in step P10*d* is a negative "NO", step P10*d* leads to step P10*f*. By virtue of steps P10*f* and P10*g*, steps P10*a* through P10*e* are repeated until k is equal to K. The repetition of steps P10*a* through P10*e* has the effect of correcting all of the presence sample lines in one of the traffic lanes located within the measurement area, on the basis of the arrangement of the movement sample lines.

Figures 34A, 34B:
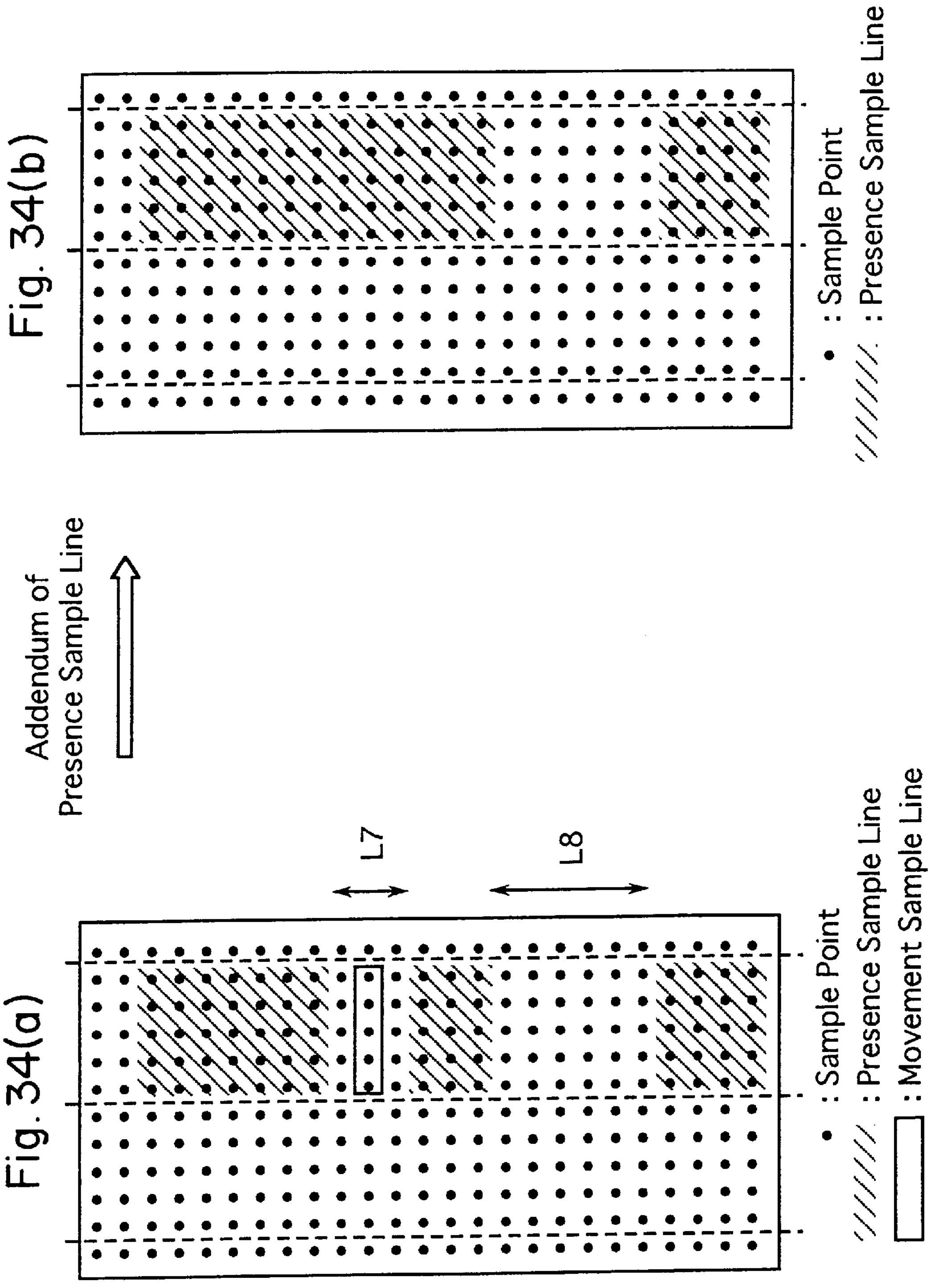
FIG. 34 is a view showing the changes of presence sample lines before and after the presence sample lines are corrected in the step P10 of the flowchart shown in FIG. 22.

The presence sample lines and the movement sample line obtained in steps P8 and P9 are positioned as shown in FIG. 34(*a*). The number of the sample lines between the kth and (k+1)th presence sample lines is as follows. There is no sample line between any two adjoining presence sample lines of the first or uppermost through the seventh presence sample lines. There are three sample lines between the seventh and eighth presence sample lines, i.e., in a range denoted by "L7". There is no sample line between any two adjoining presence sample lines of the eighth through tenth presence sample lines. There are six sample lines between the tenth and eleventh presence sample lines, i.e., in a range denoted by L8. There is no sample line between any two adjoining presence sample lines of the eleventh through fourteenth presence sample lines. In the meantime, there is one movement sample line in the range L7 and there is no movement sample line in the range L8. If, therefore, the threshold level TH1 is determined to be equal to 3 and be constant and threshold level TH2 is determined to be equal to 5 and be constant, the sample lines in the range L7 are newly detected as the presence sample lines as shown in FIGS. 34(*a*) and 34(*b*).

In step P10*a*, the threshold levels TH1 and TH2 may be determined to be equal to the number of the sample lines corresponding to a quarter and a half, respectively, of the length of an average vehicle represented in the image. As a result, the threshold levels TH1 and TH2 used for judging the sample lines between the kth and (k+1)th presence sample lines may become smaller as an actual route distance from the video camera to a location on the road corresponding to a position of the kth or (k+1)th of the presence sample line becomes larger. The reason is that the vehicle represented in the image becomes smaller as an actual route distance from the video camera to the vehicle becomes larger. While, the threshold levels TH1 and TH2 may become larger as the actual route distance from the video camera to the location on the road corresponding to the position of the kth or (k+1)th of the presence sample line becomes smaller. The reason is that the vehicle represented in the image becomes larger as the actual route distance from the video camera to the vehicle becomes smaller. If the threshold levels TH1 and TH2 are determined in this way, the omitted presence sample lines can be newly detected on an accuracy level with one another independently of the actual route distance from the video camera.

Figure 35:
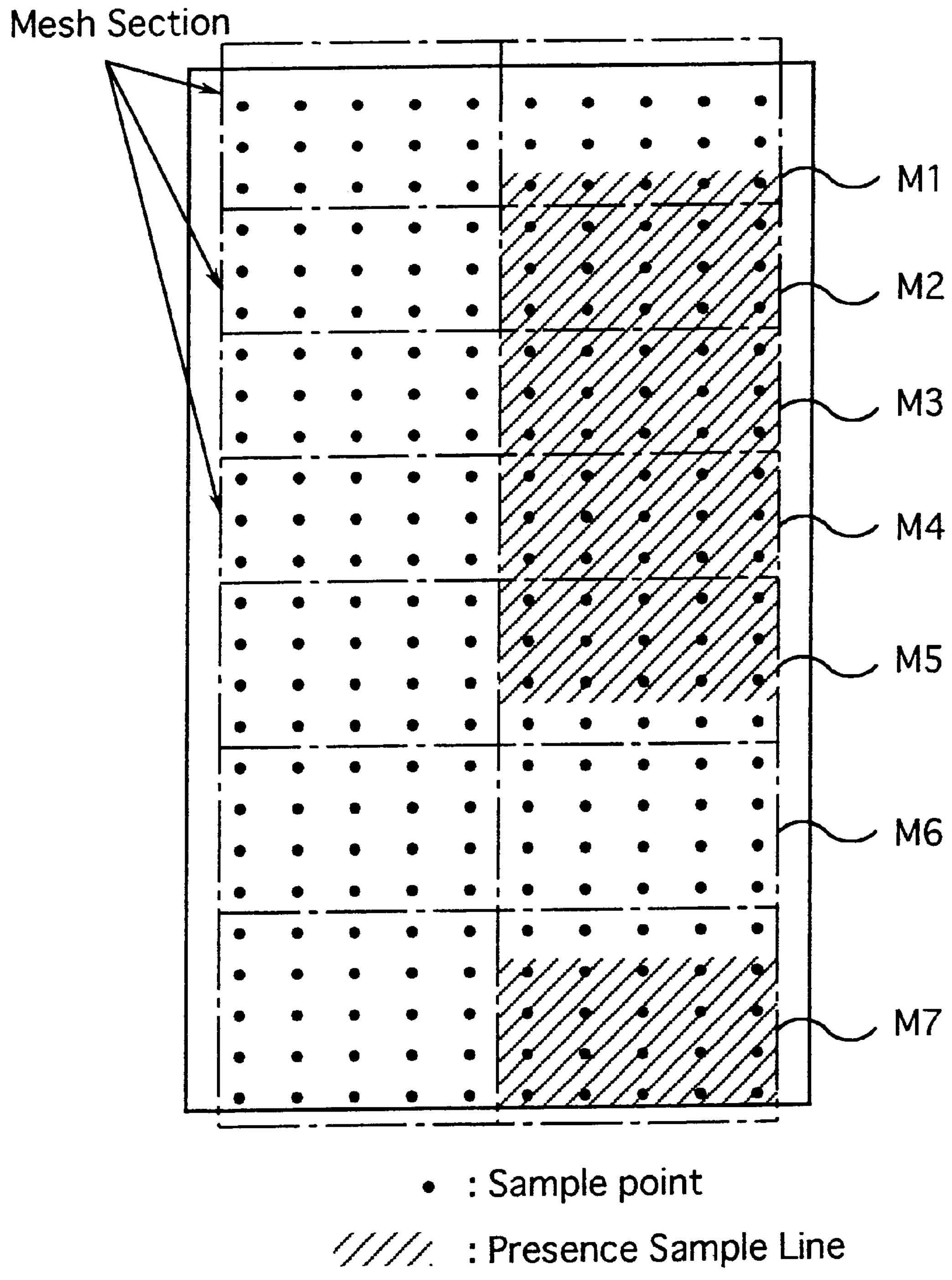
FIG. 35 is a view showing spatial densities of mesh sections obtained in the step P12 of the flowchart shown in FIG. 22.

FIG. 35 shows the mesh sections into which the measurement area divided in step P11 shown in FIG. 22. Each of the mesh sections may become larger in longitudinal length as an actual route distance from the video camera to a location on the road corresponding to a position of each of the mesh sections in the image becomes smaller. If the size of each of the mesh sections is thus determined depending upon the actual route distance from the video camera to the location on the road corresponding to the position of each of the mesh sections, the mesh sections respectively represents actual road sections which are substantially equal in size to one another.

In step P12 of FIG. 22, the spatial density of each of the mesh sections is calculated by an equation described below.

$$D(m)=PSL(m)/TSL(m) \qquad \text{(vi)}$$

wherein D(m) is a spatial density of the mth mesh section, PSL(m) is the number of the presence sample lines included in the mth mesh section, TSL(m) is the total number of the sample lines contained in the mth mesh section. If the presence sample lines are positioned as shown in FIG. 35, the spatial density of each of the mesh sections are as follows. The spatial density of the mesh section denoted by M1 is 33%, the spatial densities of the mesh sections respectively denoted by M2, M3 and M4 are 100%, the spatial density of the mesh section denoted by M5 is 75%, the spatial density of the mesh section denoted by M6 is 0% and the spatial density of the mesh section denoted by M7 is 80%.

In step P13 of FIG. 22, the ratio of the large-sized vehicles to all of the vehicles is calculated in a manner described below.

By the following equation, is firstly calculated a ratio Rt of the large-sized vehicles to all of the vehicles which are lying in the traffic flow measurement area F shown in FIG. 21 for a predetermined time such as 5 or 10 minutes.

$$Rt=N_L/N_T \qquad \text{(vii)}$$

wherein $N_L$ is the number of the large-sized vehicles passing over the sense line DL shown in FIG. 21, and $N_T$ is the number of all of the vehicles passing over the sense line DL. In the traffic flow measurement area F shown in FIG. 21, not only the number of vehicles passing over the are F is detected but also the vehicles passing over the area F are judged to be large-sized or average-sized. The ratio Rt is calculated depending upon the results of the detection and the judgment.

In step P14 of FIG. 22, the inter vehicle gaps of the vehicles are calculated as follows. The inter vehicle gaps of the vehicles can be scarcely measured directly depending upon the image information from the video camera. For this reason, in practice the velocities of the vehicles or the number of the passing vehicles per predetermined time are substituted for the inter vehicle gaps because of the fact that the velocities of the vehicle or the number of the passing vehicles per predetermined time are expected to be in proportion to the inter vehicle gaps.

In step P15 of FIG. 22, the spatial densities are corrected depending upon the ratio of the large-sized vehicles to all of the vehicles and the inter vehicle gaps in the following manner. The correction process based on the ratio of the large-sized vehicles to all of the vehicle is performed with the intention of correcting the spatial densities calculated depending upon a seeming vehicle presence space.

Figure 36:
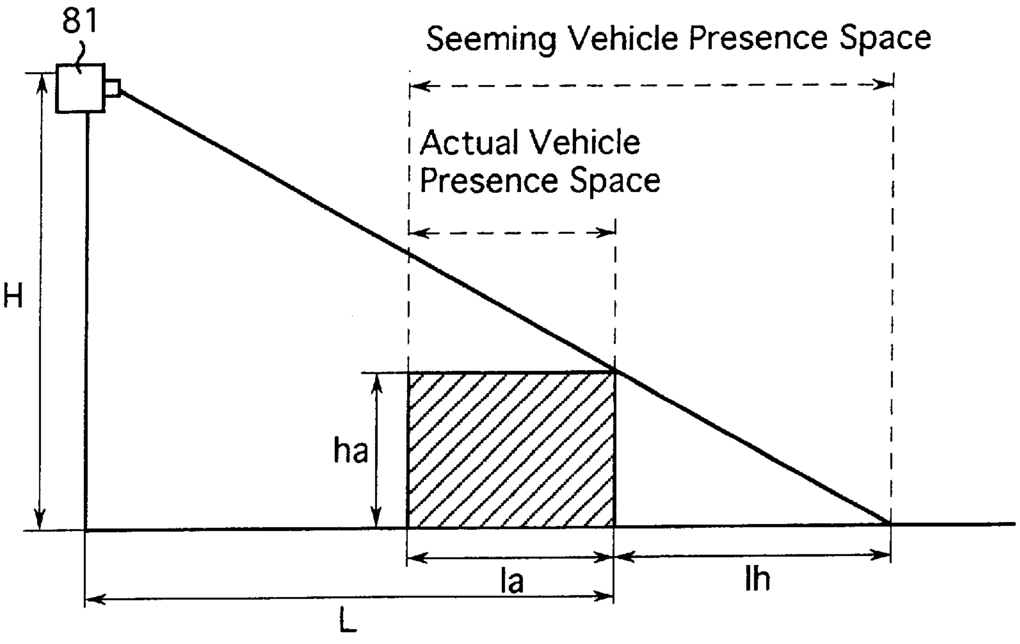
FIG. 36 is a view illustrated for explaining grounds that the spatial density is required to be corrected depending upon a ratio of large-sized vehicles to all of the vehicles in the step P15 of the flowchart shown in FIG. 22.

If the vehicle shown by a hatched area shown in FIG. 36 is a large-sized vehicle, the seeming vehicle presence space seemingly occupied by the vehicle is extremely larger than an actual vehicle presence spaces shown by the hatched area. The spatial densities based on the seeming vehicle presence area are corrected in the present step P15.

If the average height and average length of all of the vehicles is represented by ha and la, respectively, which are calculated by equations defined as follows:

$$ha=Rt\times h_L+(1-Rt)\times h_s \qquad \text{(viii)}$$

$$la=Rt\times l_L+(1-Rt)\times l_s \qquad \text{(ix)}$$

wherein $h_L$ is the height of the large-sized vehicle, $h_S$ is the height of the average-sized vehicle, $l_L$ is the length of the large-sized vehicle, and $l_S$ is the length of the average-sized vehicle.

As shown in FIG. 36, the vehicle represented by the hatched area makes a hiding area lh defined by the following equation.

$$lh=ha\times L/(H-ha) \qquad \text{(x)}$$

wherein H is a height from a road surface to the video camera and L is a distance from the video camera to the forward end of the large-sized vehicle.

By the following equation with lh and la, is calculated a correction coefficient Re which are used for correcting the seeming vehicle presence space to the actual vehicle presence space.

$$Re=la/(la+lh) \qquad \text{(xi)}$$

The number, the types such as large-sized type and average-sized type, and the lengths of the passing vehicles can be measured in the traffic flow measurement area F shown in FIG. 21 as described hereinbefore. Based on the results of the measurement in the traffic flow measurement area F, the correction coefficient Re may be calculated. In addition, the correction coefficient Re thus calculated may be used for correcting the measurement result in part of the spatial measurement area E that does not lap on the traffic flow measurement area F. In the traffic flow measurement area F, since the length of each individual vehicle can be directly measured, the correction coefficients may be calculated for each individual vehicle.

If the inter vehicle gaps are relatively large, the correction coefficient Re may be used as it is. If, however, the inter vehicle gaps are relatively small, i.e., if the vehicles represented in the image taken by the video camera are overlapping with one another, the correction coefficient Re calculated by the equation (xi) is required to be increased. Specifically, the correction coefficient Re may be set more approximately to the value calculated by the equation (xi) as the inter vehicle gaps become larger. In addition, the correction coefficient Re may be set more approximately to "1" as the inter vehicle gaps become smaller.

In the spatial measurement area E, the traffic congestion measuring unit cannot derive traffic data from sensing devices except the video camera. If, therefore, the inter vehicle gaps are relatively small, i.e., if the vehicles represented in the image taken by the video camera are overlapping with one another, the traffic congestion measuring unit cannot detect the inter vehicle gaps. For this reason, other measurement values varied in proportion to the inter vehicle gaps may be substituted for the inter vehicle gaps. The other measurement values include, for example, the following spatial velocities and the number of the passing vehicles per predetermined time detected in the traffic flow measurement area F. Specifically, the correction coefficient Re may be set more approximately to the value calculated by the equation (xi) as the spatial velocity becomes larger. As the spatial velocity becomes smaller, the coefficient Re may be set more approximately to "1". On the other hand, the correction coefficient Re may be set more approximately to the value calculated by the equation (xi) as the number of the passing vehicles becomes smaller. As the number of the passing vehicles becomes larger, the correction coefficient Re may be set more approximately to "1".

In step P15 of FIG. 22, the spatial density is corrected by multiplying the spatial density of each mesh section by the correction coefficient Re calculated and corrected in the foregoing manner.

Figure 37:
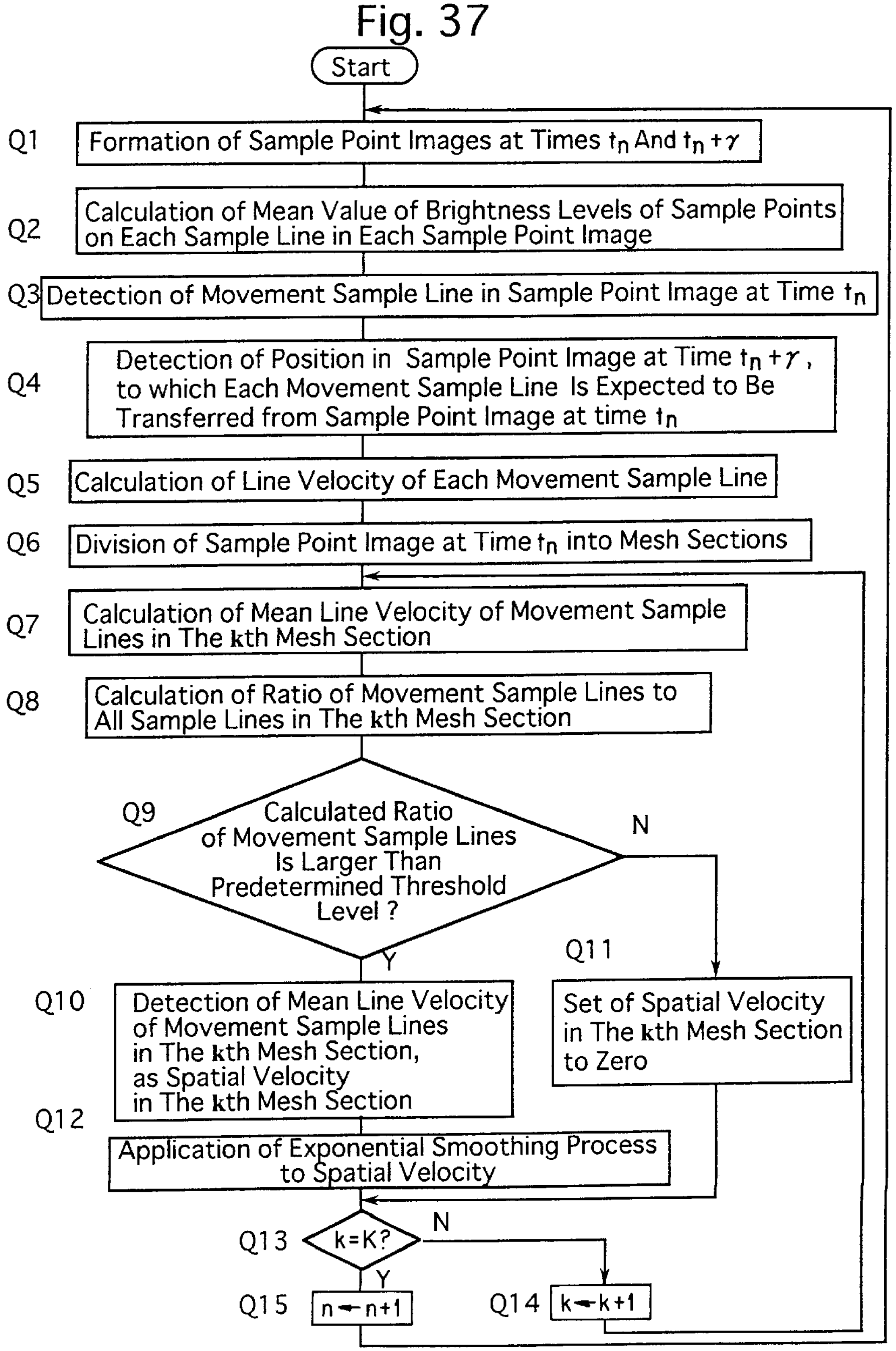
FIG. 37 is a flowchart showing steps of measuring spatial velocities in the traffic congestion measuring system shown in FIG. 20.

The process of calculating the spatial velocities performed by the traffic congestion measuring unit 82 will be summarily described with reference to FIG. 37 showing a flowchart formed by steps Q1 through Q15.

In step Q1, the sample point images are formed from two images respectively taken at time $t_n$ and time $t_n+\gamma$. In step Q2, is calculated, line brightness mean values each indicative of a mean of the brightness levels of the sample points on each of the sample lines for each sample point image.

In step Q3, movement sample lines are detected from the sample point image taken at the time $t_n$. The process of detecting the movement sample lines is shown by the foregoing flowchart shown in FIG. 32, so that the description of the detection process will be omitted herein with the intention of avoiding the repeated description thereof.

In step Q4, are detected as post-movement sample lines, the sample lines in the image taken at the time $t_n+\gamma$, to which the movement sample lines is expected to be respectively transferred from the image taken at the time $t_n$. In step Q5, are calculated, velocities of the movement sample lines on the basis of which the post-movement sample lines, respectively, can be detected.

In step Q6, the sample point image taken at the time $t_n$ is divided into a plurality of mesh sections. In step Q7, is calculated, mean velocities each indicative of a mean of the velocities of the movement sample lines included in each of the mesh section. In step Q8, is calculated a ratio of the movement sample lines to all of the sample lines contained in the kth mesh section. At this time, objects of the ratio calculations are not all of the movement sample lines but only the movement sample lines on the basis of which the post-movement sample lines, respectively, can be detected.

Step Q8 is followed by step Q9 in which a judgment is made upon whether the calculated ratio of the movement sample lines included in the kth mesh section is larger than a predetermined threshold level or not. If the answer in step Q9 is an affirmative "YES", step Q9 leads to step Q10 in which the mean velocity of the movement sample lines included in the kth mesh section is detected as the spatial velocity in the kth mesh section. If the answer in step P9 is a negative "NO", step Q9 leads to step Q11 in which the spatial velocity in the kth mesh section is set to 0 km/h.

When step Q10 leads to step Q12, the spatial velocity in the kth mesh section is smoothed through exponential smoothing techniques. By virtue of steps Q13 and Q14, steps Q7 through Q12 are repeated until k is equal to K. The repetition of steps Q7 through Q12 has the effect of calculating the spatial velocities of all of the mesh sections in the sample point image taken at the time $t_n$.

Figure 38:
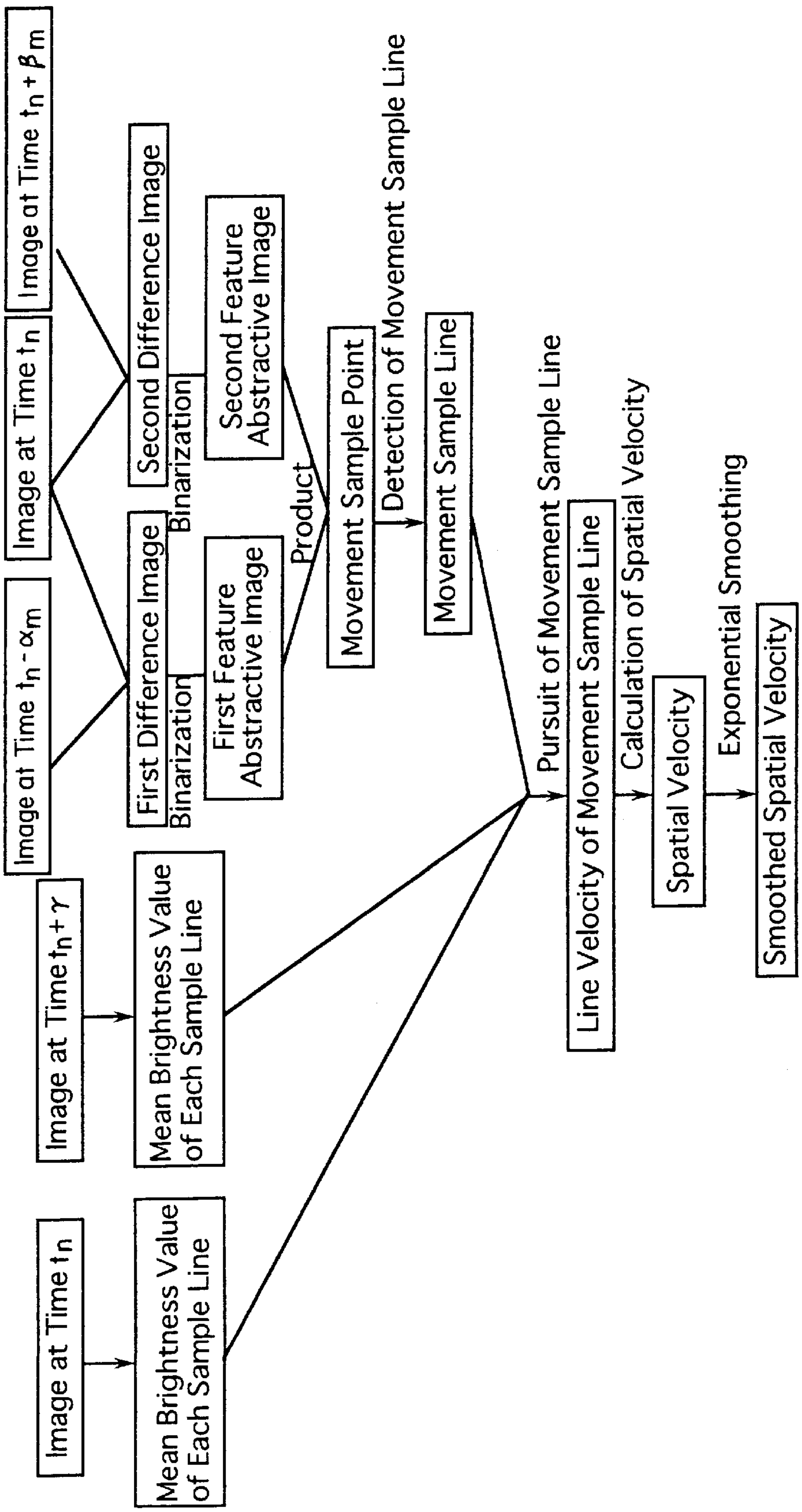
FIG. 38 is a view showing relationships between results of the calculation and the detection obtained in the steps of the flowchart shown in FIG. 37.

Steps Q1 through Q15 are repeated at regular intervals. FIG. 38 summarily shows relationships between the results of the detection and the calculation in steps Q1 through Q15.

Figure 39:
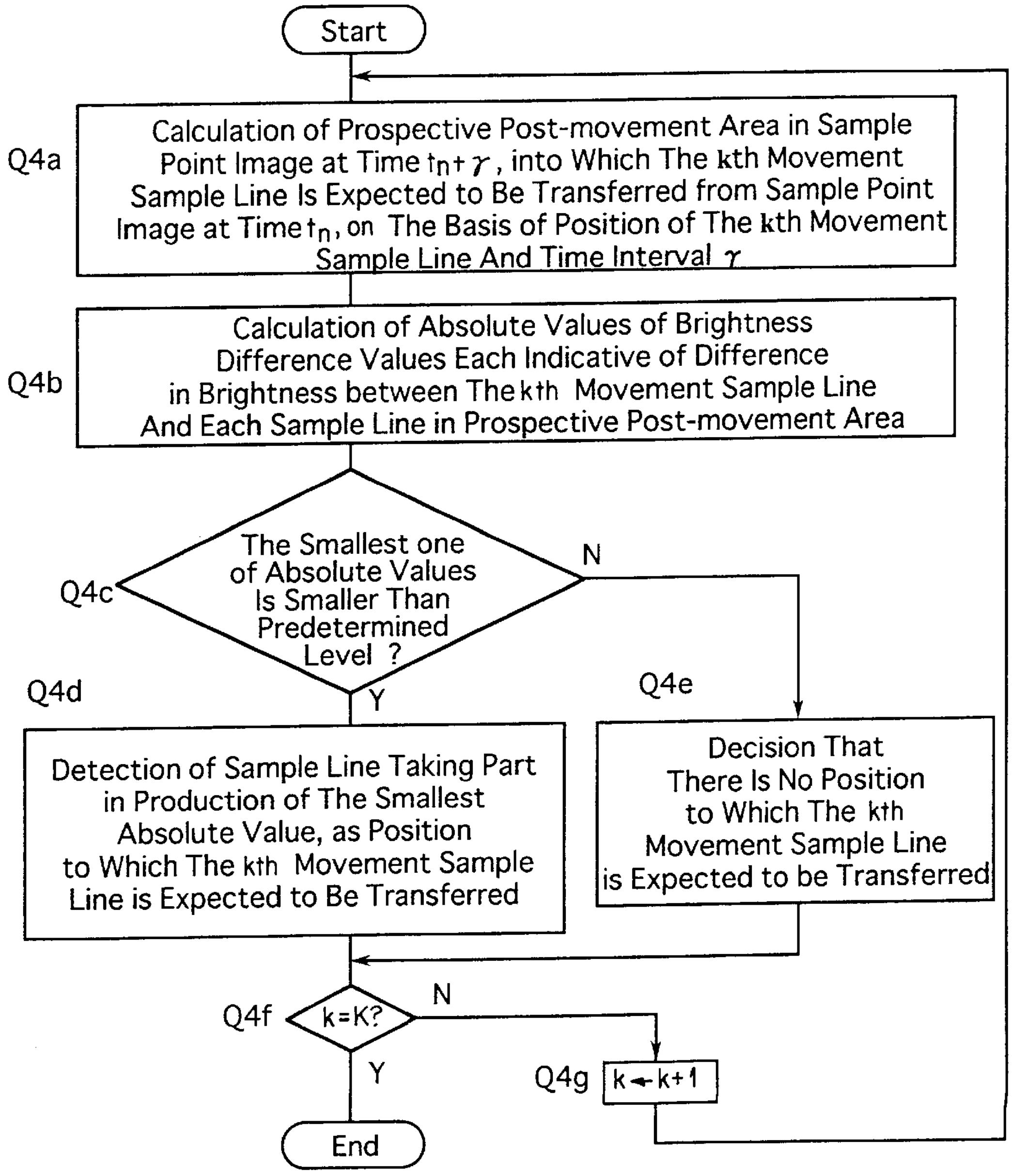
FIG. 39 is a flowchart showing a first example of detailed steps as a whole defining the step Q4 of the flowchart shown in FIG. 37.

A first example of the process of detecting the post-movement sample lines performed in step Q4 shown in FIG. 37 will be described in detail hereinlater with reference to FIG. 39 showing a flowchart formed by steps Q4*a* through Q4*g*.

In step Q4*a*, a prospective post-movement area in the sample point image taken at the time $t_n+\gamma$ is calculated depending upon the time interval $\gamma$ and the position of the kth movement sample line in the sample point image taken at the time $t_n$. The kth movement sample line is expected to be transferred from the sample point image taken at the time $t_n$ into the prospective post-movement area in the sample point image taken at the time $t_n+\gamma$. In step Q4*b*, is calculated, absolute brightness difference values each indicative of an absolute value of a difference in brightness between the kth movement sample line in the sample point image taken at the time $t_n$ and each of the sample lines contained in the prospective post-movement area in the sample point image taken at the time tn+γ.

Step Q4*b* is followed by step Q4*c* in which a judgment is made upon whether the smallest one of the absolute brightness difference values is smaller than a predetermined threshold level or not. If the answer in step Q4*c* is an affirmative "YES", step Q4*c* leads to step Q4*d* in which the sample line in the prospective post-movement area taking part in a production of the smallest absolute brightness difference value is detected as the post-movement sample line to which the kth movement sample line is expected to be transferred. If the answer in step Q4*c* is a negative "NO", step Q4*c* leads to step Q4*e* in which a decision that there is no post-movement sample point to which the kth movement sample line is expected to be transferred is made. By virtue of steps Q4*f* and Q4*g* following steps Q4*d* and Q4*e*, steps Q4*a* through Q4*e* are repeated until k is equal to K. The repetition of steps Q4*a* through Q4*e* has the effect of making judgments whether or not there is a post-movement sample line to which each of all the movement sample lines is expected to be transferred and detecting the position of the post-movement sample line.

Figure 40:
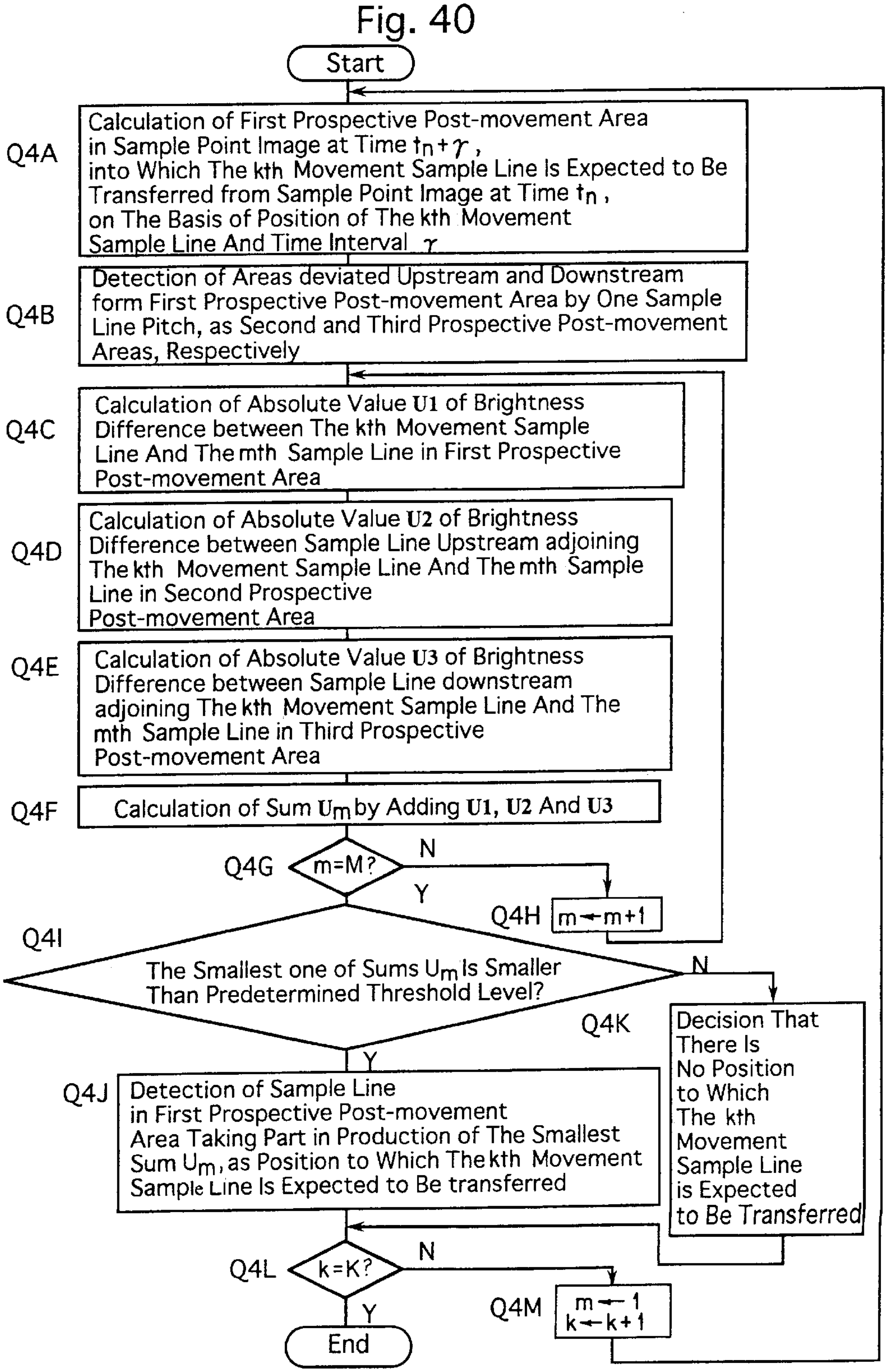
FIG. 40 is a flowchart showing a second example of detailed steps as a whole defining the step Q4 of the flowchart shown in FIG. 37.

A second example of the process of detecting the post-movement sample lines performed in step Q4 shown in FIG. 37 will be described in detail hereinlater with reference to FIG. 40 showing a flowchart formed by steps Q4A through Q4M.

In step Q4A, a first prospective post-movement area in the sample point image taken at the time $t_n+\gamma$ is calculated depending upon the time interval $\gamma$ and the position of the kth movement sample line in the sample point image taken at the time $t_n$. The kth movement sample line is expected to be transferred from the sample point image taken at the time $t_n$ into the first prospective post-movement area in the sample point image taken at the time $t_n+\gamma$. In step Q4B, second and third prospective post-movement areas are determined. The second prospective post-movement area partially forms the sample point image taken at the time $t_n+\gamma$ and is deviated upstream by one line pitch from the first prospective post-movement area. The third prospective post movement area partially forms the sample point image taken at the time $t_n+\gamma$ and is deviated downstream from the first prospective post-movement area by one line pitch.

In step Q4C, is calculated an absolute brightness difference value U1 indicative of an absolute value of a difference in brightness between the kth movement sample line in the sample point image taken at the time $t_n$ and the mth sample line contained in the first prospective post-movement area in the sample point image taken at the time $t_n+\gamma$.

In step Q4D, is calculated an absolute brightness difference value U2 indicative of an absolute value of a difference in brightness between the sample line immediately adjacent to and positioned on the upstream side of the kth movement sample line in the sample point image taken at the time $t_n$ and the mth sample line included in the second prospective post-movement area in the sample point image taken at the time $t_n+\gamma$.

In step Q4E, is calculated an absolute brightness difference value U3 indicative of an absolute value of a difference in brightness between the sample line immediately adjacent to and positioned on the downstream side of the kth movement sample line in the sample point image taken at the time $t_n$ and the mth sample line included in the third prospective post-movement area in the sample point image taken at the time $t_n+\gamma$.

In step Q4F, the absolute brightness difference values U1, U2 and U3 are added to calculate a sum $U_m$. Owing to steps Q4G and Q4H, steps Q4C through Q4F are repeated until m is equal to M. The repetition of steps Q4C through Q4F has the effect of calculating all of the absolute brightness difference values U1 resulting from the movement sample line and all of the sample lines contained in the first prospective post-movement area, all of the absolute brightness difference values U2 resulting from the sample line upstream adjoining the movement sample line and all of the sample lines contained in the second prospective post-movement area, and all of the absolute brightness difference values U3 resulting from the sample line downstream adjoining the movement sample line and all of the sample lines contained in the third prospective post-movement area. The repetition further has the effect of calculating all of the sums each indicative of a sum of each absolute brightness difference value U1, U2 and U3.

In step Q4I, a judgment is made upon whether the smallest one of the sums $U_m$ is smaller than a predetermined threshold level or not. If the answer in step Q4I is an affirmative "YES", step Q4I leads to step Q4J in which the sample line in the first prospective post-movement area taking part in a production of the smallest sum $U_m$ is detected as the post-movement sample line to which the kth movement sample line is expected to be transferred. If the answer in step Q4I is a negative "NO", step Q4I leads to step Q4K in which a decision that there is no sample line expected to be transferred from the kth movement sample line is made.

By virtue of steps Q4L and Q4M, steps Q4A through Q4K are repeated until k is equal to K. The repetition of steps Q4A through Q4K has the effect of detecting all of the post-movement sample lines in the sample point image at the time $t_n+\gamma$, to which the movement sample line in the sample point image taken at the time $t_n$ are expected to transferred.

Figures 41A, 41B:
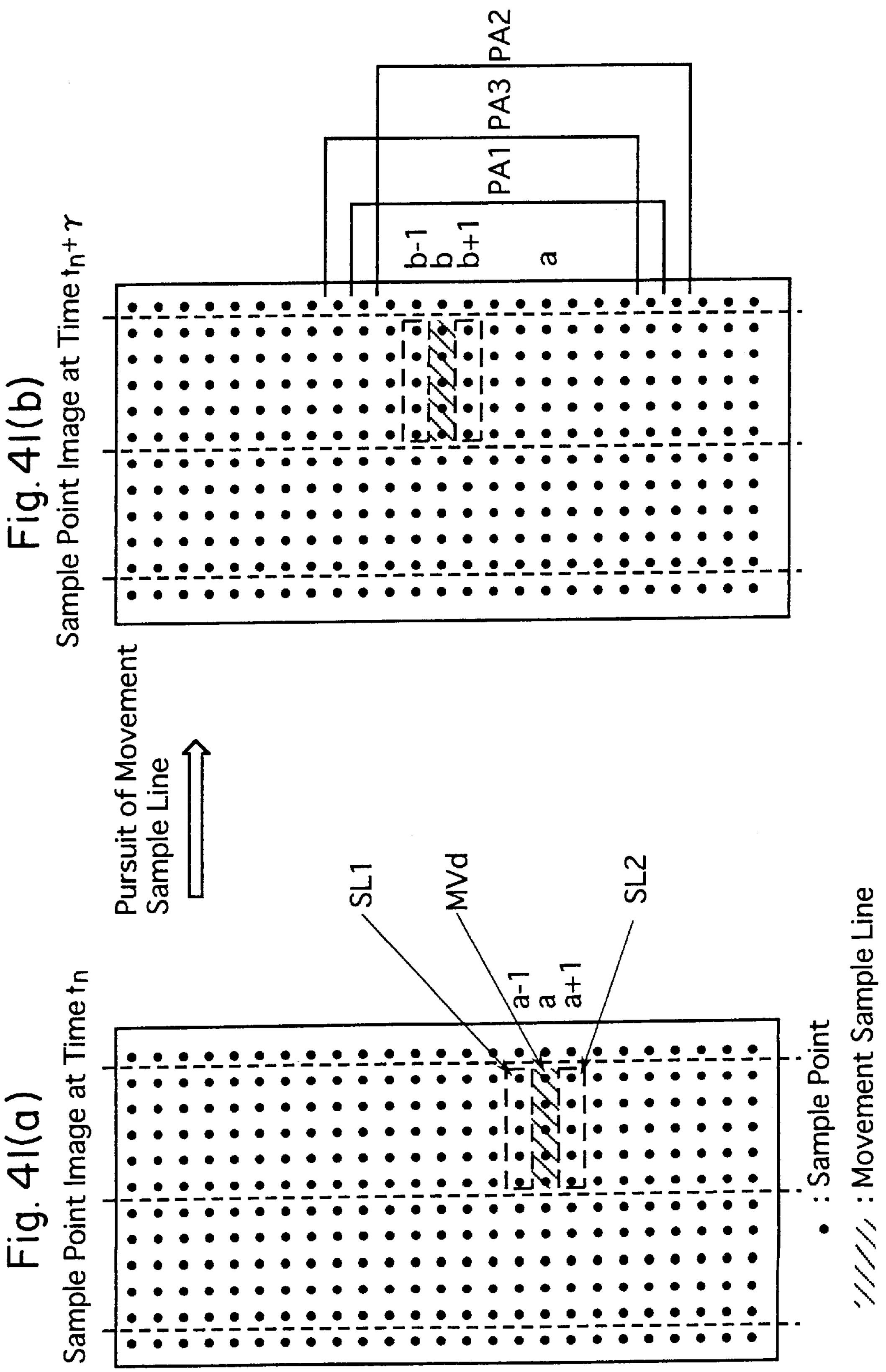
FIG. 41 is a view showing relationships between a movement sample line, two sample lines immediately before and after the movement sample lines, and prospective post-movement areas into which the movement sample line detected in the step Q4J of the flowchart shown in FIG. 40 and the two sample lines are expected to be respectively transferred.

If one movement sample line MVd is positioned as shown in FIG. 41(*a*), a first post-movement area PA1 into which the movement sample line is expected to be transferred positions as shown in FIG. 41(*b*). At the same time, second and third post-movement areas PA2 and PA3 are positioned as shown in FIG. 41(*b*). If three sample lines located at positions b, b−1 and b+1, respectively, in the sample point image taken at the time $t_n+\gamma$ shown in FIG. 41(*b*), take part in a production of the smallest one of the sums calculated in step Q4F, the sample line located at the position b is representative of a post-movement sample line to which the movement sample line MVd is expected to be transferred.

In step Q5 shown in FIG. 37, the velocity Vk of each of the movement sample lines is calculated in accordance with an equation described below.

$$Vk=(Lb-La)/\gamma \quad \text{(xii)}$$

wherein La is indicative of a coordinate of each of the sample lines in an axis which is formed on sample point image at the time $t_n$ and which extends along the road, and Lb is indicative of a coordinate of each of locations, to which each of the movement sample lines is expected to be transferred, in an axis formed on sample point image at the time $t_n+\gamma$ and extending along the road.

In step Q12 shown in FIG. 37, the exponential smoothing process for the spatial velocity is performed in accordance with an equation described below.

$$V(m,t_n)=(1-\theta)\times V(m,t_{n-1})+\theta\times V(m,t_n) \quad \text{(xiii)}$$

wherein $V(m,t_n)$ is a spatial velocity in the mth mesh section at the time $t_n$, $V(m,t_{n-1})$ is a spatial velocity in the mth mesh section at the time $t_{n-1}$, and θ is an exponential coefficient and defined $0<\theta<1$. By performing the exponential smoothing process, noises can be eliminated.

Figure 42:
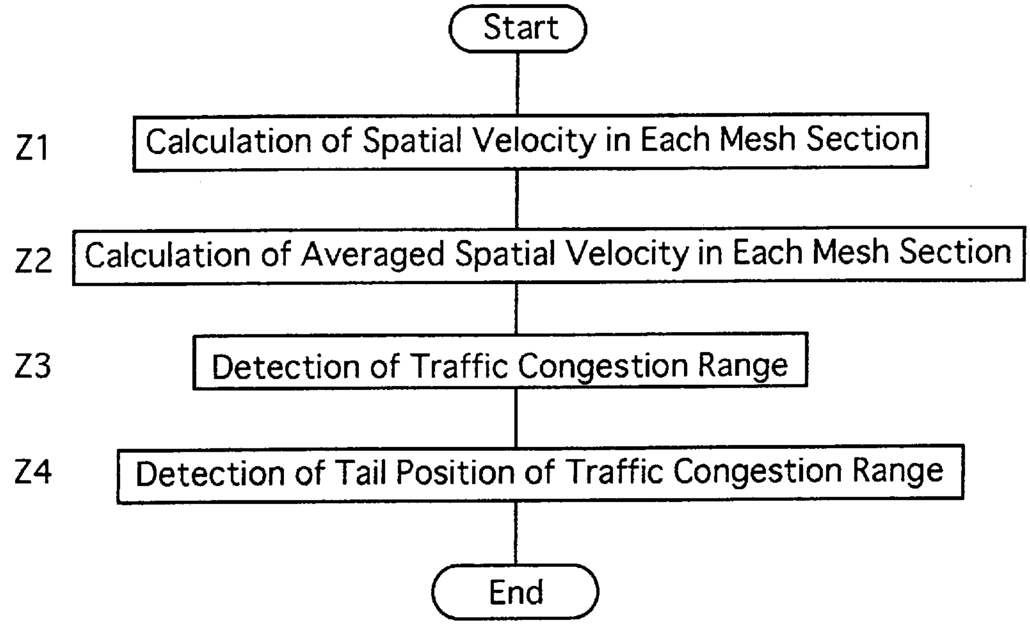
FIG. 42 is a flowchart showing a first example of steps of measuring the tail position of a traffic congestion range detected by the traffic congestion measuring apparatus shown in FIG. 20.

A first example of the process of detecting the tail position of the traffic congestion range performed by the traffic congestion measuring unit 82 will be described in detail hereinlater with reference to FIG. 42 showing a flowchart formed by steps Z1 through Z4.

In step Z1, the spatial velocity of each mesh section is calculated in either of the following two calculation manners.

One of the calculation manners is represented by the flowchart shown in FIG. 37.

In the other of the calculation manners, the spatial velocity $V(m,t_n)$ is calculated by the following equation as using the spatial density calculated in accordance with the flowchart shown in FIG. 22 and the traffic quantity measured in the traffic flow measurement area F shown in FIG. 21.

$$V(m,t_n)=(q(t_n)\times la)/d(m,t_n) \quad \text{(ix)}$$

wherein $q(t_n)$ is traffic quantity per predetermined time in the spatial measurement area at the time $t_n$, la is an average length of the vehicles lying in the spatial measurement area at the time $t_n$, and $d(m,t_n)$ is a spatial density of the mth mesh section.

In order to eliminate noises, the spatial velocity $V(m,t_n)$ is smoothed through exponential smoothing techniques according to an equation described below.

$$V(m,t_n)=(1-\mu)\times V(m,t_{n-1})+\mu\times V(m,t_n) \quad \text{(xv)}$$

wherein $\mu$ is an exponential coefficient and defined by $0<\mu<1$.

In step Z2, an averaged spatial velocity is calculated by the following equation in order to eliminate noises and an influence of the distribution of the traffic congestion.

$$Mv(m)=(1/M)\times\sum_{x=m-M/2}^{m+M/2} V(x,t) \quad \text{(xvi)}$$

wherein Mv(m) is averaged spatial velocity in the mth mesh section, and M is the total number of the mesh sections.

Figure 45:
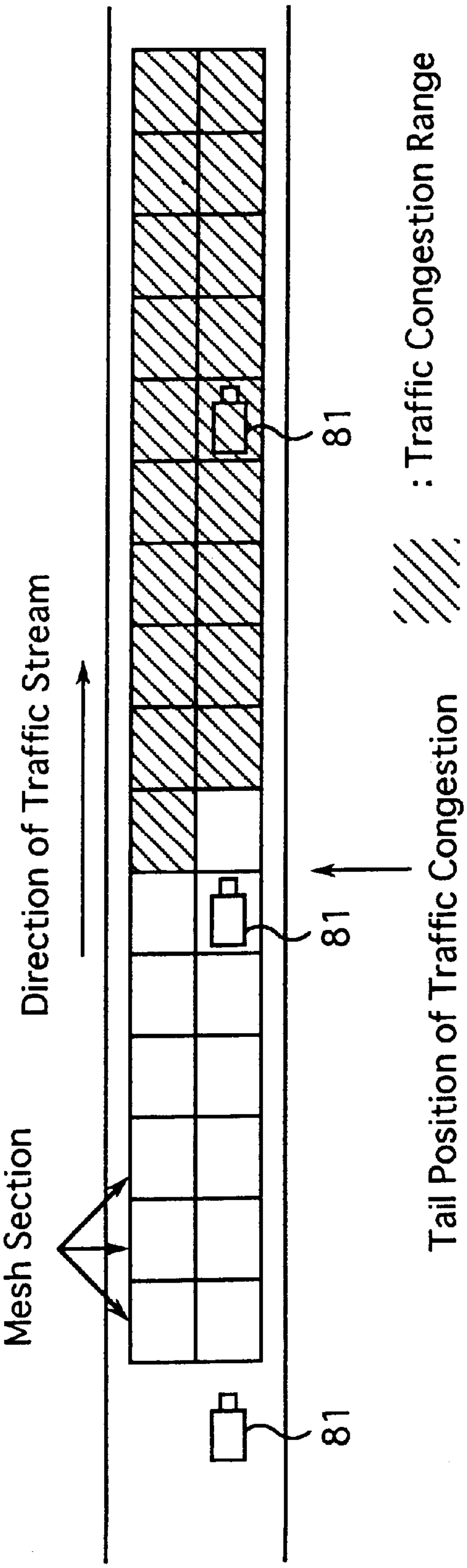
FIG. 45 is a view the tail position of the traffic congestion range measured in accordance with the steps of the flowchart shown in FIG. 42.

In step Z3, the mesh sections each having Mv(m) smaller than Cv are detected as a traffic congestion range. Note that Cv is a predetermined velocity. If the road shot by the video camera is a highway, Cv is set to 40 km/h. If the road shot by the video camera is a street, Cv is set to 20 km/h. In step Z4, the upstream end of the traffic congestion range is detected as a tail position of the traffic congestion. FIG. 45 shows relationships between the mesh sections, traffic congestion range, and the tail position of the traffic congestion.

Figure 43:
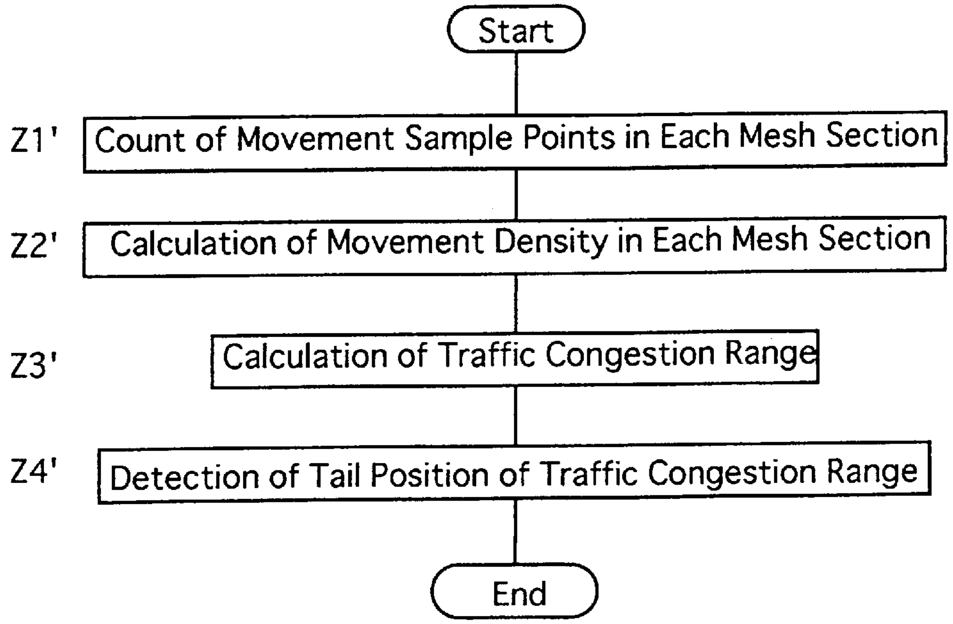
FIG. 43 is a flowchart showing a second example of steps of measuring the tail position of the traffic congestion range detected by the traffic congestion measuring apparatus shown in FIG. 20.

A second example of the process of detecting the tail position of the traffic congestion range performed by the traffic congestion measuring unit 82 will be described in detail hereinlater with reference to FIG. 43 showing a flowchart formed by steps Z1' through Z4'.

Step Z1' counts the movement sample points included in each of the mesh sections. In step Z2', a movement density Mr(m) is calculated by dividing the counted number of the movement sample points included in each mesh section by the total number of the sample points contained in each mesh section.

In step Z3', the mesh sections each having the spatial density D(m) larger than a predetermined threshold level C1 and the movement density Mr(m) smaller than a predetermined threshold level C2 are detected as a traffic congestion range. In step Z4', the upstream end of the traffic congestion range is detected as a tail position of the traffic congestion.

Figure 44:
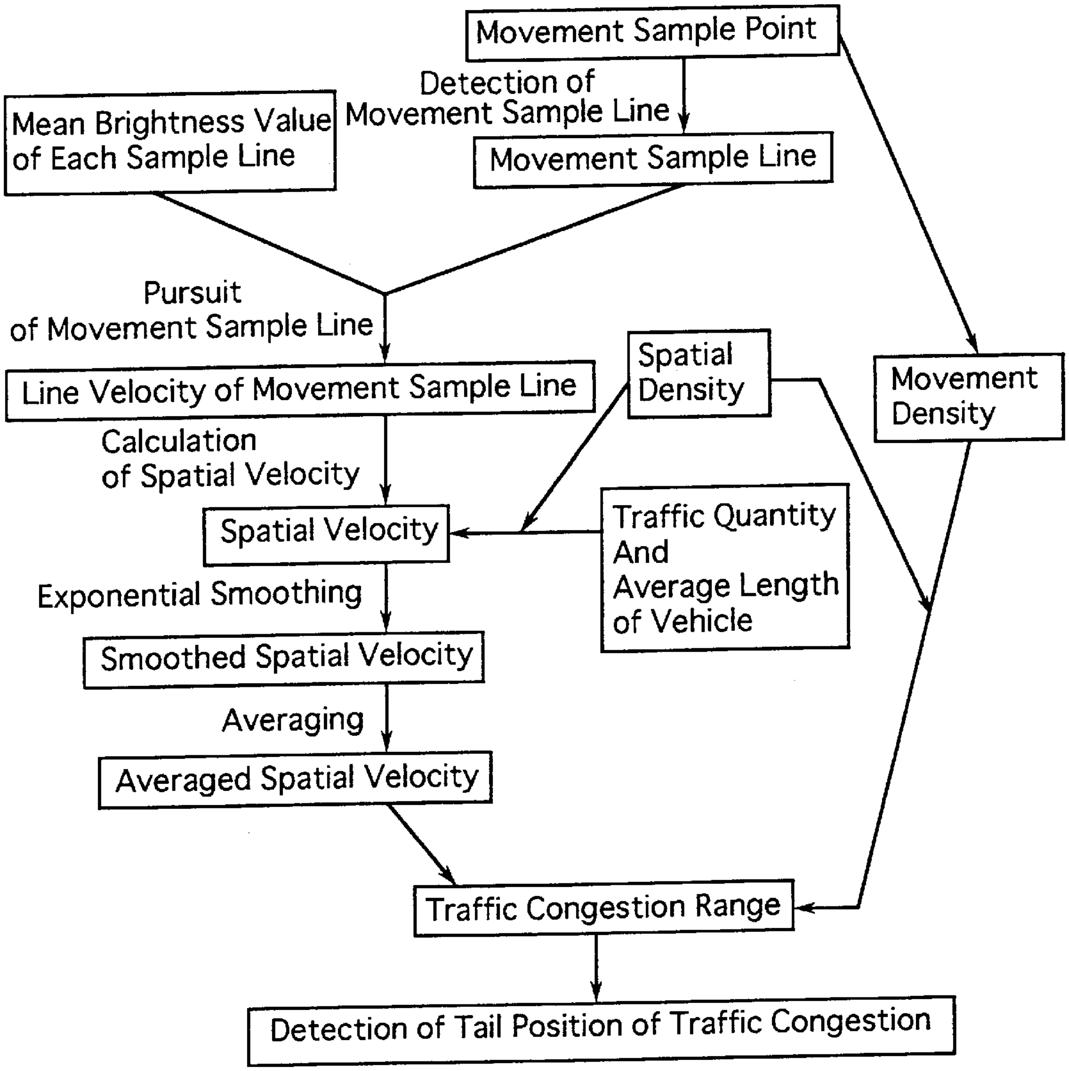
FIG. 44 is a view showing relationships between results of the calculation and the detection obtained in the steps of the flowcharts shown in FIGS. 42 and 43.

Steps Z1 through Z4 shown in FIG. 42 and steps Z1' through Z4 shown in FIG. 43 are repeated at regular intervals. FIG. 44 summarily shows relationships between the required image data, and the results of the detection and the calculation in steps Z1 through Z4 and Z1' through Z4'.

The traffic congestion measuring units 82 shown in FIG. 20 are operated to transmit, to the central control unit 100 in the traffic control center, the spatial densities measured in accordance with the flowchart shown in FIG. 22, the spatial velocities measured in accordance with the flowchart shown in FIG. 37, the tail position of the traffic congestion measured in accordance with the flowchart shown in FIG. 42 or 43, and the various measurement results derived from the traffic flow measurement area F shown in FIG. 21. The central control unit 100 is operated to produce traffic information useful to vehicle drivers who are driving on the highway shot by the video cameras 81 and transmit the traffic information to the display control unit 92. The information display board 91 is controlled by the display control unit 92 to display the traffic information on its own screen.

According to the second embodiment, not all of the picture elements contained in the image but the sample points corresponding to part of the picture elements contained in the image are processed, so that data produced during the calculation processes can be extremely decreased in quantity. Hence, the traffic congestion measuring apparatus can be simplified in hardware and reduced in cost. In addition, the traffic congestion measuring apparatus can process the image at high speed and, accordingly, measure the state of traffic congestion in real time.

Because the presence and the movement of the vehicle is detected by processing brightness per sample line, the spatial velocity and the spatial density in each of the mesh sections can be detected. If the traffic congestion measuring apparatus is regulated so as to result in the fact that an area occupied by the vehicle which is moving at 40 km/h or lower is detected as a traffic congestion range, the traffic congestion measuring apparatus can directly measure, in real time, the velocities and the density of the vehicles lying in the measurement area, thereby making it possible to produce the detailed traffic information. The second embodiment has a great advantage in traffic control system for highways.

It is possible that the traffic congestion measuring apparatus starts to measure the state of the traffic congestion without the previously leaning and with accuracy immediately after the setup of the apparatus is completed. In addition, the traffic congestion measuring apparatus can be stably operated to measure the state of the traffic congestion independently of the variations in circumstances such as locations, time, weather and traffic densities. The traffic congestion measuring apparatus can also measure the traffic queue length with ease.

Each of the various parameters serving as criterion levels in the various judgments is varied in accordance with an actual route distance from the video camera to a location on the road corresponding to a position of each of the sample points, so that the results of the measurement is enhanced in accuracy. Since the various parameters are automatically determined in accordance with the actual route distance from the video camera to the location on the road corresponding to the position of each of the sample points, the traffic control system is managed with great facility.

If a large number of video cameras and traffic congestion measuring apparatuses are arranged along the road at regular space intervals each corresponding to the length of the measurement area of each video camera, the state of traffic congestion can be measured over long distance. In the present embodiment, the state of traffic congestion in the whole measurement area is not estimated from measurement results in a local part of the measurement area but directly measured, thereby enabling the traffic control system to quickly detect various accidents such as traffic accidents or vehicular accidents.

What is claimed is:

1. A traffic congestion measuring method of measuring a state of traffic congestion on the basis of a motion picture which represents a road and vehicles coming and going on said road and is formed by a series of images taken by a video camera, comprising the steps of:

(a) forming a criterion brightness image which is taken by said video camera and in which the vehicle is expected to be absent;

(b) detecting the vehicles represented in one of said series of images taken at a predetermined time on the basis of said criterion brightness image and the image taken at said predetermined time;

(c) renewing said criterion brightness image after said step (b); and (d) repeating said steps (b) and (c) at predetermined regular intervals, said criterion brightness image being renewed in said step (c) by an equation described as follows:

$$B_{n+1}=B_n+\eta\times(X_n-B_n)$$

wherein $X_n$ is a brightness level of each of picture elements forming the image taken at time $t_n$, $B_n$ is a brightness level of each of picture elements forming the criterion brightness image which is utilized for detecting the vehicles represented in the image taken at said time $t_n$, $B_{n+1}$ is a brightness level of each of picture elements forming the criterion brightness image which is utilized for detecting the vehicles represented in the image taken at time $t_{n+1}$, each of said predetermined regular intervals is equal to $t_{n+1}-t_n$, and $\eta$ is a variable coefficient decreased in proportion as $|x_n-B_n|$ becomes large and as a level of the traffic congestion on said road is increased.

* * * * *